United States Patent
Rivard

(10) Patent No.: US 11,562,061 B2
(45) Date of Patent: Jan. 24, 2023

(54) SYSTEMS AND METHODS FOR AUTHENTICATION

(71) Applicant: William Guie Rivard, Menlo Park, CA (US)

(72) Inventor: William Guie Rivard, Menlo Park, CA (US)

(*) Notice: Subject to any disclaimer, the term of this patent is extended or adjusted under 35 U.S.C. 154(b) by 0 days.

(21) Appl. No.: 17/382,052

(22) Filed: Jul. 21, 2021

(65) Prior Publication Data

US 2021/0349987 A1 Nov. 11, 2021

Related U.S. Application Data

(63) Continuation of application No. 16/787,034, filed on Feb. 11, 2020, now Pat. No. 11,106,783.

(60) Provisional application No. 62/803,593, filed on Feb. 11, 2019.

(51) Int. Cl.
*G06F 21/44* (2013.01)
*G06F 21/72* (2013.01)
*G06K 7/10* (2006.01)
*H04L 9/32* (2006.01)

(52) U.S. Cl.
CPC ............ *G06F 21/44* (2013.01); *G06F 21/72* (2013.01); *G06K 7/10297* (2013.01); *H04L 9/3242* (2013.01)

(58) Field of Classification Search
CPC ...... G06F 21/44; G06F 21/72; G06K 7/10297; H04L 9/3242
See application file for complete search history.

(56) References Cited

U.S. PATENT DOCUMENTS

| | | | |
|---|---|---|---|
| 2016/0110571 A1* | 4/2016 | Jung | H04L 9/3263 340/10.1 |
| 2017/0006027 A1* | 1/2017 | Hagiwara | G06F 16/9554 |
| 2017/0116447 A1* | 4/2017 | Cimino | G06K 7/10297 |
| 2019/0213462 A1* | 7/2019 | McDonald | G06Q 10/0833 |

\* cited by examiner

*Primary Examiner* — Nelson S. Giddins

(57) ABSTRACT

An authentication method for a tag device includes exchanging authentication codes between the tag device and an authentication server to perform mutual authentication. A reader device acts as a communications bridge between the tag device and the authentication server. The reader device may observe mutual authentication between the tag device and the authentication server as an indicator that the tag device is authentic. A failure of mutual authentication indicates that the tag device is not authentic.

20 Claims, 21 Drawing Sheets

SYSTEMS AND METHODS FOR AUTHENTICATION

CROSS-REFERENCE TO RELATED APPLICATIONS

The present application is a continuation of, and claims priority to U.S. patent application Ser. No. 16/787,034, titled "SYSTEMS AND METHODS FOR AUTHENTICATION," filed Feb. 11, 2020, which in turn claims priority to and the benefit of U.S. Provisional Patent Application No. 62/803,593, titled "SYSTEMS AND METHODS FOR AUTHENTICATION," filed Feb. 11, 2019, which is hereby incorporated by reference for all purposes.

TECHNICAL FIELD

The present disclosure relates generally to authentication, and more particularly to systems and methods for authentication.

BACKGROUND

Product authentication refers to providing evidence or otherwise proving that a product is authentic or genuine. One approach for product authentication in the prior art involves attaching a visible label to a product as evidence of authenticity. Such a label is typically designed to be difficult to reproduce (e.g. a metal foil with visible holographic marking, a unique or distinctive material, etc.). However, visible labels can be nearly perfectly copied. Furthermore, even imperfectly copied labels may be visibly indistinguishable from an authentic label and therefore fail to provide definitive authentication, even to a diligent observer.

Certain product authentication techniques in the prior art use electronic transponders (tags) that employ near-field communication (NFC) technology to provide electronic authentication credentials, such as static values, which are easily replicated and provide little actual value in product authentication. Other conventional techniques using NFC tags are vulnerable to known attack strategies, thereby undermining the actual authentication value of these techniques in practical settings. Thus, there is a need for addressing these and/or other issues associated with the prior art.

SUMMARY

A method and system are disclosed for performing authentication of a tag device, the method comprising receiving, by the tag device, a first server authentication code transmitted by a reader device, and determining, by the tag device, that the first server authentication code is valid based on tag state data stored in a nonvolatile memory circuit within the tag device, and a temporary code sequence index generated from a code sequence index comprising the tag state data. The method further comprises generating, by the tag device, a first tag authentication code, a second tag authentication code, and a third tag authentication code based on the tag state data and the temporary code sequence index, and transmitting, by the tag device, the first tag authentication code in response to determining that the first server authentication code is valid. The method yet further comprises receiving, by the tag device, a second server authentication code transmitted by the reader device, determining that the second server authentication code is equal to the second tag authentication code, and in response to determining that the second server authentication code is equal to the second tag authentication code: transmitting the third tag authentication code and incrementing the code sequence index.

DESCRIPTION

Figure 1A:
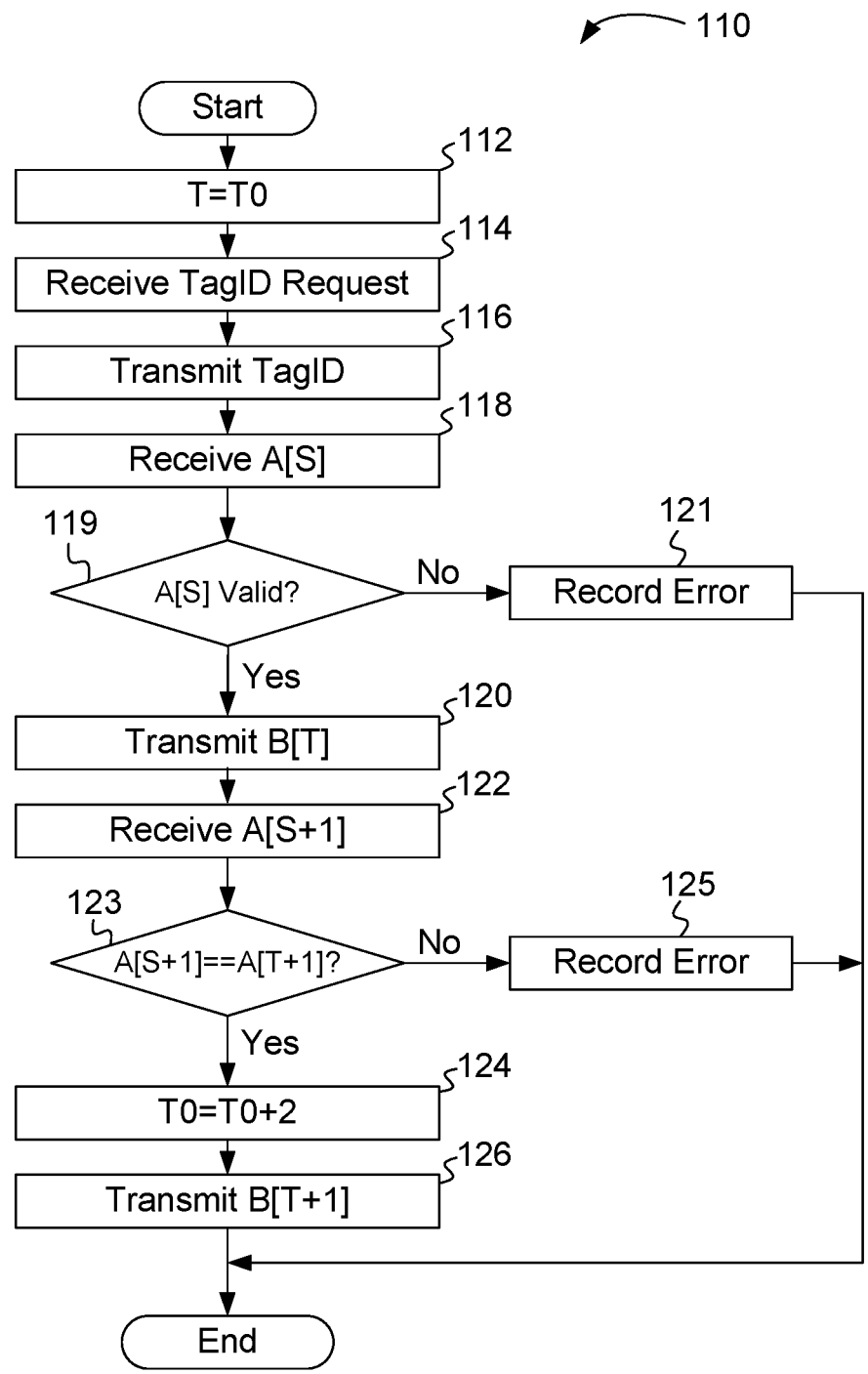
FIG. 1A illustrates a flowchart of a method for a tag device to provide authentication codes, in accordance with an embodiment.

Embodiments of the present disclosure provide authentication of a wireless tag device, such as a near-field communications (NFC) transponder/tag, a radio-frequency identification (RFID) transponder/tag, or a hybrid transponder/tag configured to communicate through two or more different wireless communication channels (e.g., NFC and RFID). Without limitation, a tag device may be incorporated into a product, a product label, product packaging (e.g., a beverage or medicine bottle), or a combination thereof. In an embodiment, a shipping carton includes a tag, and individual products within the carton include individual tags.

While the present disclosure is directed primarily to tag devices for product authentication, persons of ordinary skill in the art will recognize that authentication protocols, methods, and techniques disclosed herein may be directed to additional and further applications (e.g., a "secure element") without departing the scope and spirit of various embodiments.

A tag device may be programmed with a tag state data known to the tag device and to an authentication server. Each different tag device may be programmed with a different, unique set of tag state data. The authentication server may be configured to store tag state data for a plurality of different tags.

In an embodiment, the tag state data is stored only within the tag device and the authentication server after the tag device is programmed. The tag state data may be stored at the authentication server as half (or any other fraction) values in physically different storage systems, with specific half values united to service an authentication request.

The tag state data is used to generate a sequence of deterministic but externally unpredictable (i.e., apparently random/pseudorandom) authentication codes at the tag device and at the authentication server. State synchronization between the authentication server and each tag device is preserved by a synchronization technique disclosed herein.

In an embodiment, a reader device needs only compare an authentication code from the tag device with an authentication code from the authentication server at a certain point in the disclosed authentication protocol to provide positive authentication of the tag device. In certain embodiments, the reader device separately authenticates the authentication server prior to performing the authentication protocol described herein. Authentication of the authentication server is an orthogonal operation to authenticating tag devices; consequently, server authentication techniques may be revised in subsequent generations of reader device software and/or authentication server software without altering or diminishing the integrity of tag devices in the field, and without modifying the authentication protocols and techniques disclosed herein.

In the present disclosure, T0 represents a code sequence index stored within a tag device and S0 represents a companion code sequence index stored at an authentication server. In an embodiment, T0 and S0 may be implemented as binary integer values represented using 64 bits, 256 bits, 1024 bits, or more. In a tag device, T0 is stored in a nonvolatile memory circuit, such as, without limitation, an electrically-erasable programmable read-only memory (EEPROM) circuit or a ferromagnetic random access memory (FRAM) circuit. In the authentication server, S0 may be stored temporarily in system memory during an authentication session; however, S0 should otherwise be stored within nonvolatile memory, such as, without limitation, a mass storage flash memory array or a magnetic disk storage array. More generally, both T0 and S0 are stored in reliable, nonvolatile memory.

Furthermore, T represents a temporary code sequence index for the tag device and a companion temporary code sequence index for the authentication server is represented as S. Both index T and index S may be stored in temporary or volatile memory circuits such as static random access (SRAM) memory circuits during execution of the disclosed techniques. At the start of an authentication session, T is assigned the value of T0 and S is assigned the value of S0. Authentication codes A[ ] and B[ ] are generated based on the value of T at the tag device and the value of S at the authentication server. Tag state data includes T0 at the tag device and S0 at the authentication server. The tag state data also includes additional state and data (e.g., one or more keys) used to generate authentication codes A[ ] and B[ ].

An authentication session comprises initiating, following, and completing an authentication protocol. The authentication protocol maintains synchronization between T0 and S0, allowing each authentication session to be initiated in a known state at the tag device and the authentication server, despite potential loss of communication (or power) at any point during execution of the authentication protocol.

FIG. 1A illustrates a flowchart of a method 110 for a tag device (tag) to provide authentication codes, in accordance with an embodiment. Although method 110 is described with respect to a tag (e.g., tag 212 of FIG. 2A), a reader device (e.g., reader device 214), and other systems disclosed herein, persons of ordinary skill in the art will understand that any circuit or system that performs method 110 is within the scope and spirit of embodiments of the present disclosure. In an embodiment, the tag is configured to implement the method 110.

In an embodiment, the tag enters a fully powered on and operational state prior to performing method 110. Furthermore, the tag may perform channel training and communication initialization prior to performing method 110. In an embodiment, the tag is configured to receive data and transmit data according to standard communication techniques and protocols for NFC and/or RFID tag devices. Communication operations may include, without limitation, receiving and/or responding to requests such as read or write requests, receiving authentication codes, and transmitting authentication codes. The communication operations may be performed between the tag and the reader device (e.g., a smart phone). More generally, any communication channel or combination of communication channels (wireless and/or wired) for transmitting and receiving data may be used in the context of method 110.

Method 110 begins at step 112, where the tag initializes temporary code sequence index T to be equal to code sequence index T0. In an embodiment, the tag reads a value for T0 from a nonvolatile memory circuit (e.g., nonvolatile memory 252 of FIG. 2B), configured to store T0 as a binary value; the tag then writes the value of T0 into a memory circuit or register configured to store the index T.

At step 114, the tag receives a tag identifier (TagID) request. In an embodiment, the TagID request comprises at least one read request, such as a memory read request to a memory space within the tag. The TagID may comprise a sequence of bits and may be structured to include any number of subfields and any number of total bits. In an embodiment, the TagID is an integer value that may be uniquely assigned to the tag. The integer value may be represented as a binary vector and comprise a fixed or variable number of total binary bits. In another embodiment, the TagID includes a vendor ID subfield, a product ID subfield, and a serial number subfield; furthermore, at least the serial number subfield may be unique to the tag. In certain embodiments, the TagID includes a subfield flag that indicates additional TagID information may be obtained through an additional read request or a different TagID request (e.g., to facilitate longer TagID fields and/or new or different protocol generations). In an embodiment, the TagID does not change for a given instance of a tag device and remains constant for any number of TagID request operations.

In an embodiment, the TagID for a given tag is programmed into the tag, along with other tag state data. In an embodiment, tag state data becomes externally unreadable once written, and/or after programming the tag is complete (e.g., after a specific address is written). Furthermore, T0 may be assigned any initial value within the numeric range for T0, and T0 may be programmed along with other tag state data items for the tag. In an embodiment, the value of T0 and is externally unreadable after programming the tag is complete.

At step 116, the tag transmits the TagID for the tag. The tag may transmit the TagID using any technically feasible technique. For example, the tag may transmit the TagID as a reply to the least one read request, with the TagID comprising read data. In certain embodiments, two or more read requests may be performed to transmit a TagID comprising more bits than a single native read operation conveys.

At step 118, the tag receives authentication code A[S] from the reader device. In an embodiment, the authentication code A[S] is generated by an authentication server (e.g., authentication server 216), which is programmed to include a copy the tag state data also programmed into the tag. In an embodiment, the authentication server transmits A[S] to the reader device, which then transmits A[S] to the tag. The tag may receive the authentication code A[S] using any technically feasible technique. For example, the tag may receive A[S] as write data comprising a write operation to a specific, identified, or well-known address within the tag. Alternatively, the tag may receive A[S] through multiple write operations, with each write operation transmitting a portion of A[S]; the tag concatenates the portions to form A[S]. In one embodiment, the tag may receive A[S] as a sequence of reads with read address information concatenated to form A[S] within the tag, thereby overcoming certain limitations imposed by mobile device system software (e.g., only allowing NFC read operations).

At step 119, if A[S] is valid then method 110 proceeds to step 120. If A[S] is equal to A[T] then A[S] is valid. In embodiment, authentication code A[T] is generated on chip within the tag, based on the tag state data and the value of T. Any technically feasible technique may be performed to determine whether A[S] is equal to A[T]; for example, each bit of A[S] may be compared to a corresponding bit of A[T] and if all bit comparisons are equal then A[S] is equal to A[T].

In an embodiment, if A[S] is not equal to A[T], but A[S] is equal to A[T+2] then A[S] is valid and a resynchronization operation is performed as part of step 119 such that T is incremented (e.g., by 2) and T0 is incremented by the same amount (e.g., by 2); upon incrementing T and T0 the method 110 proceeds to step 120. A scenario where A[S] is equal to A[T+2] may occur if a communication error occurs wherein the authentication server transmits A[S+1] to the reader device, but the tag fails to properly receive A[S+1] (e.g., authentication code package 227 in authentication protocol 210 is not delivered to the tag). In such a scenario, the authentication server will have incremented S0 by 2, but the tag will not have incremented T0 because the tag failed to receive A[S+1]. In such a scenario, the tag resynchronizes with the authentication server, without loss of authentication codes to a potential attack, and without involvement of the reader device or the authentication server. Note that in such an embodiment, any inconsistency between T0 and S0 can only occur with S0 advancing ahead of T0 by exactly one step (e.g., incremented by 2). Consequently, the tag can always resynchronize with the authentication server by testing A[S] against A[T+2] and incrementing T and T0 accordingly. This resynchronization mechanism allows the tag to resynchronize T0 with S0 in the event of other fault conditions, such as if power is removed from the tag before the tag can increment and store T0.

Authentication codes A[ ] function to establish trust by the tag, for one authentication session, that the tag is communicating with an authentic authentication server. In this context, the tag does not initially trust the reader device or the authentication server prior to determining that A[S] is equal to A[T]. After determining that A[S] is equal to A[T], the tag trusts that the reader device is (or was) in communication with a genuine authentication server for the purpose of advancing authentication, but the authentication server does not yet trust the tag.

At step 120, the tag transmits authentication code B[T] to the reader device. The tag may transmit the authentication code B[T] using any technically feasible technique. For example, the reader device may perform a read request operation on the tag, and the tag may reply to the read request by transmitting B[T] as read data. Larger values of B[T] may be transmitted by multiple read operations, with portions of B[T] concatenated by the reader device to form a complete version of B[T]. Authentication codes B[ ] function to establish trust by an authentication server, for one authentication session, that the authentication server is communicating with an authentic tag (through the reader device).

At step 122, the tag receives authentication code A[S+1]. As with receiving A[S], any technically feasible technique may be used to receive the authentication code A[S+1].

At step 123, if A[S+1] is determined to be equal to A[T+1] then method 110 proceeds to step 124. In embodiment, authentication code A[T+1] is generated on chip within the tag, based on the tag state data and the value of T+1. For the authentication protocol to reach this point, the tag and the authentication server must be in agreement and consequently may trust the other to be authentic in the context of one authentication session.

At step 124, the tag increments index T0 (T0=T0+2) in on-chip nonvolatile memory. By waiting until after the tag determines authentication code A[S+1] is equal to authentication code A[T+1] to increment index T0, the tag is able to bound any potential difference between T0 and S0 to be less than or equal to one increment value of T0 associated with one authentication session (e.g., 2 in this context). In other words, the tag cannot be attacked in a way that causes a loss of synchronization with the authentication server by more than one authentication session (in this context, S0 can only exceed T0 by a value of 2, which represents one authentication session). Furthermore, the authentication server cannot be attacked in a way that causes loss of synchronization by more than one authentication session.

Loss of synchronization by one authentication session may be easily detected and the resynchronization operation disclosed herein (i.e., assigning T0=T0+2 and T=T+2) may be performed to resynchronize T0 to S0. By sequencing the exchange of authentication codes and performing updates to T0 and S0 according to the method 110 and authentication protocol 210 of FIG. 2A, no additional authentication codes can be revealed by the tag or the authentication server that could lead to a false positive when authenticating a non-authentic tag.

At step 126, the tag transmits authentication code B[T+1]. Any technically feasible technique may be used to transmit B[T+1]. In an embodiment, the method 110 terminates after transmitting B[T+1]. In an embodiment, the reader device compares B[T+1] with B[S+1] to determine whether the tag is authenticated, as described in method 130 of FIG. 1B.

Returning to step 119, if A[S] is not valid then method 110 proceeds to step 121. In an embodiment, if A[S] is not equal to A[T] and A[S] is not equal to A[T+2] then A[S] is not valid. Comparing A[S] to A[T+2] allows the tag to determine whether a resynchronization operation is necessary.

At step 121, the tag may record that an error has occurred. For example, the tag may implement an error counter in nonvolatile memory that is configured to increment at step 121. The error counter may be read through a read request (e.g., by a reader device), or otherwise configured to indicate an error count. In embodiment, the error counter may be configured to indicate whether a certain threshold number of errors was encountered in total. In an embodiment, the error counter is configured to become inaccessible after recording an error and becoming accessible again subsequent to a successful authentication session. In yet another embodiment, a value (e.g., a count value or a threshold count indicator) from the error counter is encoded in B[T] or concatenated with B[T] and transmitted along with B[T] at step 120. In an embodiment, the method 110 terminates after the error is recorded.

Returning to step 123, if A[S+1] is not equal to A[T+1] then method 110 proceeds to step 125. At step 125, the tag may record that an error has occurred. Recording the error may be conducted similarly to recording the error at step 121. In an embodiment, the method 110 terminates after the error is recorded.

While method 110 is described with respect to a tag, the method 110 may also be performed by an authentication circuit (e.g., authentication circuit 610 of FIG. 6A) manufactured into any reader device or any other system (e.g., a mobile device, a smart phone, a remote sensing device, a general computing platform) without departing the scope and spirit of various embodiments. In an embodiment, the authentication circuit performs method 110 to authenticate an authentication server prior to the reader device or system using the authentication server (e.g., to then separately authenticate a tag).

Figure 1B:
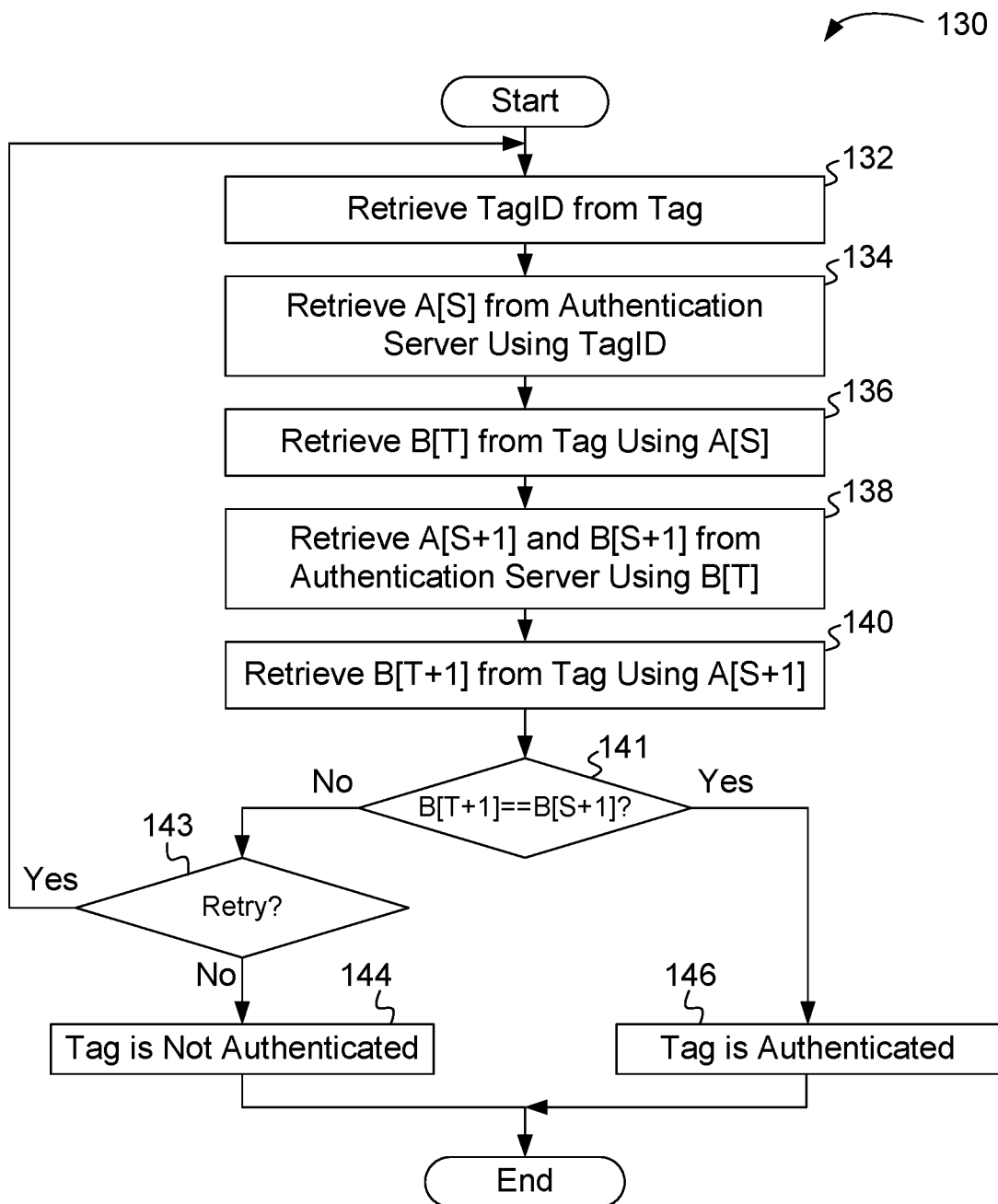
FIG. 1B illustrates a flowchart of a method for authenticating a tag device using a reader device and an authentication server, in accordance with an embodiment.

FIG. 1B illustrates a flowchart of a method 130 for authenticating a tag (e.g., tag 212 of FIG. 2A) using a reader device (e.g. reader device 214) and an authentication server (e.g., authentication server 216), in accordance with an embodiment. Although method 130 is described with respect to the systems disclosed herein, persons of ordinary skill in the art will understand that any circuit or system that performs method 130 is within the scope and spirit of embodiments of the present disclosure. In an embodiment, the reader device is configured to perform the method 130. In an embodiment, the reader device may be configured to implement any technically feasible and/or industry standard NFC communication, RFID communication, or any combination thereof for communicating with a tag device. Furthermore, the reader device may be configured to implement industry standard wireless data communications, such as through long-term evolution (LTE) cellular wireless data communications, WiFi (IEEE 802.11 standard suite) data communications, or any other technically feasible data networking technique for communication with an authentication server (e.g., located in a geographically distant data cloud). More generally, any communication channel (wireless or wired) for transmitting and receiving data may be used in the context of method 130.

In an embodiment, the reader device powers the tag into an operational state prior to performing method 130. The reader device may perform channel training and communication initialization prior to performing method 130. Furthermore, the reader device may authenticate the authentication server prior to performing method 130. The reader device may use any technically feasible technique or techniques to authenticate the authentication server.

Method 130 begins at step 132, where the reader device retrieves a TagID from the tag. In an embodiment, the reader device may retrieve the TagID by performing a read operation on the tag, and the tag may reply with read data comprising the TagID. In certain embodiments, the reader device may perform multiple read operations to retrieve a TagID value that includes more bits than a single native read operation for a particular implementation or communication standard. At step 134, the reader device retrieves an authentication code A[S] from the authentication server using the TagID. In an embodiment, the reader device communicates with the authentication server through a cellular mobile data network, such as an LTE mobile data network. In such an embodiment, the reader device transmits the TagID to the authentication server and receives A[S] back from the authentication server.

At step 136, the reader device retrieves authentication code B[T] from the tag using authentication code A[S]. The reader device may perform any technically feasible communication techniques to retrieve B[T] using authentication code A[S]. For example, the reader device may write A[S] to the tag at a first memory address or address range and subsequently read a second memory address or address range to obtain B[T]. The first address and the second address may be different addresses or the same address, with A[S] transmitted to the tag when the address is written and B[T] returned when the address is read. In certain embodiments, a communications protocol between the reader device and the tag may be performed that explicitly defines, without limitation, transmission of authentication codes A[ ] and B[ ]; such embodiments may provide transmission of authentication codes as a separate type of operation from read and write operations.

At step 138, the reader device retrieves authentication code A[S+1] from the authentication server using B[T]. The reader device also retrieves authentication code B[S+1] from the authentication server using B[T]. In an embodiment, the reader device receives both A[S+1] and B[S+1] from the authentication server in response to transmitting B[T] to the authentication server. In other embodiments, the reader device waits until after step 140 is complete to retrieve the authentication code B[S+1] from the authentication server.

At step 140, the reader device retrieves authentication code B[T+1] from the tag using authentication A[S+1]. In general, any technically feasible techniques may be used to retrieve data from the tag and any technically feasible techniques may be used to retrieve data from the authentication server.

At this point, the reader device has authentication code B[T+1] from the tag and authentication code B[S+1] from the authentication server. Both B[T+1] and B[S+1] are independently generated using secretly held tag state data, including indices T (from T0) at the tag, and S (from S0) at the authentication server. The reader device does not need to have any secret data held by the tag or the authentication server to authenticate the tag; indeed, the reader device needs only compare the two independently generated authentication codes B[T+1] and B[S+1] to be able to authenticate the tag.

At step 141, if authentication code B[T+1] is equal to authentication code B[S+1], then the method 130 proceeds to step 146. As described herein, one or more additional conditions may be applied when authenticating the tag. For example, if a relay attack is detected (B[T+1] and B[S+1] are equal, but a measured reply time such as reply time 230 of FIG. 2A exceeds a predefined threshold), then the tag is not authenticated and the method 130 may instead proceed directly to step 144.

At step 146, the reader device determines the tag to be authenticated. The reader device may perform various actions with respect to the tag being authenticated. For example, the reader device may display a message on a display screen of the reader device indicating that the tag has been authenticated. The reader device may retrieve product information about a product associated with the tag and display the product information in conjunction with an authentication message. Any technically feasible techniques may be used to retrieve the product information. In an embodiment, the product information includes an image of the product. The image may include a product name and may further include a brand name, a serial number, and so forth. In an embodiment, the product information may be displayed by opening a web browser with a URL as part of the product information. The user may further interact with the web page after the web page is displayed in the web browser. The method 130 then terminates.

Returning to step 141, if authentication code B[T+1] is not equal to authentication code B[S+1], then the method 130 proceeds to step 143.

At step 143, if a retry should be performed then the method 130 proceeds back to step 132. A retry may be performed, for example if a communications failure occurred between the reader device and the tag, causing an erroneous read of B[T+1]. Such a condition would prevent a proper comparison between authentication code B[T+1] and authentication code B[S+1]. Error correction codes may be used in conjunction with transmitting one or more authentication codes from the tag to the reader device to reduce the occurrence of such errors.

In another example, an error condition previously prevented proper delivery of A[S+1] from the authentication server to the tag, causing the authentication server and the tag to fall out of synchronization by exactly, and at most, one authentication session. In an embodiment, the tag performs resynchronization, as described with respect to FIG. 1A. In another embodiment, the authentication server may perform a resynchronization operation by rolling back S0 to a previous step (e.g., by assigning S0=S0−2). In such an embodiment, if a server resynchronization operation is performed, then an additional authentication session may be required for a valid authentication of the tag. The additional authentication session then retires any potentially observed authentication codes exchanged between the reader device and the tag.

Returning to step 143, if a retry should not be performed then method 130 proceeds to step 144. In an embodiment, a retry should not be performed if a number of retry cycles (additional iterations through steps 132 to step 143) has been attempted and failed. The method 130 then proceeds to step 144 and subsequently terminates. At step 144, the tag is deemed to be not authenticated by the reader device. The reader device may perform various actions with respect to the tag authentication failure. For example, the reader device may display a message on a display screen indicating that the tag authentication failed. Furthermore, the reader device may report the authentication failure to the authentication server or to a different server responsible for recording authentication failures.

In an embodiment, the reader device is manufactured to include an authentication circuit (e.g., authentication circuit 610 of FIG. 6A) that is configured to perform method 130 to authenticate the authentication server (e.g., prior to authenticating a different, external tag) or any other server or service. In such an embodiment, successfully authenticating the authentication circuit in step 146 indicates successful authentication of the authentication server because the authentication circuit within the reader device is known to be authentic and authentication codes B[T+1] and B[S+1] agree.

Figure 1C:
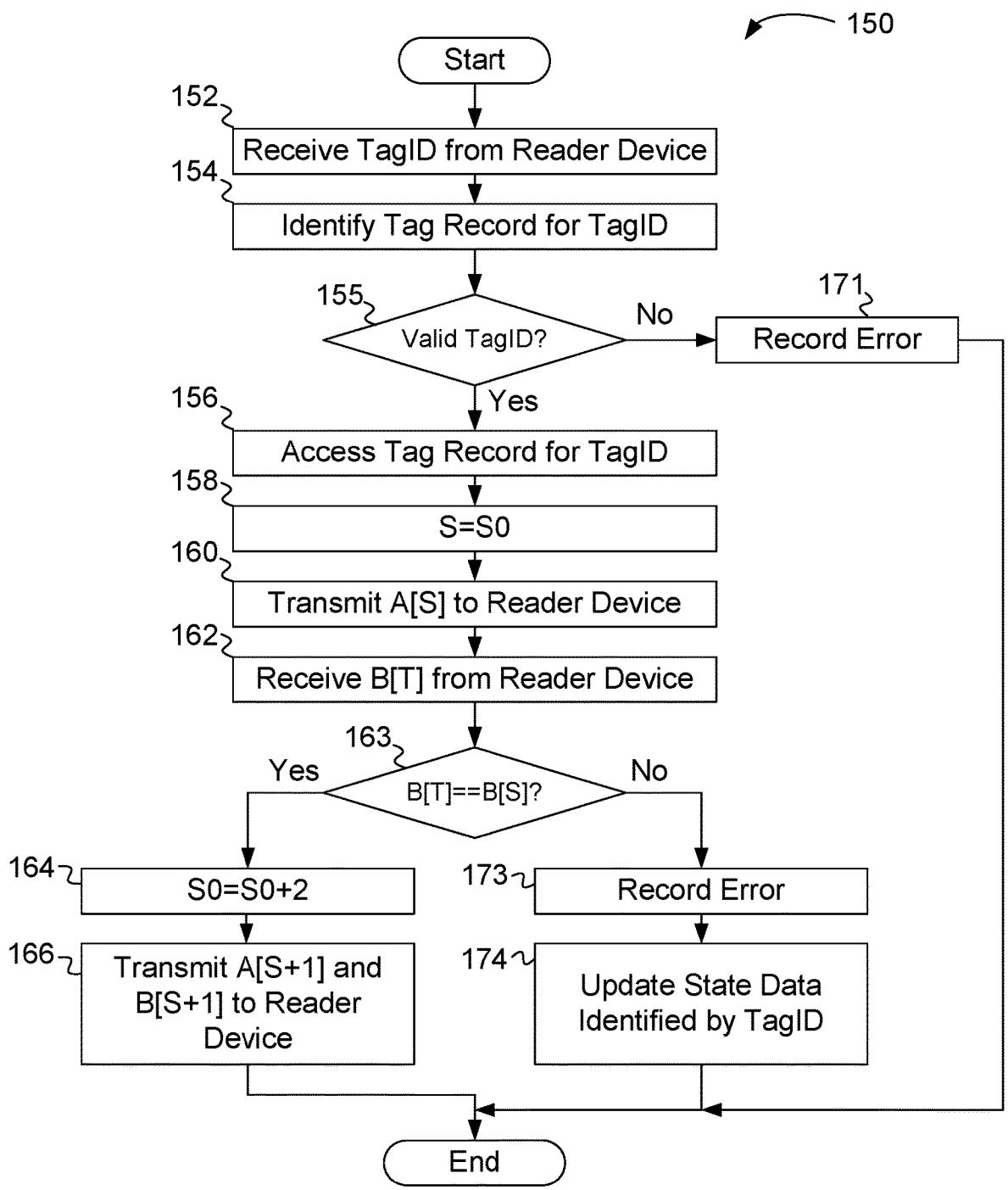
FIG. 1C illustrates a flowchart of a method for an authentication server to authenticate a tag device, in accordance with an embodiment.

FIG. 1C illustrates a flowchart of a method 150 for an authentication server (e.g., authentication server 216 of FIG. 2A) to authenticate a tag (e.g., tag 212), in accordance with an embodiment. Although method 150 is described with respect to the systems disclosed herein, persons of ordinary skill in the art will understand that any circuit or system that performs method 150 is within the scope and spirit of embodiments of the present disclosure. In an embodiment, a computer server system is configured to function as the authentication server and perform method 150. The computer server system may comprise one or more processing subsystems coupled to one or more nonvolatile storage subsystems.

Method 150 begins at step 152, where the authentication server receives a TagID from a reader device (e.g., reader device 214). Receiving the TagID comprises a request to initiate an authentication session with the authentication server to authenticate a tag that is identified by the TagID. In an embodiment, the TagID is retrieved from the tag by the reader device and transmitted to the authentication server.

At step 154, the authentication server identifies a tag record for the TagID. In an embodiment, identifying the tag record for the TagID generates a reference to the tag record. The tag record may include, without limitation, tag state data for a tag associated with TagID. Any technically feasible techniques may be performed to identify the tag record, and the reference may include a record number, an index, a URL, an address pointer, or any other technically feasible form of data reference. In various embodiments, identifying the tag record for the TagID may include a hierarchical lookup process, with different subfields of the TagID selecting different distinct collections of tag records and proceeding to select a unique, specific tag record for the TagID. For example, the subfields may specify a product brand or vendor, another subfield may specify a product stock keeping unit (SKU), and so forth.

In an embodiment, identifying a tag record for the TagID may include, without limitation, looking up the tag record in an associative data structure (e.g., a dictionary data structure) using the TagID or a subfield of the TagID (e.g., a tag serial number) as a lookup key that is associated with a resulting tag record reference. In an embodiment, one or more subfields of the TagID are used to select a specific dictionary data structure, and a subfield of the TagID (e.g., a tag serial number) is used as a key to look up the tag record reference for the TagID. Furthermore, a given dictionary data structure may be used to store different TagID values that reference records in a storage subsystem configured to store tag state data for different tags.

At step 155, if the TagID is valid then the method 150 proceeds to step 156. In an embodiment, if the TagID is found in an appropriate dictionary data structure, then the TagID is valid; otherwise, the TagID is not valid. In an embodiment, an otherwise valid TagID may be explicitly invalidated, for example when the TagID has been identified with respect to a counterfeit attack. Given a valid TagID, associated tag state data is available to be accessed (e.g., to generate authentication codes A[ ] and B[ ]) and the authentication server can proceed with authenticating the tag.

At step 156, the authentication server accesses the tag record for the TagID. In an embodiment, the tag record includes tag state data comprising a value for code sequence index S0 and keys for the tag identified by the TagID. In an embodiment, the keys include one key for authentication codes A[ ], and a different key for authentication codes B[ ]. Furthermore, the tag record may specify a specific technique for generating authentication codes A[ ] and B[ ]. In various embodiments, the authentication server may be programmed to generate authentication codes A[ ] and B[ ] using different, specified techniques, allowing the authentication server to accommodate generational advances in randomization functions while supporting tags already deployed in the field. In this way, new tags with potentially larger key strings and/or new randomization functions may be deployed while advantageously preserving the authentication value of existing tags. Additionally, the authentication protocol between the tag, the reader device, and the authentication server need not change to accommodate new generations of tags. Consequently, no updates would be necessary for the reader device to support new generations of tags, assuming physical layer communication remains compatible.

At step 158, the authentication server initializes temporary code sequence index S to be equal to code sequence index S0. In an embodiment, the authentication server generates authentication codes A[ ] and B[ ] based on the value of S and the keys. Any technically feasible randomization function, such as a cryptographic hash function, that generates a non-invertible pseudorandom output based on S and at least one of the keys may be used without departing the scope and spirit of various embodiments. In an embodiment, the randomization function may include a cryptographic hash, with inputs comprising index S and a key. In an embodiment, a given set of keys is unique to one tag. Furthermore, the tag implements an equivalent randomization function to generate equivalent authentication codes A[ ] and B[ ] based on tag state data for the tag and index T, maintained within the tag.

At step 160, the authentication server transmits authentication code A[S] to the reader device. Of course, the authentication server generates A[S] based on the tag state data prior to transmitting A[S]. At step 162, the authentication server receives authentication code B[T] from the reader device. In an embodiment, B[T] is retrieved from the tag by the reader device and transmitted to the authentication server.

At step 163, if B[T] is equal to B[S] then the method 150 proceeds to step 164. In this context, if B[T] is equal to B[S], then the tag has provided a valid authentication code (B[T]) and the authentication protocol may proceed. At step 164, the authentication server updates S0 by assigning S0=S0+2. Once S0 is updated, prior authentication codes become invalid and any previous authentication codes recorded in an attack are not valid for authentication. In certain embodiments, the authentication server may record any presentation of an invalid authentication code as a potential forensic indicator. At step 166, the authentication server transmits A[S+1] and B[S+1] to the reader device. In an embodiment, the authentication server transmits A[S+1] and subsequently transmits B[S+1] in a separate transmission. In an embodiment, the authentication server waits a specified time duration prior to transmitting B[S+1]. The specified time duration may be defined by a maximum reply time needed for the reader device to retrieve B[T+1] from the tag. In another embodiment, the authentication server transmits B[S+1] after the reader device explicitly requests B[S+1] from the authentication server.

Figure 2A:
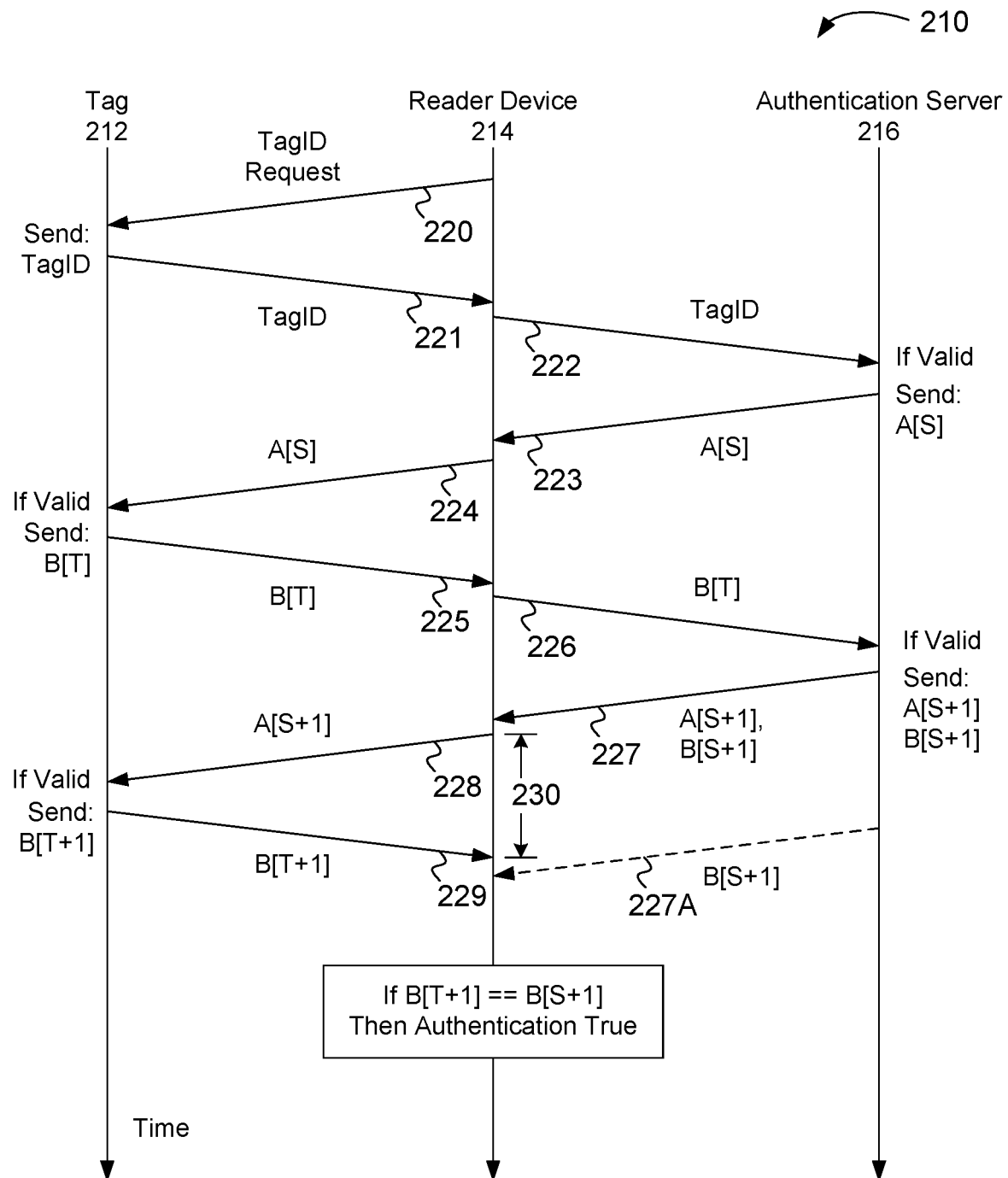
FIG. 2A illustrates an exemplary authentication protocol, in accordance with an embodiment.

In other embodiments, B[S+1] is transmitted to the reader device from the authentication server in an overlapping time window with the reader device reading B[T+1] from the tag. Any technically feasible technique may be performed to synchronize an overlap of transmission for B[S+1] and B[T+1]. In certain embodiments, the reader device is configured to wait until receiving B[S+1] before reading B[T+1] from the tag. In an embodiment, a reply time 230 of FIG. 2A is measured and if the reply time 230 exceeds a predefined threshold, then authentication fails. More generally, time windows may be defined for responses between the reader device and the tag as well as the reader device and the authentication server. The method 150 then terminates.

Returning to step 155, if the TagID is not valid, then the method 150 proceeds to step 171. At step 171, the authentication server records an error. Recording the error may include creating and/or updating an error record in an error database. In an embodiment, the error record may include, without limitation, all data received at the authentication server in connection with the presented TagID, as well as any additional identifying information, such as an IP address, traceroute information, and/or identifying and geo-location information for the reader device. In certain embodiments, if an invalid TagID or reader device are associated with a threshold number of invalid TagID queries (errors), then a system operator notice is generated (e.g., to trigger a forensic investigation). Upon completing step 171 the method 150 terminates.

Returning to step 163, if B[T] is not equal to B[S] then the method 150 proceeds to step 173. At step 173, the authentication server records an error. Recording the error may include creating and/or updating an error record in an error database. In an embodiment, the error record may include, without limitation, all data received in connection with TagID at the authentication server, an error count, any additional identifying information, such as an IP address, traceroute information, and/or identifying and geo-location information for the reader device. Furthermore, in certain embodiments, an error count for a particular TagID above a first specified threshold may generate a message to a system operator (e.g., to trigger a forensic investigation). In certain embodiments, an error count for a particular TagID above a second specified threshold may cause further authentication requests for the TagID to be declined (e.g., at step 155).

At step 174, the authentication server updates state data (e.g., in the error database) for the TagID. In certain embodiments, updating the state data comprises rolling back S0 to a value of S0-2 once to allow a valid authentication to be completed to resynchronize S0 with T0 stored at the tag. In such embodiments, the tag is not configured to resynchronize with the authentication server (e.g., by testing whether A[S] is equal to A[T+2] at step 119 of method 110). In certain embodiments, when the authentication server performs a resynchronization, the tag is deemed to be not authenticated until a subsequent one or two authentication sessions are successful. The subsequent authentication session(s) may be initiated by the reader device. In an embodiment, either the tag or the authentication server (not both) is configured to perform resynchronization.

Any technically feasible technique may be used to receive and transmit data (e.g., TagID, A[S], B[T], A[S+1], B[S+1]). For example, the authentication server may transmit and/or receive the data through a data network, with the data packaged as one or more Internet Protocol packets.

In certain embodiments, authentication requests are distributed among two or more instances of the authentication server using load distribution techniques. In an embodiment, a given authentication server instance may be configured to authenticate all known valid TagIDs. In another embodiment, authentication requests are distributed among authentication server instances based on a TagID subfield, and one or more different possible values for the TagID subfield has an assigned set of one or more authentication server instances configured to authenticating TagID values having one of the one or more different TagID subfield values. In practice, all authentication requests having a specific TagID subfield value (e.g., a specific brand name) may be directed to the one or more authentication server instances configured to authenticate the specific TagID subfield value. In this way, a large cluster of authentication servers may be scaled according to both overall authentication demand as well as authentication demand for specific subsets of tag devices. Separately, storage of tag state data may be similarly structured, with different datasets partitioned, for example, according to TagID subfield values.

In certain embodiments, one or more authentication server instances may be configured to authenticate any TagID value within an arbitrary subset of all TagID values. In such embodiments, authentication performance (e.g., latency and throughput of authentication servers) may be maintained even as the number of TagID values grows arbitrarily large, because any given set of one or more authentication server instances only needs to authenticate a specific subset of TagID values, and authentication server instances may be dynamically added to or removed from the subset of TagID values.

In various embodiments, a load distribution system is configured to direct a given authentication request from a reader device for a specific TagID to an authentication server configured to authenticate the specific TagID. In such embodiments, the load distribution system may be configured to access an associative (or otherwise indexed) data structure for all known valid TagID values using the TagID value as a lookup key, and the lookup process may identify an appropriate authentication server to perform authentication on the TagID value. In an embodiment, the associative data structure can be read-only and copied for performance scaling, while the number of TagID values in a given subset may be limited to guarantee performance given an allocated number of authentication server instances. While the overall system architectures disclosed herein allow for arbitrary scaling with respect to an authentication server cluster configured to perform method 150, other system architectures may also be implemented in the context of method 150 without departing the scope of various embodiments.

FIG. 2A illustrates an exemplary authentication protocol 210, in accordance with an embodiment. As shown, a reader device 214 communicates with a tag 212 and with an authentication server 216. Collectively, the reader device 214, the tag 212 and the authentication server 216 perform the authentication protocol 210.

In an embodiment, the authentication protocol 210 is initiated when the reader device 214 transmits a TagID request 220 to the tag 212. The TagID request 220 may be transmitted and/or performed using any technically feasible technique, including transmitting an access request and/or a memory read request to the tag 212. In response to receiving the TagID request 220, the tag 212 transmits a TagID response 221, comprising a TagID for the tag 212. The reader device 214 receives the TagID response 221 from the tag 212 and then transmits the TagID as part of an authentication start request 222 to the authentication server 216.

Upon receiving the authentication start request 222, the authentication server 216 determines whether the TagID is valid. If the TagID is valid, the authentication server 216 transmits an authentication code A[S] 223 to the reader device 214. The reader device 214 receives the authentication code A[S] 223 from the authentication server 216 and forwards A[S] to the tag 212 as authentication code A[S] 224.

In response to receiving the authentication code A[S] 224, the tag 212 determines whether A[S] is valid. If A[S] is valid, then the tag 212 transmits an authentication code B[T] 225 to the reader device 214. In an embodiment, A[S] is valid if A[S] is equal to authentication code A[T], which is calculated within the tag 212. Upon receiving the authentication code B[T] 225 from the tag 212, the reader device 214 forwards B[T] to the authentication server 216 as authentication code B[T] 226.

Upon receiving the authentication code B[T] 226, the authentication server 216 determines whether B[T] is valid. If B[T] is valid, then the authentication server 216 transmits an authentication code package 227 to the reader device 214. In an embodiment, B[T] is valid if B[T] is equal to authentication code B[S], which is calculated within the authentication server 216. In an embodiment, the authentication server 216 transmits authentication codes A[S+1] and B[S+1] in the authentication code package 227. In another embodiment, the authentication server 216 transmits authentication codes A[S+1] and B[S+1] separately, with A[S+1] transmitted in authentication code package 227 and B[S+1] transmitted later in authentication code package 227A.

Upon receiving A[S+1], the reader device 214 forwards A[S+1] to the tag 212 as authentication code A[S+1] 228. In response to receiving the authentication code A[S+1] 228, the tag 212 determines whether A[S+1] is valid. In an embodiment, A[S+1] is valid if A[S+1] (calculated by the authentication server 216) is equal to A[T+1] (calculated within the tag 212). If A[S+1] is valid, then the tag 212 transmits an authentication code B[T+1] 229 to the reader device 214.

In an embodiment, the reader device 214 measures a reply time 230, which characterizes the time taken by the tag 212 to respond to receiving authentication code A[S+1] 228. The measurement of reply time 230 may start with the reader device 214 transmitting the authentication code A[S+1] 228 to the tag 212 and end with the reader device 214 receiving the authentication code B[T+1] 229 from the tag 212. Measuring and using reply time 230 is described in greater detail in the discussion of FIG. 2E.

Upon receiving authentication codes B[T+1] and B[S+1], reader device 214 compares authentication code B[T+1], received from the tag 212, with authentication code B[S+1], received from the authentication server 216. In an embodiment, if B[T+1] is equal to B[S+1], then tag authentication is true; otherwise, authentication is false. In certain embodiments, if B[T+1] is equal to B[S+1], and if the measured reply time 230 is less than a predefined threshold, then authentication is true; otherwise, authentication is false.

In an embodiment, the tag 212 may be a product tag affixed to or integrated into a product package or packaging. Furthermore, when authentication is true the product is determined to be authentic and when authentication is false the product is deemed to be not authentic. In another embodiment, the tag 212 is an authentication circuit (e.g., authentication circuit 610 of FIG. 6A) built into the reader device 214, and when authentication is true the authentication server 216 is determined to be authentic and when authentication is false the authentication server 216 is deemed to be not authentic.

In an embodiment, authentication codes A[S], A[S+1], B[S], and B[S+1] are calculated at the authentication server 216 from tag state data stored at the authentication server 216, and authentication codes A[T], A[T+1], B[T], and B[T+1] are calculated within the tag 212 from tag state data stored at the tag 212. Furthermore, reply time 230 may be measured by the reader device 214. One advantageous feature of the disclosed authentication protocol 210 is the reader device 214 does not need to store or otherwise contain any authentication codes or keys beyond temporary authentication codes A[ ] and B[ ], which represent nonces generated and only used for one authentication session. Instead, the reader device 214 needs only observe that the tag 212, which is programmed with secret tag state data, agrees with the authentication server 216, which is programmed with the same secret tag state data. Such agreement can be determined by comparing B[T+1] from the tag 212 with B[S+1] from the authentication server 216. The reader device 214 may restrict reply time 230 to a predefined threshold. If the reply time 230 hits or exceeds the predefined threshold, then a relay attack is occurring, which would cause the reader device 214 to make an authentication determination of false (not authentic) for the tag 212. A relay attack may present equal values of B[T+1] and B[S+1] to the reader device 214 because communication of authentication codes with an authentic tag 212 is being surreptitiously relayed to the reader device 214; however the reply time 230 will exceed the predefined threshold because the relay operations add additional, measurable reply time (typically in excess of an NFC data packet transmission time).

In an embodiment, to perform authentication protocol 210, the tag 212 performs the method 110 of FIG. 1A, the reader device 214 performs method 130 of FIG. 1B, and the authentication server 216 performs method 150 of FIG. 1C.

More specifically, the tag 212 receives TagID request 220 at step 114 and transmits TagID response 221 at step 116. The tag 212 then receives authentication code A[S] 224 at step 118 and transmits authentication code B[T] 225 at step 120. The tag 212 then receives authentication code A[S+1] 228 at step 122, and transmits authentication code B[T+1] 229 at step 126.

Furthermore, at step 132 the reader device 214 transmits a TagID request 220 to the tag 212 and receives the TagID response 221 from the tag 212; in short, the reader device 214 retrieves the TagID from the tag 212. At step 134, the reader device 214 transmits the authentication start request 222 to the authentication server 216 and receives the authentication code A[S] 223 from the authentication server 216. At step 136, the reader device 214 transmits authentication code A[S] 224 to the tag 212 and receives authentication code B[T] 225 from the tag 212. At step 138, the reader device 214 transmits the authentication code B[T] 226 to the authentication server 216 and receives the authentication code A[S+1] from the authentication server 216 in the authentication code package 227. In an embodiment, the reader device 214 also receives authentication code B[S+1] in the authentication code package 227. In another embodiment, the reader device 214 receives authentication code B[S+1] in the authentication code package 227A. At step 140, the reader device 214 transmits authentication code A[S+1] 228 to the tag 212 and receives the authentication code B[T+1] 229 from the tag 212. The reader device 214 then compares B[T+1] and B[S+1] to determine whether the tag 212 is authentic.

Additionally, at step 152, the authentication server 216 receives an authentication start request 222 from the reader device 214. If the TagID included in the authentication start request 222 is valid, then at step 160 the authentication server 216 transmits the authentication code A[S] 223 to the reader device 214. At step 162, the authentication server 216 receives the authentication code B[T] 226 from the reader device 214. If the authentication code B[T] received from the reader device 214 is equal to the authentication code B[S] calculated by the authentication server 216 using tag state data associated with the TagID of the tag 212, then at step 166 the authentication server 216 transmits an authentication code package 227, including authentication code A[S+1]. In an embodiment, authentication code package 227 also includes authentication code B[S+1].

In an embodiment, the reader device 214 may be manufactured to include an authentication circuit (e.g., authentication circuit 610 of FIG. 6A) configured to behave as a tag for the purpose of allowing the reader device 214 to authenticate the authentication server 216 prior to authenticating tag 212 (e.g., an external product tag). In such an embodiment, the reader device 214 first performs the authentication protocol 210 with the authentication circuit serving as the tag to authenticate the authentication server 216. In this context, the authentication server 216 is considered authentic if B[T+1] from the authentication circuit is equal to B[S+1] from the authentication server 216. Next, the reader device 214 performs the authentication protocol 210 with the tag 212 (e.g., an external product tag). In such an embodiment, communication with the authentication circuit may be performed using conductive electrical signaling within the reader device 214 rather than RFID or NFC signaling. In certain embodiments, after the authentication server 216 is authenticated by the reader device 214, the authentication server 216 may then provide additional authentication credentials for authenticating an additional server system; for example, the additional server system may be configured to provide transaction services or other secure web-based services requiring authentication prior to use.

More generally, four tag authentication codes (A[T], B[T], A[T+1], B[T+1]) from tag 212 and four server authentication codes (A[S], B[S], A[S+1], B[S+1]) from authentication server 216 may be exchanged according to authentication protocol 210 through an observer (e.g., reader device 214). The observer needs only observe that a fourth tag authentication code (B[T+1]) is equal to a fourth server authentication code (B[S+1]) to establish that the tag 212 is authentic. The tag authentication codes are generated within the tag 212 according to tag state data stored at the tag 212. The server authentication codes are generated within the authentication server 216 according to tag state data stored at the authentication server 216.

Figure 4A:
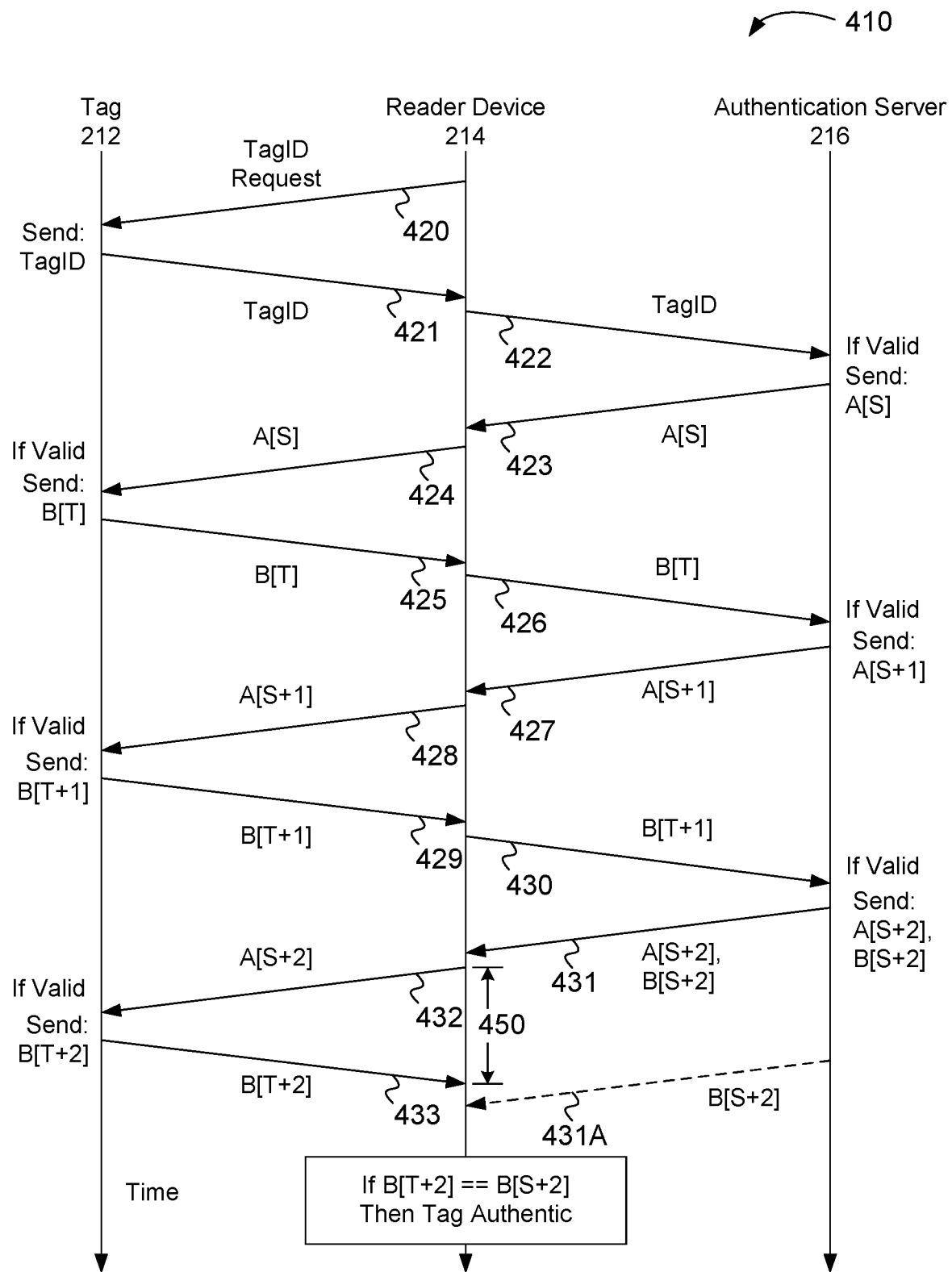
FIG. 4A illustrates an exemplary authentication protocol, in accordance with an embodiment.

The authentication protocol 210 may be extended to include additional authentication codes and additional exchange iterations of authentication codes (see authentication protocol 410 of FIG. 4A). Furthermore, the authentication protocol 210 may be extended to include concurrent exchanges of additional authentication codes (see authentication protocol 510 of FIG. 5A). Associated methods at the tag 212, the reader 214, and the authentication server(s) 216 may be similarly extended.

Figure 2B:
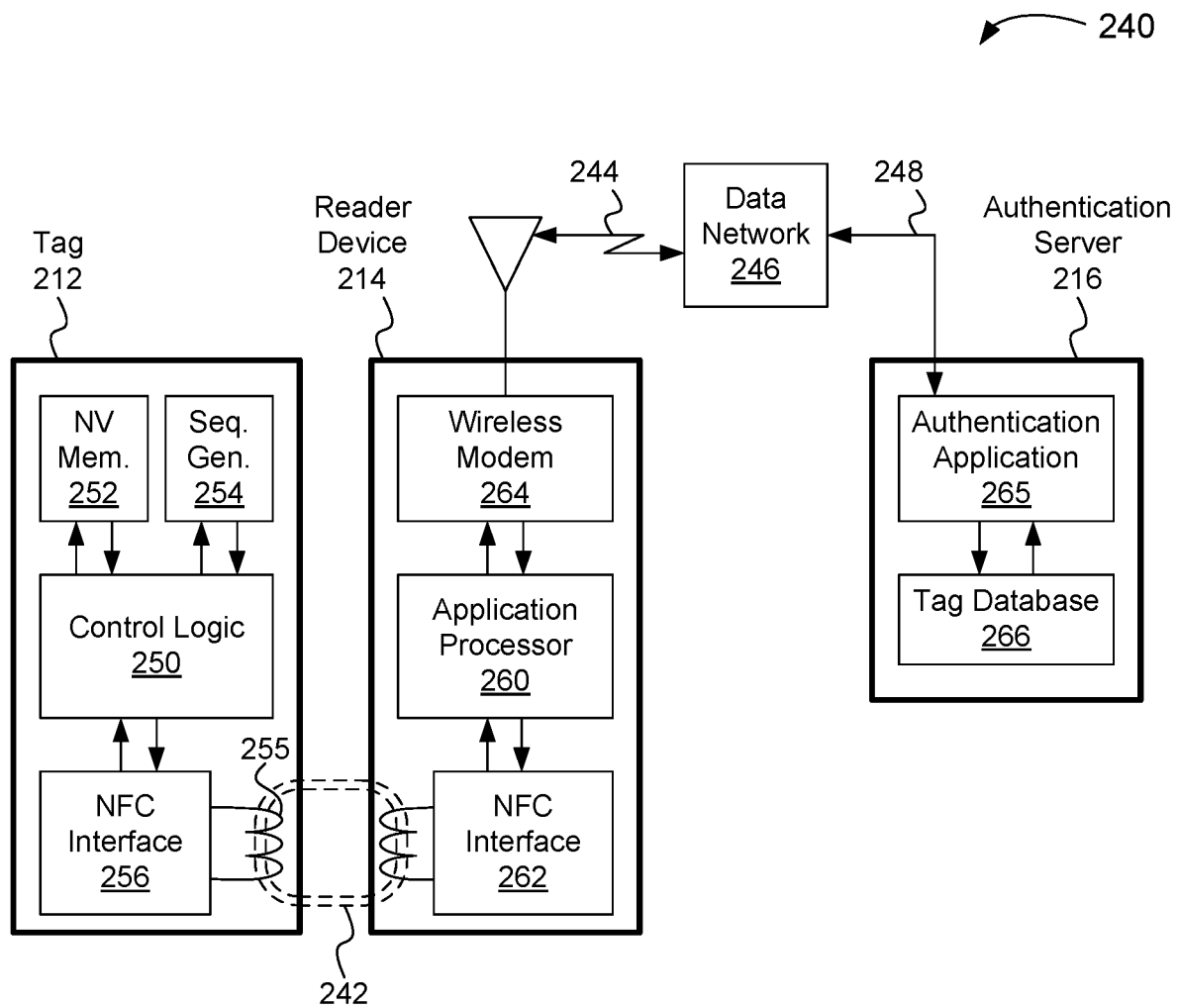
FIG. 2B illustrates an exemplary authentication system, in accordance with an embodiment.

FIG. 2B illustrates an exemplary authentication system 240, in accordance with an embodiment. As shown, the authentication system 240 includes tag 212, reader device 214, and authentication server 216. The reader device 214 is configured to communicate with the tag 212 and with the authentication server 216. In an embodiment, the authentication system 240 performs authentication protocol 210 of FIG. 2A. In another embodiment, the authentication system 240 performs authentication protocol 410 of FIG. 4A.

In an embodiment, the reader device 214 is configured to communicate data for performing an authentication protocol 210 with the authentication server 216 through a wireless data connection 244, a data network 246, and a network link 248. In an embodiment, the wireless data connection 244 comprises an LTE wireless data connection. In another embodiment, the wireless data connection 244 comprises a WiFi wireless data connection. Furthermore, any technically feasible communication and/or wireless transmission techniques may be performed by the wireless data connection 244 to communicate data between the reader device 214 and the data network 246. In an embodiment, network link 248 may include electrical and/or optical interconnects. In a practical implementation, the data network 246 includes multiple wireless data connections (not shown) configured to communicate with multiple reader devices 214.

In an embodiment, the tag 212 includes control logic 250, a nonvolatile (NV) memory 252, a sequence generator 254, an NFC interface 256, and an inductor 255. An oscillating magnetic field 242 induces an alternating electrical current in inductor 255. The NFC interface 256 is configured to receive the alternating electrical current from the inductor, and convert the alternating current to a direct current (DC) voltage source that can power the tag 212. The NFC interface 256 is also configured to receive data through the oscillating magnetic field 242 by demodulating the alternating electrical current into inbound data bits. Furthermore, the NFC interface 256 is configured to transmit data by modulating the electrical current according to outbound data bits. In an embodiment, modulating the electrical current is performed using a technique known in the art as load modulation. Data received by the tag 212 is encoded within the inbound data bits and data transmitted by the tag 212 is encoded into the outbound data bits. Powering the tag 212, transmitting data from the tag 212, and receiving data by the tag 212 may be performed according to known NFC standards, and/or any technically feasible NFC techniques. In an embodiment, the control logic 250 is configured to cause tag 212 to perform method 110 of FIG. 1A. In another embodiment, the control logic 250 is configured to cause tag 212 to perform method 310 of FIG. 3A. In yet another embodiment, the control logic 250 is configured to cause tag 212 to execute the tag functions of the two server authentication protocol 510 of FIG. 5A. The control logic 250 may also provide various other functions outside the scope of the present disclosure.

The nonvolatile memory 252 may includes multiple words of nonvolatile, readable and writeable memory circuits configured to retain data after power is removed, such as when the tag 212 is not being powered by oscillating magnetic field 242. The nonvolatile memory 252 may include, without limitation, an electrically-erasable programmable read-only memory (EEPROM) circuit, a flash memory circuit, a ferromagnetic random access memory (FRAM) circuit, a magnetoresistive random access memory (MRAM) circuit, a ferroelectric random access memory (FeRAM) circuit, or any other technically feasible nonvolatile memory circuit. In an embodiment, the nonvolatile memory 252 is configured to store tag state data for the tag 212. In an embodiment, a process for writing data to the nonvolatile memory 252 is only initiated if sufficient power is available to the tag 212. For example, a voltage measured across a capacitor configured to store charge for operating the tag 212 may be measured prior to initiating a write operation to the nonvolatile memory 252. If the measured voltage is above a safe threshold to complete a write operation, then the data is written to nonvolatile memory 252, otherwise the data is not written. One property of the presently disclosed authentication protocols, methods, and related techniques is that power may be withdrawn from the tag 212 any time during an authentication session without corrupting the tag state data or the ability of the tag 212 to resynchronize state with the authentication server 216. The only state that the tag 212 needs to update in nonvolatile memory 252 is an incremented value of T0, which may be safely written or not written based on power status of the tag 212.

The sequence generator 254 may be configured to generate authentication codes A[ ] and B[ ]. In an embodiment, sequence generator 254 is configured to generate authentication codes A[T], A[T+1], B[T], and B[T+1] for tag 212 during execution of method 110. Sequence generator 254 may also generate A[T+2] during a resynchronization operation performed at the tag, as described with respect to step 119 of method 110. In another embodiment, sequence generator 254 may generate A[T+2] and B[T+2] during execution of method 310 of FIG. 3A. More generally, sequence generator 254 is configured to generate authentication codes A[ ] and B[ ]. In an embodiment, the sequence generator 254 comprises logic circuits configured to generate authentication codes based on T (or T+1, T+2, etc.) and one or more keys (e.g., one key for authentication codes A[ ] and a different key for authentication codes B[ ]). In certain embodiments, differential logic circuits (i.e., adiabatic logic gates) may be used to implement certain portions of the sequence generator 254 to mitigate differential power analysis attacks on the tag 212.

As shown, the reader device 214 includes a wireless modem 264, an application processor 260, and an NFC interface 262. The wireless modem 264 may include one or more different digital radio subsystems, each configured to transmit and receive digital data. In an embodiment, one of the digital radio subsystems comprises an LTE digital transceiver. In another embodiment, one of the digital radio subsystems comprises a WiFi digital transceiver. The wireless modem 264 may also include any technically appropriate baseband processing circuitry. In an embodiment, the application processor 260 includes a central processing unit (CPU) and interface circuitry for communicating with the wireless modem 264 and with the NFC interface 262. The application processor 260 may include nonvolatile memory, volatile system memory, and other technically appropriate system components within a single package. The application processor 260 may be coupled to external components such as discrete memory devices (not shown), a touch input display screen (not shown), and the like. In an embodiment, the application processor 260 comprises one or more integrated circuit dies (e.g., processor die and memory die) within the same package. The NFC interface 262 is configured to communicate with NFC interface 256 residing on tag 212 through the oscillating magnetic field 242. The NFC interface 262 provides power to the tag 212 through the oscillating magnetic field 242. In an embodiment, the oscillating magnetic field 242 provides resonant coupling. In an embodiment, reader device 214 is a smartphone, or any other technically feasible mobile computing device that may be configured to perform method 130 of FIG. 1B, method 340 of FIG. 3B, and/or reader device operations of the two server authentication protocol 510 of FIG. 5A. In certain embodiments, the reader device 214 includes an RFID reader circuit (not shown).

The authentication server 216 may include one or more computing systems, which may be implemented as physical or virtual computing systems. In an embodiment, the authentication server 216 is configured to perform method 150 of FIG. 1C. In another embodiment, the authentication server 216 is configured to perform method 370 of FIG. 3C. In yet another embodiment, the authentication server 216 is configured to perform authentication server operations of the two server authentication protocol 510 of FIG. 5A. In an embodiment, an authentication application 265 executing within the authentication server 216 is configured to perform method 150, method 370, and/or operations related to the two server authentication protocol 510, and/or any combination thereof. In an embodiment, tag state data is stored within a tag database 266 and the authentication application 265 accesses the tag state data through queries posted to the tag database 266. The authentication application 265 may calculate authentication codes A[ ] and B[ ] using the tag state data. In an embodiment, the authentication application 265 calculates authentication codes A[S], A[S+1], B[S], and B[S+1] for a given authentication protocol session using the tag state data. In certain embodiments, the authentication application 265 calculates authentication codes A[S+2] and B[S+2] for the authentication session using the tag state data. A given authentication session may be performed according to authentication protocol 210, authentication protocol 410, or authentication protocol 510, or variations thereof. In certain embodiments, the tag database 266 may store the tag state data as two or more partial encodings that are distributed over corresponding different physical storage systems. When a tag query is processed, only tag state data for that tag query is actually accessed by the tag database. In this way, any potential unauthorized access to tag state data stored on any one physical storage system is insufficient to successfully participate in an authentication protocol. The tag database 266 may implement additional security techniques to avoid unauthorized access and/or replication of tag state data.

Figure 2C:
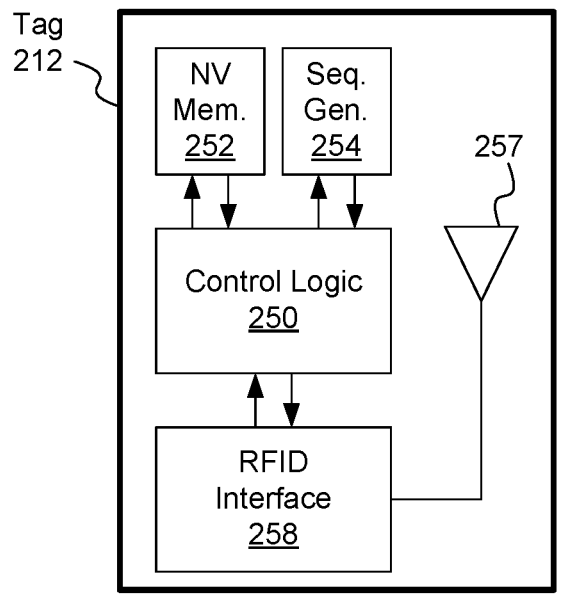
FIG. 2C illustrates an exemplary tag device configured to communicate data using electromagnetic transmission, in accordance with an embodiment.

FIG. 2C illustrates an exemplary tag 212 configured to communicate data using electromagnetic transmission, in accordance with an embodiment. In such an embodiment, the tag 212 is configured to include an RFID interface 258 and an associated antenna 257. The RFID interface 258 is configured to communicate with an RFID reader device. In one embodiment, the RFID interface 258 operates according to a UHF RFID standard suite referred to in the art as ISO 18000-63. Furthermore, control logic 250, the nonvolatile memory 252, and sequence generator 254 collectively operate to perform at least one of method 110 of FIG. 1A, method 310 of FIG. 3A, and/or tag operations of the two server authentication protocol 510 of FIG. 5A.

Figure 2D:
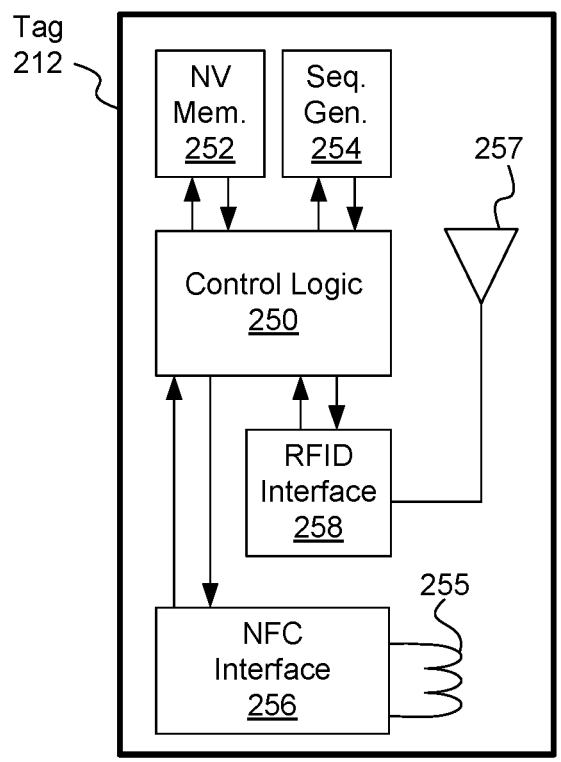
FIG. 2D illustrates an exemplary hybrid tag device configured to communicate data using electromagnetic transmission and magnetic coupling, in accordance with an embodiment.

FIG. 2D illustrates an exemplary tag 212 configured to communicate data using electromagnetic transmission and magnetic coupling, in accordance with an embodiment. In such an embodiment, the tag 212 is a hybrid tag device capable of communicating with a reader device (e.g., reader device 214) using both electromagnetic transmission (RFID) and magnetic coupling transmission (NFC). As shown, the tag 212 includes an RFID interface 258 and an NFC interface 256. In an embodiment, the NFC interface 256 is configured to operate substantially according to high-frequency NFC standards defined in the ISO/IEC 14443 standard suite; furthermore, the RFID interface 258 is configured to operate substantially according to RFID standards defined in the ISO 18000-63 standard suite.

In an embodiment, one set of tag state data is used for authenticating the tag 212 through the RFID interface 258 and a second, different set of tag state data is used for authenticating the tag 212 through the NFC interface 256. In such an embodiment, two different instances of index T0 are stored, accessed, and incremented independently, based on performing an authentication protocol through the RFID interface 258 and, separately, the NFC interface 256. Furthermore, two different instances of tag state data are used for computing authentication codes A[ ] and B[ ], so that reading more authentication codes through the RFID path does not disclose any future authentication codes later presented through the NFC path (and vice versa). In an embodiment, two independent instances of the nonvolatile memory 252 and the sequence generator 254 may operate concurrently and independently, for example to independently authenticate the tag 212 through both the RFID interface 258 and the NFC interface 258. In another embodiment resources of the nonvolatile memory 252 and the sequence generator 254 are shared and may operate to authenticate the tag 212 through both the RFID interface 258 and the NFC interface 258 concurrently.

In another embodiment, a common set of tag state data is used for authenticating the tag 212 through one of the RFID interface 258 or the NFC interface 256 at a time. In such an embodiment, one code sequence index T0 is stored along with one set of other tag state data for performing an authentication session. In such an embodiment, when a first authentication session is initiated through one of the RFID interface 258 or the NFC interface 256, a second authentication session may proceed through the other interface only after the first authentication session completes. In an embodiment, a given authentication code A[ ], B[ ] is only sent through one of the RFID interface 258 or the NFC interface 256. For example, a given authentication code A[ ] is only sent through one of the two interfaces during an authentication session, and only that one interface participates in the authentication session at any given time.

Figure 2E:
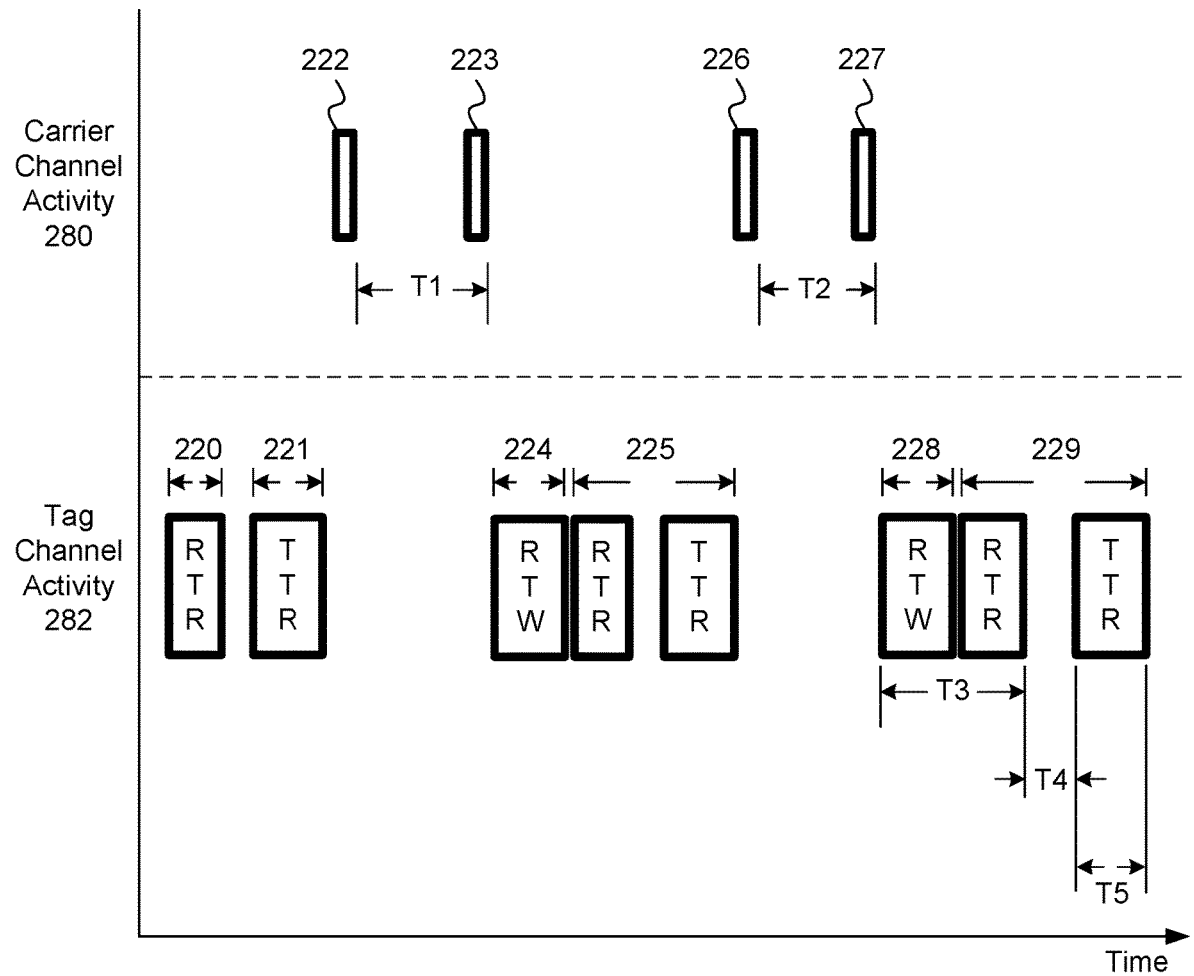
FIG. 2E illustrates communication channel activity during an exemplary authentication session, in accordance with an embodiment.

FIG. 2E illustrates communication channel activity during an exemplary authentication session, in accordance with an embodiment. As shown, communication channel activity includes carrier channel activity 280 and tag channel activity 282. In this context, a channel refers to an abstract communications channel, with transmission of data through the channel shown as a rectangular region spanning a non-zero amount of time (not to scale).

Carrier channel activity 280 includes data frames transmitted to a data network (e.g., data network 246 of FIG. 2B, FIG. 5B, or FIG. 6A) and data frames received from the data network. The data frames comprise communication between the reader device 214 and the authentication server(s) 216.

Data frames for authentication protocol 210 are shown in the carrier channel activity 280; however additional data frames (not shown) may also be transmitted in the carrier channel as well. In an embodiment, carrier channel activity 280 includes data frames transmitted to and from an LTE mobile carrier data network comprising the data network 246. In another embodiment, carrier channel activity 280 includes WiFi data frames transmitted to and from a WiFi access point comprising the data network 246. As shown, the authentication start request 222 is included in the carrier activity 280, along with a corresponding reply of authentication code A[S] 223. A reply time T1 indicates a time span from the end of transmission of the authentication start request 222 to reception of the authentication code A[S] 223 at the reader device 214. Furthermore, transmission of authentication code B[T] 226 is included in the carrier activity 280, along with a corresponding reply of authentication code package 227. A reply time T2 indicates a time span from the end of transmission of the authentication code B[T] 226 to reception of the authentication code package 227.

Tag channel activity 282 includes data frames transmitted between the reader device 214 and the tag 212. The data frames may be transmitted through an NFC channel, an RFID channel, or any other technically feasible channel. Data frames transmitted from the reader device 214 to the tag 212 are marked as "RTR" for "reader transmitting read" request and "RTW" for "reader transmitting write" request within the tag channel activity 282. Furthermore, data frames transmitted from the tag 212 to the reader device 214 are marked as "TTR" for "tag transmitting response" within the tag channel activity 282. Write acknowledge responses by the tag 212, if specified for by a given communication channel protocol, are not shown.

As shown, the reader device 214 transmits a TagID request 220 to the tag 212, and the tag 212 replies by transmitting a TagID response 221. As described in conjunction with authentication protocol 210, the reader device 214 then transmits authentication start request 222 to the authentication server 216 to obtain authentication code A[S] 223. The reader device 214 then transmits authentication code A[S] 224 (using a write request, indicated as RTW) to the tag 212.

While certain embodiments may provide dedicated data frame types for the authentication protocol within the NFC channel, the present description assumes that the reader device 214 performs read requests to obtain authentication codes from the tag 212. Hence, the reader device 214 transmits a read request to the tag 212 (indicated as "RTR" within a time span for authentication code B[T] 225), and the tag 212 replies by transmitting the authentication code B[T] 225 (indicated as "TTR"). With special data frame types for the disclosed authentication protocols, the reader device 214 need not perform a read request to obtain authentication code B[T] 225, but instead the tag 212 would transmit authentication code B[T] 225 directly in response to receiving authentication code A[S] 224. The reader device 214 then transmits authentication code B[T] 226 to the authentication server 216 to obtain authentication code package 227 comprising authentication code A[S+1].

In certain embodiments, a reply time (e.g., reply time 230 of FIG. 2A, reply time 450 of FIG. 4A, reply time 540 of FIG. 5A) is measured to detect whether a relay attack is occurring. A relay attack typically employs a genuine tag 212 and a counterfeit tag masquerading as the genuine tag 212. Relaying data (e.g., correct authentication codes A[ ] and B[ ]) between the counterfeit tag and the genuine tag 212 inherently introduces additional delay, which can be detected in the measurement of the reply time 230 by the reader device 214. If the reply time 230 is above a predefined threshold, then a relay attack is positively detected. If a relay attack is detected, then authentication of the tag being assessed by the reader device 214 is determined to be false (not authentic), regardless of whether authentication codes from the tag and the authentication server 216 are equal. Any technically feasible technique may be performed to measure a reply time.

In various embodiments, reply time 230 is measured between the time the reader device 214 transmits authentication code A[S+1] 228 and the time the reader device 214 receives authentication code B[T+1] 229. In a particular embodiment, the reply time 230 is measured from the time the reader device 214 performs a read request to obtain authentication code B[T+1] 229 to the time the tag 212 transmits authentication code B[T+1] 229. Furthermore, a reply time may also be measured between the reader device 214 transmitting authentication code A[S] 224 and the reader device 214 receiving authentication code B[T] 225.

As shown, the reader device 214 transmits authentication code A[S+1] 228 and subsequently transmits a read request for authentication code B[T+1] 229 during time T3. Transmission of authentication code B[T+1] 229 by the tag 212 takes time T5. In one embodiment, time T3 and time T5 are fixed, as defined by physical layer modulation specifications. Time T4 represents a minimal time needed by the tag 212 to reply with authentication code B[T+1] 229, not including transmission of data frames. Time T4 is a function of the design of tag 212 and the time needed to change communication channel direction (in half-duplex configurations) between the reader device 214 and the tag 212. As such, time T4 may also be substantially fixed. In an embodiment, the reply time 230 is measured as the sum of T3+T4+T5. In another embodiment, the reply time 230 is measured as the sum of T3 and T4. In yet another embodiment, the reply time 230 is measured as the sum of T4 and T5. In certain embodiments, the reply time 230 is measured as just time T4.

A time resolution for measuring T3, T4, and/or T5 may be arbitrarily fine. In an embodiment, the time resolution is an integral fraction or multiple of a single carrier cycle time. For example, in an NFC system operating with a 13.56 MHz carrier frequency the time resolution may be one oscillation of 13.56 MHz (~73.75 nanoseconds). In another example, the time resolution may be one half of one oscillation (~36.87 nanoseconds). If the tag channel is a UHF RFID channel, then the time resolution may be multiple carrier cycles. In an embodiment, the time resolution may be independent of the carrier cycles or carrier frequency.

In an embodiment, NFC interface 262 of FIG. 2B includes a counter that is configured to measure time by counting, for example, a number of cycles of a reference clock, a number of carrier cycles, fractional carrier cycles, subcarrier cycles, or modulation symbols. The counter may begin measuring time starting with the first modulated carrier cycle or modulation symbol comprising authentication code A[S+1] 228; and the counter may end measuring time upon NFC interface 262 receiving the first modulated carrier cycle or modulation symbol of authentication code B[T+1] 229. In such an embodiment, reply time 230 is measured as T3+T4. In a different embodiment, reply time 230 is measured as T4, and the counter begins measuring time once transmission of a read request for authentication code B[T+1] is complete; and the counter may end measuring time upon NFC interface 262 receiving the first modulated carrier cycle or modulation symbol of authentication code B[T+1] 229. These and other techniques may be performed to measure reply time. While the reply time 230 may be measured in real time, comparison between B[T+1] and B[S+1] may be performed at an arbitrary time later.

As shown, tag 212 transmits authentication code B[T+1] 229 after receiving a read request for authentication code B[T+1]. In another embodiment, tag 212 calculates authentication code B[T+1] 229 prior to or while receiving authentication code A[S+1] 228; and, upon verifying authentication code A[S+1] 228, the tag 212 immediately (subject to tag channel protocol) transmits authentication code B[T+1] 229. Such embodiments may minimize time T4 to close any potential time window for a practical relay attack.

In various embodiments, authentication of tag 212 is determined to be true (genuine) only when the reader device 214 determines that authentication code B[T+1] 229 is equal to authentication code B[S+1] from authentication code package 227 (or 227A) and that the reply time 230 is less than a predefined threshold. In an embodiment, the tag channel is unidirectional (half-duplex) and the threshold value may be dominated by the time needed to change tag channel direction from the reader device 214 transmitting to the tag 212 transmitting. In another embodiment, the tag channel is bidirectional (full-duplex) and the threshold value may be specified according to an internal processing time of the tag 212 to perform a comparison between A[S+1] and A[T+1] prior to transmitting B[T+1]. In such an embodiment, the internal processing time may be less than ten carrier oscillations of at 13.56 MHz (<one microsecond).

In certain operational settings, a collection of multiple tags may be present within access range of the reader device 214. Anti-collision techniques may be implemented to allow the reader device 214 to communicate directly with each individual tag of the multiple tags. In an embodiment, performing authentication protocol 210, 410, or 510 commences after the reader device 214 performs anti-collision tag discovery and inventory processes to allow for direct access to each tag, unimpeded by access collisions. Direct access to a selected tag of the multiple tags allows for a useful measurement of the reply time 230. Furthermore, the reader device 214 may be configured to authenticate more than one tag of the multiple tags. In an embodiment, the reader device 214 may authenticate the multiple tags and then display results of each tag authentication session. In another embodiment, the reader device 214 may authenticate multiple tags and then transmit an inventory of the authenticated tags to a database configured to track tag location.

Figure 2F:
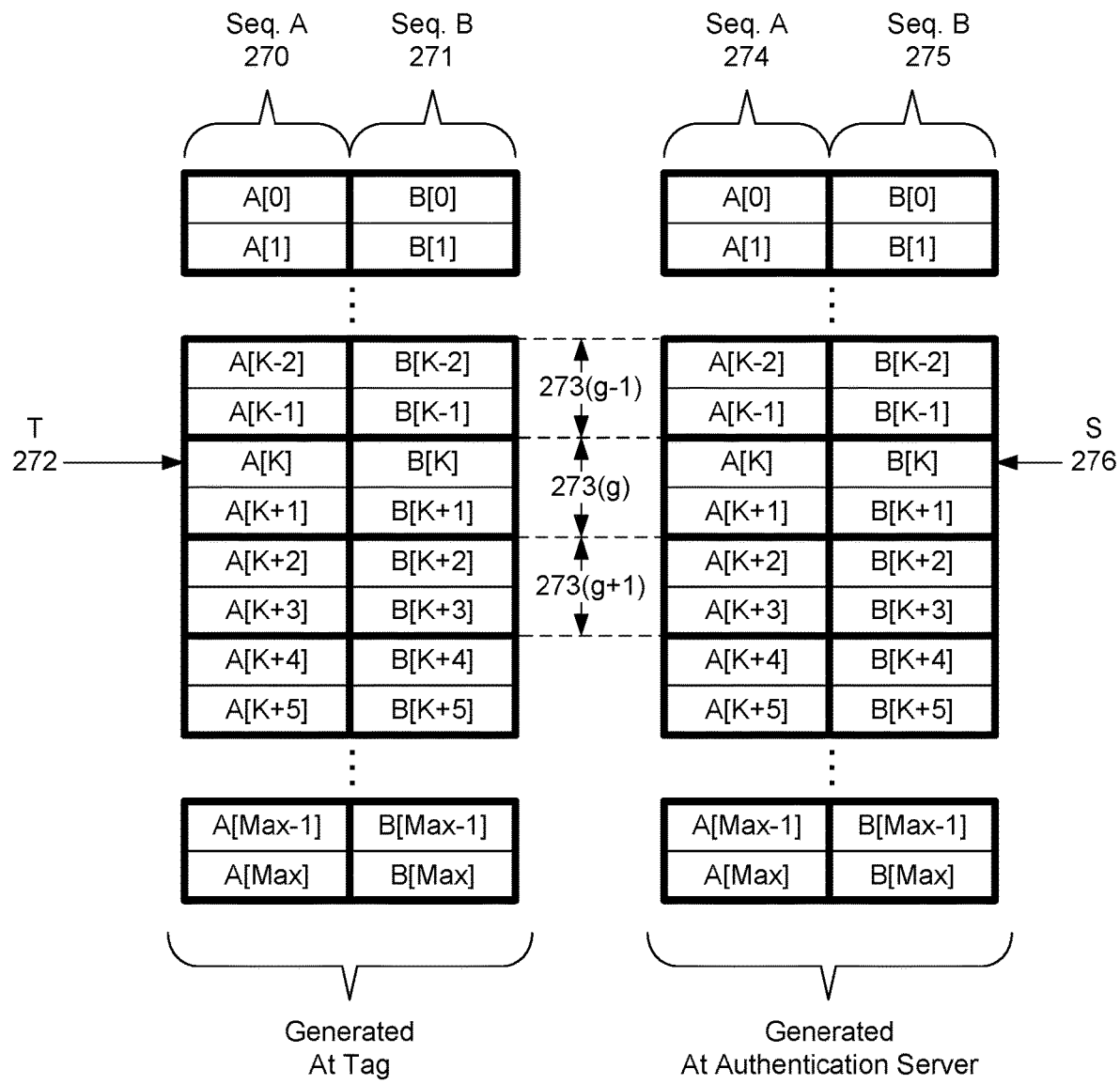
FIG. 2F illustrates authentication code sequences organized as groups of two index values per group, in accordance with an embodiment.

FIG. 2F illustrates authentication code sequences organized as groups 273 of two index values (e.g., K, K+1; and, K+2, K+3, etc.) per group 273, in accordance with an embodiment. The authentication code sequences include a sequence A 270 (for authentication codes A[ ]) and a sequence B 271 (for authentication codes B[ ]), both generated within tag 212 based on tag state data stored in nonvolatile memory 252. The authentication code sequences also include a sequence A 274 (for authentication codes A[ ]) and a sequence B 275 (for authentication codes B[ ]), both generated at the authentication server 216 based on tag state data, which may be stored in tag database 266.

Authentication codes A[ ] of the sequence A 270 are equal to corresponding authentication codes A[ ] of the sequence A 274, and authentication codes B[ ] of sequence B 271 are equal to corresponding authentication codes B[ ] of sequence B 275.

In an embodiment, sequence A 270 (and sequence A 274) is a deterministic but apparently random sequence, and sequence B 271 (and sequence B 275) is a different deterministic but apparently random sequence. In an embodiment, sequence A 270 and sequence B 271 are each derived from a single underlying random sequence. For example, sequence A 270 and sequence B 271 may be derived from even/odd elements of one random sequence function (e.g., from one key). In another embodiment, sequence A 270 and sequence B 271 are each generated from different random sequence functions (e.g., using different keys). In yet another embodiment, sequence A 270 and sequence B 271 are generated by multiplexing multiple different underlying random sequences together (e.g., many keys). For example, sequential elements in sequence A 270 may be generated by multiplexing together different or alternating elements from two or more different underlying random sequences. In various embodiments, one underlying random sequence function, different underlying random sequence functions, and/or multiple different underlying random sequence functions are calculated from the tag state data for the tag 212.

As shown, index T 272 points to authentication code A[K] of sequence A 270, and authentication code B[K] of authentication sequence B 271 within group 273(g). Furthermore, index S 276 points to authentication code A[K] of sequence A 274 and B[K] of sequence B 275, also within group 273(g). With index T equal to index S (T=S=K), A[T] is equal to A[S], B[T] is equal to B[S], A[T+1] is equal to A[S+1], and B[T+1] is equal to B[S+1]. In an embodiment, at the beginning of each authentication session, index T 272 (at tag 212) and index S 276 (at authentication server 216) are equal, with T=T0=S=S0. Furthermore, both index T 272 and index S 276 point to the first members of the same group 273. For example, at the beginning of an exemplary authentication session, index T 272 is assigned to point to first members A[K] and B[K] of group 273(g) and index S 276 is also assigned to point to first members A[K] and B[K] of group 273(g). After completion of the authentication session, T0 is incremented by 2 at the tag 212 and S0 is incremented by 2 at the authentication server 216. At the beginning of a subsequent authentication session, index T 272 may point to first members A[K+2] and B[K+2] of group 273(g+1) and index S 276 may point to first members A[K+2] and B[K+2] of group 273(g+1). If no faults occur, then at the beginning of a new authentication session, both index T0 and index S0 are equal (T0 and S0 are synchronized). Index T 272 is then assigned to the incremented value T0 and index S 276 is assigned to the incremented value of S0, and index T 272 is equal to index S 276 (T and S are equal and synchronized).

In certain embodiments, a fault scenario may occur where the authentication server 216 has incremented the index S0 up by exactly one group 273, while the tag 212 did not increment index T0. This fault scenario may occur, for example, when a data transmission (e.g., authentication code A[S+1] 228) is not successfully transmitted from the authentication server 216 to the tag 212, causing the tag state data at the authentication server 216 (having transmitted authentication code package 227 and updated S0=S0+2) to be one group 273 ahead of the tag state data at the tag 212. This fault scenario may also occur if the tag 212 fails to successfully update T0 by properly completing step 124 of method 110. For example, the tag 212 may be powered down after completing step 123 but prior to the tag 212 completing step 124 of updating T0=T0+2. In such scenarios, the tag 212 may fall out of index synchronization with the authentication server 216 (e.g., T0 no longer equal to S0) by up to one group 273, causing index T 272 and index S 276 to point to different, adjacent groups 273. For example, after the fault scenario, index T 272 may be equal to K and point to group 273(g), while index S 276 may be equal to K+2 and point to group 273(g+1). In such a fault scenario, the tag 212 may authenticate against subsequent group 273(g+1) to resynchronize with the authentication server 216, as disclosed herein with respect to step 119 of method 110.

In an exemplary resynchronization operation performed by the tag 212, a new authentication session begins with index T 272 pointing to first members A[K] and B[K] of group 273(g) and index S 276 pointing to first members A[K+2] and B[K+2] of group 273(g+1). The tag 212 tests both A[T] (i.e., A[K]) and A[T+2] (i.e., A[K+2]) against A[S] (i.e., A[K+2]), as described at step 119 of method 110. In this example, the tag 212 will determine that A[T] is not equal to A[S], but A[T+2] (i.e., A[K+2]) is equal to A[S] (i.e., A[K+2]). The tag 212 may then readily resynchronize with the authentication server 216 without loss of protocol efficiency and without releasing any additional authentication codes that may compromise authentication security of the tag 212. To resynchronize with the authentication server 216, the tag 212 simply updates index T0 and index T 272 to point to the next group 273 (T0=T0+2, T=T+2). Note that a halt in authentication protocol 210 (e.g., loss of power to tag 212, loss of communication at reader device 214, etc) at this point would simply leave tag 212 synchronized with authentication server 216, and a subsequent authentication session would be able to succeed.

In light of the teachings disclosed herein, persons of ordinary skill in the art will recognize that authentication protocol 210 prevents any inappropriate authentication, such as an incorrect authentication of a counterfeit tag. Furthermore, by comparing reply time 230 against an appropriately predefined threshold, a relay attack may be detected and prevented. In certain embodiments, authentication protocol 210 may be extended to include additional iterations of authentication code exchange, as disclosed in FIGS. 3A-4B.

Figure 2G:
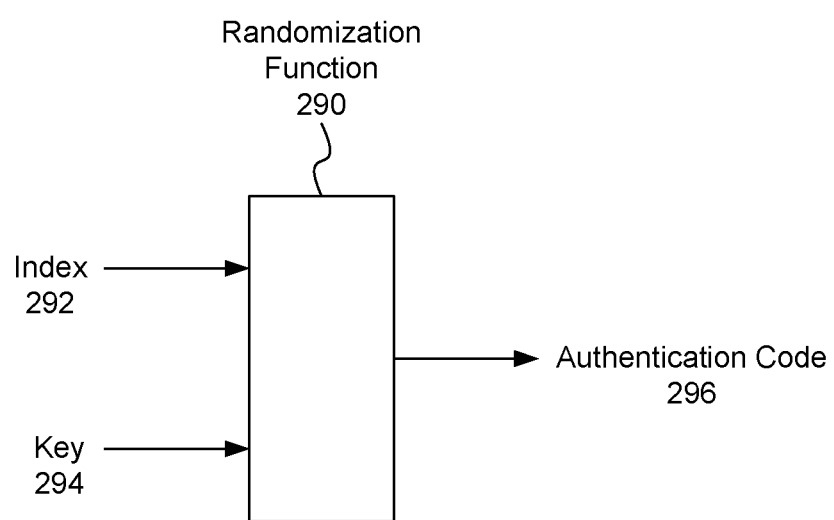
FIG. 2G illustrates a randomization function, in accordance with an embodiment.

FIG. 2G illustrates a randomization function 290, in accordance with an embodiment. As shown, the randomization function 290 receives an index 292 (e.g., index T, index S, index T1, index T2, index S1, index S2) and a key 294 as inputs and generates an authentication code 296 as an output.

In an embodiment, index 292 is assigned to index T and key 294 is assigned to a first key; the randomization function 290 then generates authentication codes A[ ] within the tag 212. To generate authentication codes B[ ], key 294 is assigned to a second key. Analogous operations are performed at the authentication server 216 to generate corresponding authentication codes A[ ] and authentication codes B[ ]. In an embodiment, the tag state data includes the first key and the second key.

In an embodiment, the randomization function 290 implements a cryptographic hash function, such as a hash function of or similar to the well-known SHA-3 family of hash functions and/or component functions thereof. In such an embodiment, the index 292 and the key 294 comprise a hash input message and the authentication code 296 comprises the hash output. Of course, any other techniques may be implemented as a randomization function 290 without departing the scope and spirit of various embodiments. In an embodiment the index 292 comprises at least one-hundred twenty eight bits and the key 294 comprises at least one hundred twenty eight bits. In an embodiment, the sequence generator 254 of FIG. 2B includes circuitry configured to implement at least one randomization function 290. In an embodiment, circuitry for the randomization function 290 is configured within the sequence generator 254 to generate both authentication codes A[ ] and authentication codes B[ ].

Figure 3A:
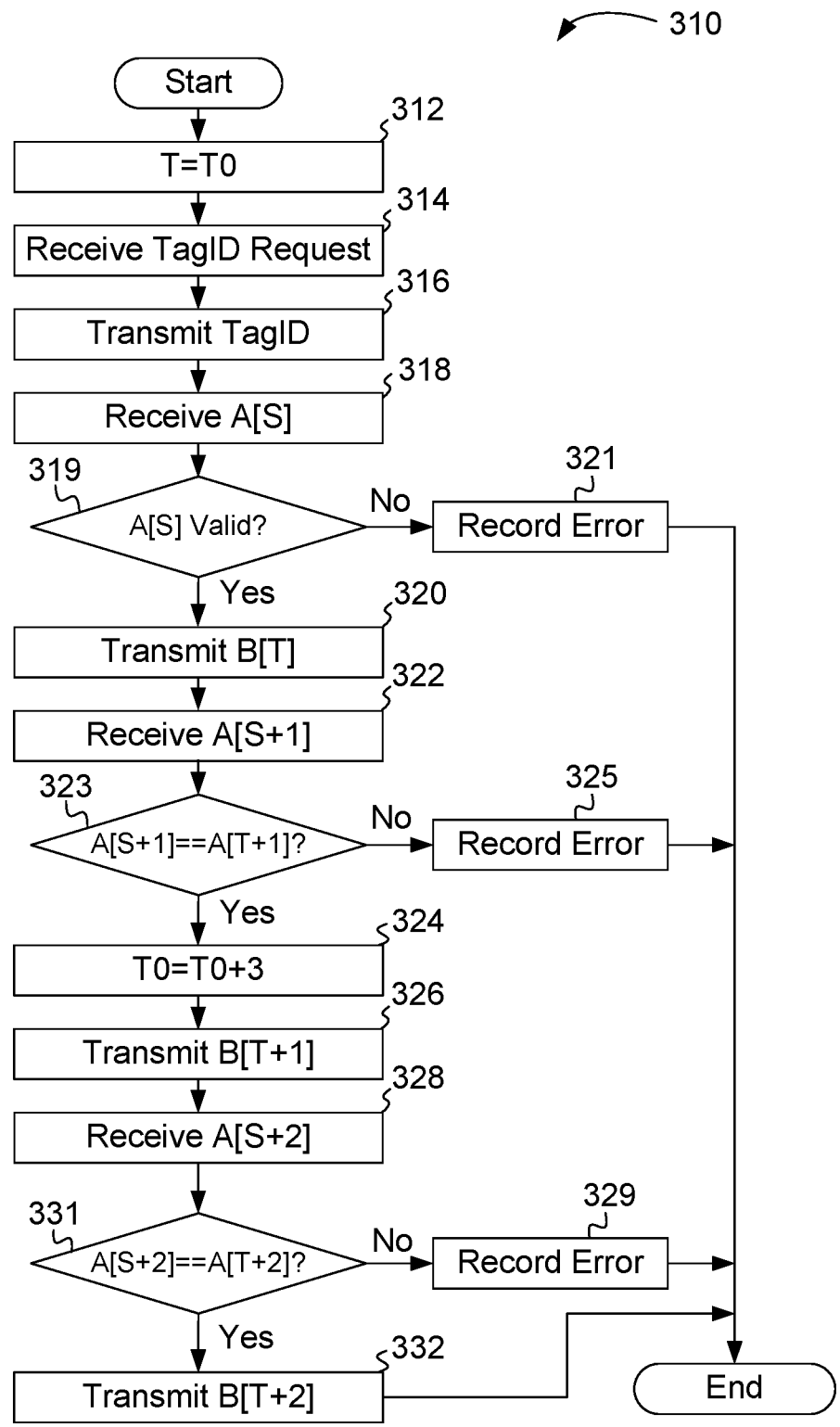
FIG. 3A illustrates a flowchart of a method for a tag device to provide authentication codes, in accordance with an embodiment.

FIG. 3A illustrates a flowchart of a method 310 for a tag 212 to provide authentication codes, in accordance with an embodiment. Although method 310 is described with respect to a tag 212 and the systems disclosed herein, persons of ordinary skill in the art will understand that any circuit or system that performs method 310 is within the scope and spirit of embodiments of the present disclosure. In an embodiment, the tag 212 is configured to implement the method 310. The tag 212 may be configured to implement industry standard NFC communication, RFID communication, any other wireless or wired communication techniques, or any combination thereof.

In an embodiment, the tag 212 enters a fully powered on and operational state prior to performing method 310. Furthermore, the tag 212 may perform channel training and communication initialization prior to performing method 310. In an embodiment, the tag 212 is configured to receive data and transmit data according to standard communication techniques and protocols for NFC and/or RFID tag devices. Communication operations may include, without limitation, receiving and/or responding to requests such as read or write requests, receiving authentication codes, and transmitting authentication codes. The communication operations may be performed between the tag 212 device and the reader device 214. More generally, any communication channel or combination of communication channels (wireless and/or wired) for transmitting and receiving data may be used in the context of method 310.

Method 310 begins at step 312, where the tag 212 initializes temporary code sequence index T to be equal to code sequence index T0. In an embodiment, the tag 212 reads a value for T0 from a nonvolatile memory circuit (e.g., nonvolatile memory 252 of FIG. 2B) configured to store T0. The tag 212 then writes the value of T0 into a memory circuit or register configured to store T.

At step 314, the tag 212 receives a tag identifier (TagID) request. In an embodiment, the TagID request comprises at least one read request, such as a memory read request to a memory space within the tag 212. The TagID may include properties disclosed herein.

At step 316, the tag 212 transmits the TagID for the tag 212. The tag 212 may transmit the TagID using any technically feasible technique.

At step 318, the tag 212 receives authentication code A[S] from the reader device 214. In an embodiment, the authentication code A[S] is generated by the authentication server 216, which is programmed to include a copy of portions of the tag state data that is also programmed into the tag 212. In an embodiment, the authentication server 216 transmits A[S] to the reader device 214, which then transmits A[S] to the tag 212. The tag 212 may receive the authentication code A[S] using any technically feasible technique.

At step 319, if A[S] is valid then method 310 proceeds to step 320. If A[S] is equal to A[T] then A[S] is valid. In embodiment, the tag 212 is configured to generate A[T] on chip, based on the value of T and the tag state data for the tag 212.

In an embodiment, if A[S] is not equal to A[T], but A[S] is equal to A[T+3] then A[S] is valid and a resynchronization operation is performed as part of step 319 such that T is incremented (e.g., by 3) and T0 is incremented by the same amount (e.g., by 3); upon incrementing T and T0 the method 310 proceeds to step 320. A scenario where A[S] is equal to A[T+3] may occur if a certain type of communication error occurs or if the tag 212 looses power before completing an update of T0. In an embodiment, the tag 212 may perform a resynchronization operation comprising incrementing T=T+3 and T0=T0+3, as discussed herein. The resynchronization operation may be performed without loss of authentication codes to a potential attack, and without involvement of the reader device or the authentication server.

Authentication codes A[ ] function to establish trust by the tag 212, for one authentication session, that the tag 212 is communicating with an authentic authentication server 216 (through the reader device 214). In this context, the tag 212 does not initially trust the reader device 214 or the authentication server 216 prior to determining that A[S] is equal to A[T]. After determining that A[S] is equal to A[T], the tag 212 trusts the authentication server 216 for the purpose of advancing authentication, but the authentication server 216 does not yet trust the tag 212.

At step 320, the tag 212 transmits authentication code B[T] to the reader device 214. The tag 212 may transmit the authentication code B[T] using any technically feasible technique. For example, the reader device 214 may perform a read request operation on the tag 212, and the tag 212 may reply to the read request by transmitting B[T] as read data. Authentication codes B[ ] function to establish trust by the authentication server 216, for one authentication session, that the authentication server 216 is communicating with an authentic tag 212.

At step 322, the tag 212 receives authentication code A[S+1]. As with receiving A[S], any technically feasible technique may be used to receive the authentication code A[S+1].

At step 323, if A[S+1] is determined to be equal to A[T+1] then method 310 proceeds to step 324. For the method 310 and the corresponding authentication protocol to reach this point, the tag 212 and the authentication server 216 must be in agreement and consequently may trust the other to be authentic in the context of one authentication session.

At step 324, the tag 212 increments index T0 in on-chip nonvolatile memory (e.g. nonvolatile memory 252). By waiting until after the tag 212 receives a valid value for authentication code A[S+1] to increment index T0, the tag 212 cannot be attacked in a way that causes a loss of synchronization between the tag 212 and the authentication server 216 by more than one authentication session (in this context, S0 can only exceed T0 by a value of 3, which represents one authentication session). Furthermore, the authentication server 216 cannot be attacked in a way that causes loss of synchronization by more than one authentication session. Loss of synchronization by one authentication session may be easily detected and the disclosed resynchronization operation (in this context, T=T+3, T0=T0+3) may be performed to resynchronize T0 and S0. By sequencing the exchange of authentication codes in this way, no additional authentication codes can be revealed by the tag 212 or the authentication server 216 that could lead to a false positive when authenticating a different or counterfeit tag.

At step 326, the tag 212 transmits authentication code B[T+1]. Any technically feasible technique may be used to transmit B[T+1]. At step 328, the tag 212 receives authentication code A[S+2]. Any technically feasible technique may be used to receive A[S+2].

At step 331, if A[S+2] is determined to be equal to A[T+2] then method 310 proceeds to step 332. For the method 310 and the corresponding authentication protocol to reach this point, the tag 212 and the authentication server 216 must be in agreement (mutually authenticated). At step 332, the tag 212 transmits authentication code B[T+2]. The method 310 then terminates.

Returning to step 319, in an embodiment, if A[S] is not valid then method 310 proceeds to step 321. In an embodiment, if A[S] is not equal to A[T] and A[S] is not equal to A[T+3] then A[S] is not valid. Comparing A[S] to A[T+3] allows the tag 212 to determine whether a resynchronization operation is necessary.

At step 321, the tag may record that an error has occurred. For example, the tag may implement an error counter in nonvolatile memory that is configured to increment at step 321. The error counter may be read through a read request from the reader device 214, or otherwise configured to indicate an error count. In an embodiment, the error counter may be configured to indicate whether a certain threshold number of errors encountered in total and/or subsequent to a previous successful authentication session. In another embodiment, a value from the error counter is encoded in B[T] or concatenated with B[T] and transmitted along with B[T] at step 320. In an embodiment, the method 310 terminates after the error is recorded.

Returning to step 323, if A[S+1] is not equal to A[T+1] then method 310 proceeds to step 325. At step 325, the tag 212 may record that an error has occurred. Recording the error may be conducted similarly to recording the error at step 321. In an embodiment, the method 310 terminates after the error is recorded.

Returning to step 331, if A[S+2] is not equal to A[T+2] then method 310 proceeds to step 329. At step 329, the tag 212 may record that an error has occurred. Recording the error may be conducted similarly to recording the error at step 321. In an embodiment, the method 310 terminates after the error is recorded.

While method 310 is described with respect to tag 212, the method 310 may also be performed by an authentication circuit (e.g. authentication circuit 610 of FIG. 6A) manufactured into any reader device 214 or any other system (e.g., a mobile device, a smart phone, a general computing platform) without departing the scope and spirit of various embodiments. In an embodiment, the authentication circuit performs method 310 to authenticate an authentication server 216 prior to the reader device 214 or system using the authentication server 216 (e.g., to then separately authenticate a tag 212).

Figure 3B:
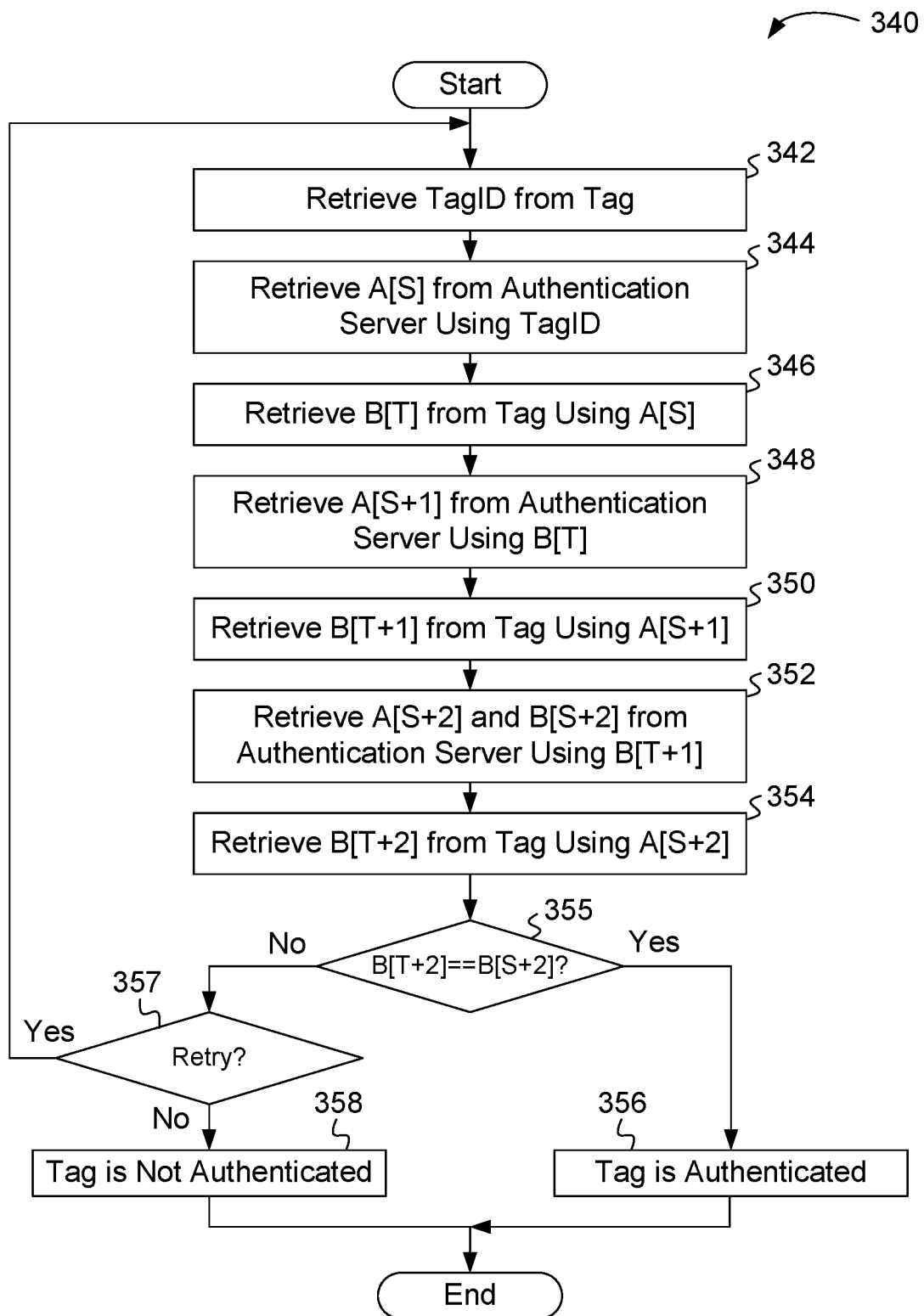
FIG. 3B illustrates a flowchart of a method for authenticating a tag device using a reader device and an authentication server, in accordance with an embodiment.

FIG. 3B illustrates a flowchart of a method 340 for authenticating a tag 212 using a reader device 214 and an authentication server 216, in accordance with an embodiment. Although method 340 is described with respect to the systems disclosed herein, persons of ordinary skill in the art will understand that any circuit or system that performs method 340 is within the scope and spirit of embodiments of the present disclosure. In an embodiment, reader device 214 is configured to perform the method 340. In an embodiment, the reader device 214 may be configured to implement industry standard NFC communication, RFID communication, any other wireless communication techniques, or any combination thereof for communicating with a tag 212. Furthermore, the reader device 214 may be configured to implement industry standard wireless data communications, such as through long-term evolution (LTE) cellular wireless data communications, WiFi (IEEE 802.11 standard suite) data communications, or any other technically feasible data networking technique for communication with an authentication server 216 (e.g., located in a geographically distant data cloud).

In an embodiment, the reader device 214 powers the tag 212 into an operational state prior to performing method 340. The reader device 214 may perform channel training and communication initialization prior to performing method 340. Furthermore, the reader device 214 may authenticate the authentication server 216 prior to performing method 340. The reader device 214 may use any technically feasible technique or techniques to authenticate the authentication server 216. Receiving data such as authentication codes and transmitting data such as authentication codes may be performed between the reader device 214 and the tag 212 using any technically feasible techniques. More generally, any communication channel (wireless or wired) for transmitting and receiving data may be used in the context of method 340.

Method 340 begins at step 342, where the reader device 214 retrieves a TagID from the tag 212. In an embodiment, the reader device 214 may retrieve the TagID by transmitting a read operation to the tag 212, and the tag 212 may reply by transmitting read data comprising the TagID to the reader device 214. In certain embodiments, the reader device 214 may perform multiple read operations to retrieve a TagID value that includes more bits than a single native read operation for a particular implementation or communication standard. At step 344, the reader device 214 retrieves an authentication code A[S] from the authentication server 216 using the TagID. To retrieve the authentication code A[S], the reader device 214 transmits the TagID to the authentication server 216 and subsequently receives authentication code A[S] back from the authentication server 216. In an embodiment, the reader device 214 communicates with the authentication server 216 through a data network, such data network 246.

At step 346, the reader device 214 retrieves authentication code B[T] from the tag 212 using the authentication code A[S]. The reader device 214 may perform any technically feasible communication techniques to retrieve authentication code B[T] using authentication code A[S]. For example, the reader device 214 may write A[S] to the tag 212 at a first memory address or address range and subsequently read a second memory address or address range to obtain B[T]. The first address and the second address may be different addresses or the same address, with A[S] transmitted to the tag 212 when the address is written and B[T] returned when the address is read. In certain embodiments, a communications protocol between the reader device 214 and the tag 212 may be performed that explicitly defines, without limitation, transmission of authentication codes A[ ] and B[ ]; such embodiments may provide transmission of authentication codes as a separate type of operation from read and write operations.

At step 348, the reader device 214 retrieves authentication code A[S+1] from the authentication server 216 using B[T]. At step 350, the reader device 214 retrieves authentication code B[T+1] from the tag 212 using A[S+1]. At step 352, the reader device 214 retrieves authentication codes A[S+2] and B[S+2] from the authentication server 216 using B[T+1]. At step 354, the reader device 214 retrieves B[T+2] from the tag using A[S+2].

In an embodiment, the reader device 214 receives both A[S+2] and B[S+2] from the authentication server 216 in response to transmitting B[T+1] to the authentication server 216. In other embodiments, the reader device 214 waits until after step 354 completes to retrieve the authentication code B[S+2] from the authentication server 216.

At this point, the reader device 214 has authentication code B[T+2] from the tag 212 and authentication code B[S+2] from the authentication server 216. Both B[T+2] and B[S+2] are independently generated using secretly held tag state data, including indices T (from T0) at the tag 212 and S (from S0) at the authentication server 216. The reader device 214 does not need to have any secret data held by the tag 212 or the authentication server 216 to authenticate the tag 212; indeed, the reader device 214 needs only compare the two independently generated authentication codes B[T+2] and B[S+2] to be able to authenticate the tag 212.

At step 355, if authentication code B[T+2] is equal to authentication code B[S+2], then the method 340 proceeds to step 356. As described herein, one or more additional conditions may be applied when authenticating the tag 212. For example, if a relay attack is detected (B[T+2] and B[S+2] are equal, but a measured reply time such as reply time 450 of FIG. 4A exceeds a predefined threshold), then the tag 212 is not authenticated and the method 340 may instead proceed directly to step 358.

At step 356, the reader device 214 determines the tag 212 to be authenticated. The reader device 214 may perform various actions with respect to the tag 212 being authenticated. For example, the reader device 214 may display a message on a display screen indicating that the tag 212 has been authenticated. The reader device 214 may retrieve product information about a product associated with the tag 212 and display the product information in conjunction with the message. Any technically feasible techniques may be used to retrieve the product information. In an embodiment, the product information includes an image of the product. The image may include a product name and may further include a brand name, a serial number, and so forth. In an embodiment, the product information may be displayed by opening a web browser with a URL as part of the product information. The user may further interact with the web page after the web page is displayed in the web browser. The method 340 then terminates.

Returning to step 355, if authentication code B[T+2] is not equal to authentication code B[S+2], then the method 340 proceeds to step 357. In an embodiment, if the reply time 450 is exceeded then the method 340 proceeds to step 357.

At step 357, if a retry should be performed then the method 340 proceeds back to step 342. A retry may be performed, for example if a communications failure occurred between the reader device 214 and the tag 212, causing an erroneous read of B[T+2]. Such a condition would prevent a proper comparison between authentication code B[T+2] and authentication code B[S+2]. Error correction codes may be used in conjunction with transmitting one or more authentication codes from the tag to the reader device to reduce the occurrence of such errors. In another embodiment, the authentication server 216 may perform a resynchronization operation by rolling back S0 to a previous step (e.g., by assigning S0=S0−2). In such an embodiment, if a resynchronization operation is performed at the authentication server 216, then an additional authentication session (retry) may be required for a valid authentication of the tag 212. The additional authentication session then retires any potentially observed authentication codes exchanged between the reader device 214 and the tag 212.

Returning to step 357, if a retry should not be performed then method 340 proceeds to step 358. In an embodiment, a retry should not be performed if a number of retry cycles (additional iterations through steps 342 to step 357) has been attempted and failed. The method 340 then terminates. At step 358, the tag 212 is deemed to be not authenticated by the reader device 214. The reader device 214 may perform various actions with respect to the tag authentication failure. For example, the reader device may display a message on a display screen indicating that the tag 212 authentication failed. Furthermore, the reader device may report the authentication failure to the authentication server 216 or to a different server responsible for recording authentication failures.

In an embodiment, the reader device 214 is manufactured to include an authentication circuit (e.g., authentication circuit 610 of FIG. 6A) that is configured to perform method 340 to authenticate the authentication server 216 (e.g., prior to authenticating tag 212). In such an embodiment, successfully authenticating the authentication circuit in step 356 indicates successful authentication of the authentication server 216 because the authentication circuit within the reader device is known to be authentic and authentication codes B[T+2] and B[S+2] agree.

Figure 3C:
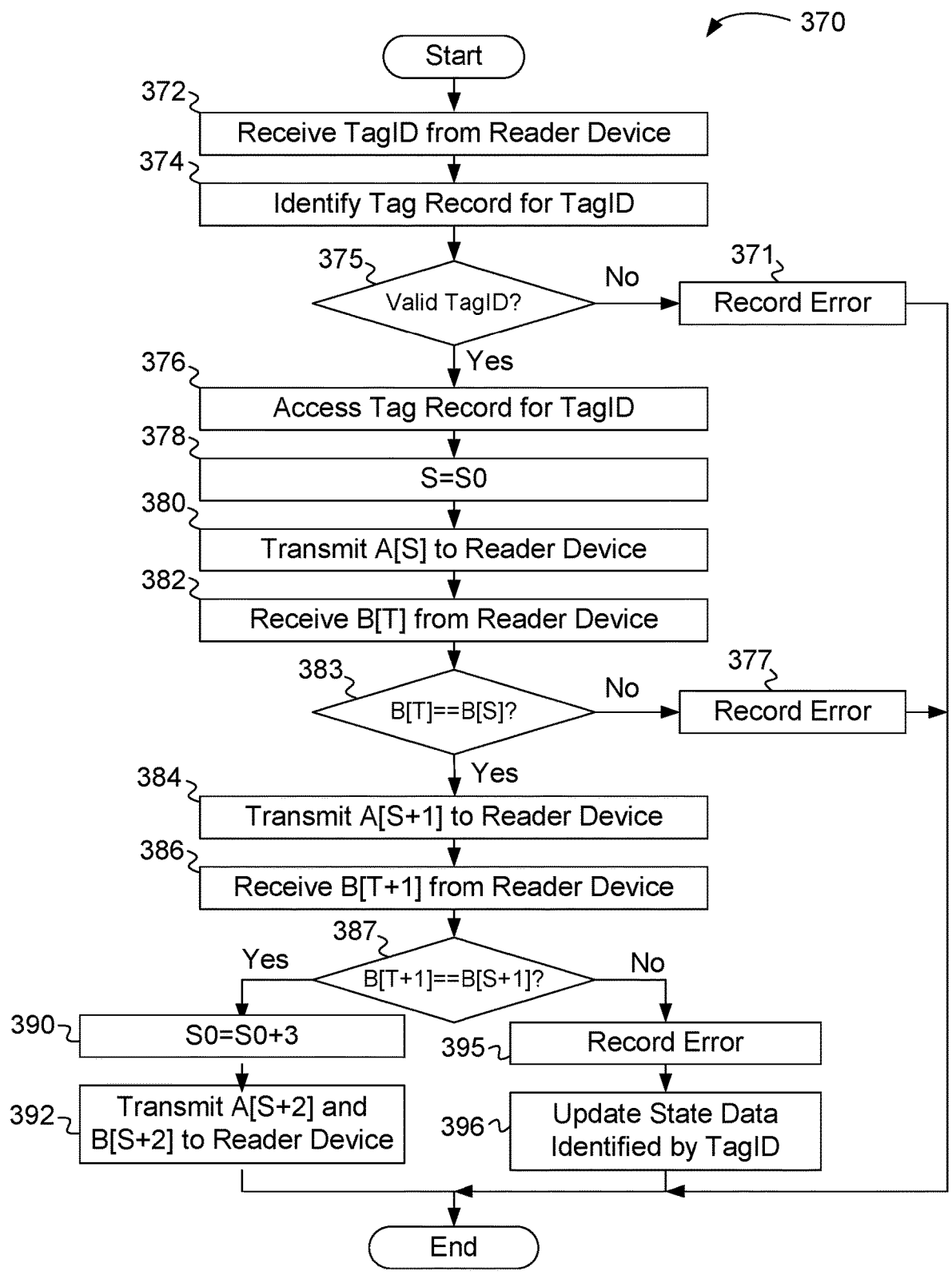
FIG. 3C illustrates a flowchart of a method for an authentication server to authenticate a tag device, in accordance with an embodiment.

FIG. 3C illustrates a flowchart of a method 370 for an authentication server 216 to authenticate a tag 212, in accordance with an embodiment. Although method 370 is described with respect to the systems described herein, persons of ordinary skill in the art will understand that any circuit or system that performs method 370 is within the scope and spirit of embodiments of the present disclosure. In an embodiment, a computer server system is configured to function as the authentication server 216 and perform method 370. The computer server system may comprise one or more processing subsystem and one or more nonvolatile storage subsystems.

Method 370 begins at step 372, where the authentication server 216 receives a TagID from reader device 214. Receiving the TagID may comprise an implicit or explicit request to initiate an authentication session with the authentication server 216. In an embodiment, the authentication session is for a tag 212 identified by the TagID. In an embodiment, the TagID for the tag 212 is obtained by the reader device 214.

At step 374, the authentication server 216 identifies a tag record for the TagID. In an embodiment, identifying the tag record for the TagID yields a tag record reference to the tag record. The tag record may include, without limitation, tag state data for tag 212 (associated with TagID). Any technically feasible techniques may be performed to identify the tag record for the TagID, and the tag record reference may include a record number, an index, a URL, an address pointer, or any other technically feasible form of data reference. In various embodiments, identifying the tag record for the TagID may include various techniques disclosed herein, other technically appropriate techniques, or any combination thereof.

At step 375, if the TagID is valid then the method 370 proceeds to step 376. In an embodiment, if the TagID is present in an appropriate dictionary data structure and a TagID record is found based on an index from the dictionary data structure, then the TagID is valid; otherwise, the TagID is not valid. In an embodiment, an otherwise valid TagID may be explicitly invalidated, for example when the TagID has been identified with respect to a counterfeit attack. With a valid TagID, the tag state data is available to be accessed by the authentication server 216 and the authentication server 216 can proceed with authenticating the tag 212.

At step 376, the authentication server 216 accesses the tag record for the TagID. The tag record may include tag state data, including a value for code sequence index S0 for the tag identified by the TagID. The tag state data may also include any keys or other inputs to a function for generating authentication codes A[ ] and B[ ] by the authentication server 216.

At step 378, the authentication server initializes temporary code sequence index S to be equal to index S0.

At step 380, the authentication server 216 transmits authentication code A[S] to the reader device 214. Of course, the authentication server 216 generates A[S] based on the tag state data prior to transmitting A[S]. At step 382, the authentication server 216 receives authentication code B[T] from the reader device 214. In an embodiment, B[T] is retrieved from the tag 212 by the reader device 214 and transmitted to the authentication server 216.

At step 383, if B[T] is equal to B[S] then the method 370 proceeds to step 384. At step 384, the authentication server 216 transmits authentication code A[S+1] to the reader device 214. At step 386, the authentication server 216 receives authentication code B[T+1] from the reader device 214. In an embodiment, B[T+1] is retrieved from the tag 212 by the reader device 214 and transmitted to the authentication server 216.

At step 387, if B[T+1] is equal to B[S+1] then the method 370 proceeds to step 390. In this context, if B[T+1] is equal to B[S+1], then the tag 212 has provided a valid authentication code (B[T+1]) to proceed. At step 390, the authentication server 216 updates S0 by assigning S0=S0+3. Once S0 is updated, prior authentication codes become invalid and any previous authentication codes recorded in an attack are not valid for authentication. In certain embodiments, the authentication server 216 may record any presentation of an invalid authentication code as a potential forensic indicator. At step 392, the authentication server 216 transmits A[S+2] and B[S+2] to the reader device 214. In an embodiment, the authentication server 216 transmits A[S+2] and subsequently transmits B[S+2]. In an embodiment, the authentication server 216 waits a specified time duration prior to transmitting B[S+2]. The specified time duration may be defined to exceed a maximum reply time needed for the reader device 214 to retrieve B[T+2] from the tag 212. In another embodiment, the authentication server 216 transmits B[S+2] after the reader device 214 explicitly requests B[S+2] from the authentication server 216.

In other embodiments, B[S+2] is transmitted to the reader device 214 from the authentication server 216 in an overlapping time window with the reader device 214 reading B[T+2]. Any technically feasible technique may be performed to synchronize transmission of B[S+2] and B[T+2]. In certain embodiments, the reader device 214 is configured to wait until receiving B[S+2] before reading B[T+2] from the tag 212. In an embodiment, a reply time 450 of FIG. 4A is measured, and if the reply time 450 exceeds a predefined threshold, then authentication fails. More generally, one or more time windows may be defined for responses between the reader device 214 and the tag 212 as well as the reader device 214 and the authentication server 216. The method 370 then terminates.

Returning to step 375, if the TagID is not valid, then the method 370 proceeds to step 371. At step 371, the authentication server 216 records an error. Recording the error may include creating and/or updating an error record in an error database. In an embodiment, the error record may include, without limitation, all TagID data bits received at the authentication server 216, as well as any additional identifying information, such as an IP address, traceroute information, and/or identifying information for the reader device 214. In certain embodiments, if an invalid TagID or reader device 214 are associated with a threshold number of invalid TagID queries (errors), then a system operator notice is generated (e.g., to trigger a forensic investigation).

Returning to step 383, if B[T] is not equal to B[S] then the method 370 proceeds to step 377. At step 377, the authentication server 216 records an error. Recording the error may include creating and/or updating an error record in an error database. In an embodiment, the error record may include, without limitation, all TagID data bits received at the authentication server 216, an error count, any additional identifying information, such as an IP address, traceroute information, and/or identifying information for the reader device 214. Furthermore, in certain embodiments, an error count for a particular TagID or reader device 214 above a first specified threshold may generate a message to a system operator (e.g., to trigger a forensic investigation). In certain embodiments, an error count for a particular TagID above a second specified threshold may cause further authentication requests for the TagID or reader device 214 to be declined or deemed invalid (e.g., at step 375).

Returning to step 387, if B[T+1] is not equal to B[S+1] then the method 370 proceeds to step 395. At step 395, the authentication server 216 records an error. Recording the error may include creating and/or updating an error record in an error database. In an embodiment, the error record may include, without limitation, all TagID data bits received at the authentication server 216, an error count, any additional identifying information, such as an IP address, traceroute information, and/or identifying information for the reader device 214. Furthermore, in certain embodiments, an error count for a particular TagID or reader device 214 above a first specified threshold may generate a message to a system operator (e.g., to trigger a forensic investigation). In certain embodiments, an error count for a particular TagID above a second specified threshold may cause further authentication requests for the TagID or reader device 214 to be declined (e.g., at step 375). At step 396, the authentication server updates state data (e.g., in the error database) identified for the TagID. The method 370 then terminates.

Any technically feasible technique may be used to receive, and/or transmit authentication codes and other data (e.g., TagID, A[S], B[T], etc.). For example, the authentication server 216 may transmit and/or receive the data through a data network (e.g., data network 246), with the data packaged as one or more Internet Protocol (IP) packets.

In certain embodiments, updating the state data comprises rolling back S0 to a value of S0-3 once to permit a valid authentication to completed to resynchronize S0 with T0 stored at the tag. In such embodiments, the tag 212 is not configured to resynchronize with the authentication server 216 (e.g., by testing whether A[S] is equal to A[T+3]). In certain embodiments, when authentication server 216 performs a resynchronization, the tag 212 is deemed to be not authenticated until a subsequent authentication session succeeds. In an embodiment, either the tag 212 or the authentication server 216 (not both) is configured to perform resynchronization. The subsequent authentication session may be initiated by the reader device 214.

In certain embodiments, authentication requests are distributed among two or more instances of the authentication server 216 using load distribution techniques. In an embodiment, a given authentication server 216 instance may be configured to authenticate all known valid TagIDs. In another embodiment, authentication requests are distributed among authentication server 216 instances based on a TagID subfield, and one or more different possible values for the TagID subfield has an associated set of one or more authentication server 216 instances configured to authenticating TagID values having one of the one or more different TagID subfield values. In practice, all authentication requests having a specific TagID subfield value (e.g., a specific brand name) may be directed to the one or more authentication server 216 instances configured to authenticate the specific TagID subfield value. In this way, a large cluster of authentication servers 216 may be scaled according to both overall authentication demand as well as authentication demand for specific subsets of tag devices. Separately, storage of tag state data may be similarly structured, with different datasets partitioned, for example, according to TagID subfield values.

In certain embodiments, one or more authentication server 216 instances are scaled according to scaling techniques described herein or according to any other scaling techniques, or any combination thereof.

FIG. 4A illustrates an exemplary authentication protocol 410, in accordance with an embodiment. As shown, a reader device 214 communicates with a tag 212 and with an authentication server 216. Collectively, the reader device 214, the tag 212 and the authentication server 216 perform the authentication protocol 410.

In an embodiment, the authentication protocol 410 is initiated when the reader device 214 transmits a TagID request 420 to the tag 212. The TagID request 420 may be transmitted and/or performed using any technically feasible technique, including transmitting an access request and/or a memory read request to the tag 212. In response to receiving the TagID request 420, the tag 212 transmits a TagID response 421, comprising a TagID for the tag 212. The reader device 214 receives the TagID response 421 from the tag 212 and then transmits the TagID as part of an authentication start request 422 to the authentication server 216.

Upon receiving the authentication start request 422, the authentication server 216 determines whether the TagID is valid. If the TagID is valid, the authentication server 216 transmits an authentication code A[S] 423 to the reader device 214. The reader device 214 receives the authentication code A[S] 423 from the authentication server 216 and forwards A[S] to the tag 212 as authentication code A[S] 424.

In response to receiving the authentication code A[S] 424, the tag 212 determines whether A[S] is valid. If A[S] is valid, then the tag 212 transmits an authentication code B[T] 425 to the reader device 214. In an embodiment, A[S] is valid if A[S] is equal to authentication code A[T], which is calculated within the tag 212. Upon receiving the authentication code B[T] 425 from the tag 212, the reader device 214 forwards B[T] to the authentication server 216 as authentication code B[T] 426.

Upon receiving the authentication code B[T] 426, the authentication server 216 determines whether B[T] is valid. If B[T] is valid, then the authentication server 216 transmits authentication code A[S+1] 427 to the reader device 214. In an embodiment, B[T] is valid if B[T] is equal to authentication code B[S], which is calculated within the authentication server 216.

Upon receiving authentication code A[S+1] 427, the reader device 214 forwards A[S+1] to the tag 212 as authentication code A[S+1] 428. In response to receiving the authentication code A[S+1] 428, the tag 212 determines whether A[S+1] is valid. In an embodiment, A[S+1] is valid if A[S+1] (calculated by the authentication server 216) is equal to A[T+1] (calculated within the tag 212). If A[S+1] is valid, then the tag 212 transmits an authentication code B[T+1] 429 to the reader device 214.

Upon receiving the authentication code B[T+1] 429 from the tag 212, the reader device 214 forwards B[T+1] to the authentication server 216 as authentication code B[T+1] 430.

Upon receiving the authentication code B[T+1] 430, the authentication server 216 determines whether B[T+1] is valid. If B[T+1] is valid, then the authentication server 216 transmits an authentication code package 431 to the reader device 214. In an embodiment, B[T+1] is valid if B[T+1] is equal to authentication code B[S+1], which is calculated within the authentication server 216. In an embodiment, the authentication server 216 transmits authentication codes A[S+2] and B[S+2] in the authentication code package 431. In another embodiment, the authentication server 216 transmits authentication codes A[S+2] and B[S+2] separately, with A[S+2] transmitted in authentication code package 431 and B[S+2] transmitted later in authentication code package 431A.

Upon receiving A[S+2], the reader device 214 forwards A[S+2] to the tag 212 as authentication code A[S+2] 432. In response to receiving the authentication code A[S+2] 432, the tag 212 determines whether A[S+2] is valid. In an embodiment, A[S+2] is valid if A[S+2] (calculated by the authentication server 216) is equal to A[T+2] (calculated within the tag 212). If A[S+2] is valid, then the tag 212 transmits an authentication code B[T+2] 433 to the reader device 214.

In an embodiment, the reader device 214 measures a reply time 450, which characterizes the time taken by the tag 212 to respond to receiving authentication code A[S+2] 432 with a reply of authentication code B[T+2] 433. The measurement of reply time 450 may start with the reader device 214 transmitting the authentication code A[S+2] 432 and end with the reader device 214 receiving the authentication code B[T+2] 433. Measuring a reply time such as reply time 450 is described in the discussion of FIG. 2E.

Upon receiving authentication codes B[T+2] and B[S+2], reader device 214 compares authentication code B[T+2], received from the tag 212, with authentication code B[S+2], received from the authentication server 216. In an embodiment, if B[T+2] is equal to B[S+2], then authentication for the tag 212 is determined to be true (authentic); otherwise, authentication is false (not authentic). In certain embodiments, if B[T+2] is equal to B[S+2], and if the measured reply time 450 is less than a predefined threshold, then authentication for the tag 212 is determined to be true (authentic); otherwise, authentication is false (not authentic).

In an embodiment, authentication codes A[S], A[S+1], A[S+2], B[S], B[S+1], and B[S+2] are calculated from tag state data stored at the authentication server 216 and authentication codes A[T], A[T+1], A[T+2], B[T], B[T+1], and B[T+2] are calculated from tag state data stored at the tag 212. Furthermore, reply time 450 may be measured by the reader device 214. One advantageous feature of the disclosed authentication protocol 410 is the reader device 214 does not need to store or otherwise contain any authentication codes or keys beyond temporary authentication codes A[ ] and B[ ], which represent nonces generated and only used for one authentication session. Instead, the reader device 214 needs only observe that the tag 212, which is programmed with secret tag state data, agrees with the authentication server 216, which also possesses the same secret tag state data for the tag 212. Such agreement can be determined by comparing B[T+2] from the tag 212 with B[S+2] from the authentication server 216. The reader device 214 may restrict reply time 450 to be less than the predefined threshold. If the reply time 450 hits or exceeds the predefined threshold, then a relay attack is occurring, which would cause the reader device 214 to make a determination that the tag 212 is not authentic. A relay attack may present equal values of B[T+2] and B[S+2] to the reader device 214 because authentication codes from an authentic tag 212 are being surreptitiously relayed to the reader device 214; however the reply time 450 will exceed the predefined threshold because the relay operations add additional, measurable reply time.

In an embodiment, to perform authentication protocol 410, the tag 212 performs the method 310 of FIG. 3A, the reader device 214 performs method 340 of FIG. 3B, and the authentication server 216 performs method 370 of FIG. 3C.

In an embodiment, the reader device 214 may be manufactured to include an authentication circuit (e.g., authentication circuit 610 of FIG. 6A) configured to behave as a tag for the purpose of allowing the reader device 214 to authenticate the authentication server 216 prior to authenticating tag 212 (e.g., an product tag external to the reader device 214). In such an embodiment, the reader device 214 first performs the authentication protocol 410 (or authentication protocol 210 of FIG. 2A) with the authentication circuit serving as a tag to verify the authentication server 216. Next, the reader device 214 performs the authentication protocol 410 with the tag 212. In such an embodiment, communication with the authentication circuit may be performed using conductive electrical signaling within the reader device 214 rather than wireless signaling. In certain embodiments, after the authentication server 216 is authenticated by the reader device 214, the authentication server 216 may then provide additional authentication credentials for authenticating an additional server system; for example, the additional server system may be configured to provide transaction services or other secure web-based services requiring authentication prior to use.

Figure 4B:
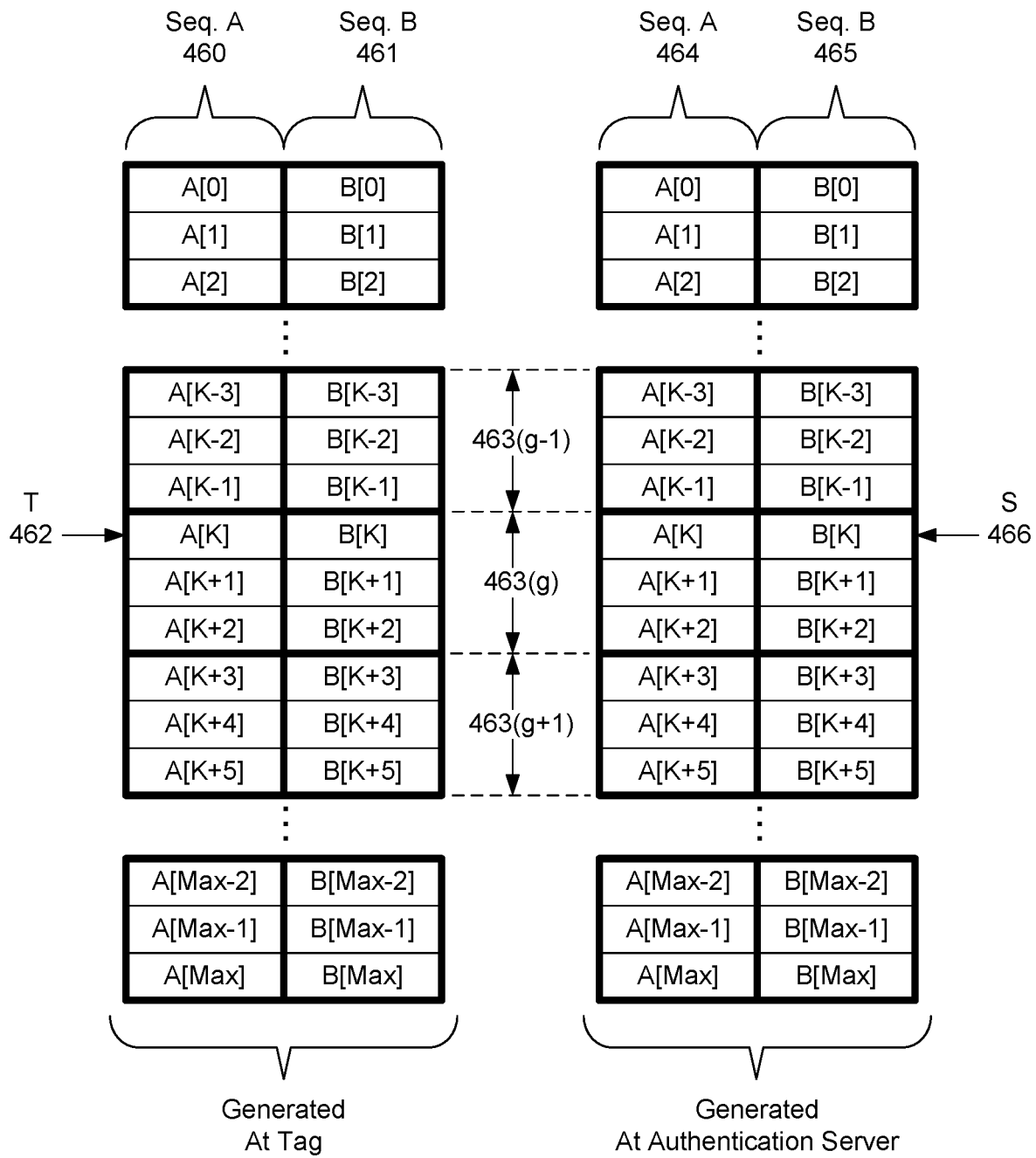
FIG. 4B illustrates authentication code sequences organized as groups of three index values per group, in accordance with an embodiment.

FIG. 4B illustrates authentication code sequences organized as groups 463 of three index values (e.g., K, K+1, K+2; and K+3, K+4, K+5, etc.) per group 463, in accordance with an embodiment. The authentication code sequences include a sequence A 460 (for authentication codes A[ ]) and a sequence B 461 (for authentication codes B[ ]), both generated within tag 212 based on tag state data stored in nonvolatile memory 252. The authentication code sequences also include a sequence A 464 (for authentication codes A[ ]) and a sequence B 465 (for authentication codes B[ ]), both generated at the authentication server 216 based on tag state data, which may be stored in tag database 266.

Authentication codes A[ ] of the sequence A 460 are equal to corresponding authentication codes A[ ] of the sequence A 464, and authentication codes B[ ] of sequence B 461 are equal to corresponding authentication codes B[ ] of sequence B 465.

In an embodiment, sequence A 460 (and sequence A 464) defines a deterministic but apparently random sequence, and sequence B 461 (and sequence B 465) defines a different deterministic but apparently random sequence. In an embodiment, sequence A 460 and sequence B 461 are each derived from a single underlying random sequence. For example, sequence A 460 and sequence B 461 may be derived from even/odd elements of a one underlying random sequence function. In another embodiment, sequence A 460 and sequence B 461 are each generated from different random sequence functions. In yet another embodiment, sequence A 460 and sequence B 461 are generated by multiplexing multiple different underlying random sequences together. For example, sequential elements in sequence A 460 may be generated by multiplexing together different elements from two or more different underlying random sequences. In various embodiments, the one underlying random sequence function, the different underlying random sequence functions, and/or the multiple different underlying random sequence functions are calculated from the tag state data for the tag 212.

As shown, an index T 462 points to authentication code A[K] of sequence A 460, and authentication code B[K] of authentication sequence B 461 within group 463($g$). Furthermore, an index S 466 points to authentication code A[K] of sequence A 464 and B[K] of sequence B 465, also within group 463($g$). With index T 462 equal to index S 466 (T=S=K), A[T] is equal to A[S], B[T] is equal to B[S], A[T+1] is equal to A[S+1], and B[T+1] is equal to B[S+1]. In an embodiment, at the beginning of each authentication session, index T0 and index S0 are equal. As such, index T 462 and index S 466 are equal, and T=T0=S=S0. Furthermore, both index T 462 and index S 466 point to the first members of the same group 463. For example, at the beginning of an exemplary authentication session, index T 462 is assigned to point to first members A[K] and B[K] of group 463($g$) and index S 466 is also assigned to point to first members A[K] and B[K] of group 463($g$). After completion of the authentication session, T0 is incremented by 3 (i.e., the number of codes in each group 463) at the tag 212 and S0 is incremented by 3 at the authentication server 216. At the beginning of a subsequent authentication session, index T 462 may point to first members A[K+3] and B[K+3] of group 463($g$+1) and index S 466 may point to first members A[K+3] and B[K+3] of group 463($g$+1). If no faults occur, then at the beginning of a new authentication session, both index T 462 and index S 466 are equal (synchronized).

A fault scenario may occur where the authentication server 216 has incremented the index S0 up by exactly one group 463 (e.g., S0=S0+3), while the tag 212 did not increment index T0. This fault scenario may occur, for example, when a data transmission (e.g., authentication code A[S+1] 428) is not successfully transmitted from the authentication server 216 to the tag 212, causing the tag state data at the authentication server 216 (having transmitted authentication code package 427 and updated S0=S0+3) to be one group 463 ahead of the tag state data at the tag 212. This fault scenario may also occur if the tag 212 fails to successfully update T0 by properly completing step 324 of method 310. For example, the tag 212 may be powered down after completing step 320 but prior to the tag 212 completing step 324 of updating T0=T0+3. In such scenarios, the tag 212 may fall out of index synchronization with the authentication server 216 (e.g., T0 no longer equal to S0), causing index T 462 and index S 466 to point to different, adjacent groups 463. For example, after the fault scenario, index T 462 may be equal to K and point to group 463($g$), while index S 466 may be equal to K+3 and point to group 463($g$+1). In such fault scenarios, the tag 212 may authenticate against a subsequent group 463 to resynchronize with the authentication server 216, as disclosed herein with respect to step 319 of method 310.

In an exemplary resynchronization operation performed by the tag 212, a new authentication session begins with index T 462 pointing to first members A[K] and B[K] of group 463($g$) and index S 466 pointing to first members A[K+3] and B[K+3] of group 463($g$+1). The tag 212 tests both A[T] (i.e., A[K]) and A[T+3] (i.e., A[K+3]) against A[S] (i.e., A[K+3]), as described at step 319 of method 310. In this example, the tag 212 will determine that A[T] is not equal to A[S], but A[T+3] (i.e., A[K+3]) is equal to A[S] (i.e., A[K+3]). The tag 212 may then readily resynchronize with the authentication server 216 without loss of protocol efficiency and without releasing any additional authentication codes that may compromise authentication security of the tag 212. To resynchronize with the authentication server 216, the tag 212 simply updates index T0 and index T 462 to point to the next group 463 (T0=T0+3, T=T+3).

In light of the teachings disclosed herein, persons of ordinary skill in the art will recognize that authentication protocol 410 prevents any inappropriate authentication (e.g., of a counterfeit tag). Furthermore, by comparing reply time 450 against an appropriately predefined threshold, a relay attack may be detected and prevented.

Figure 5A:
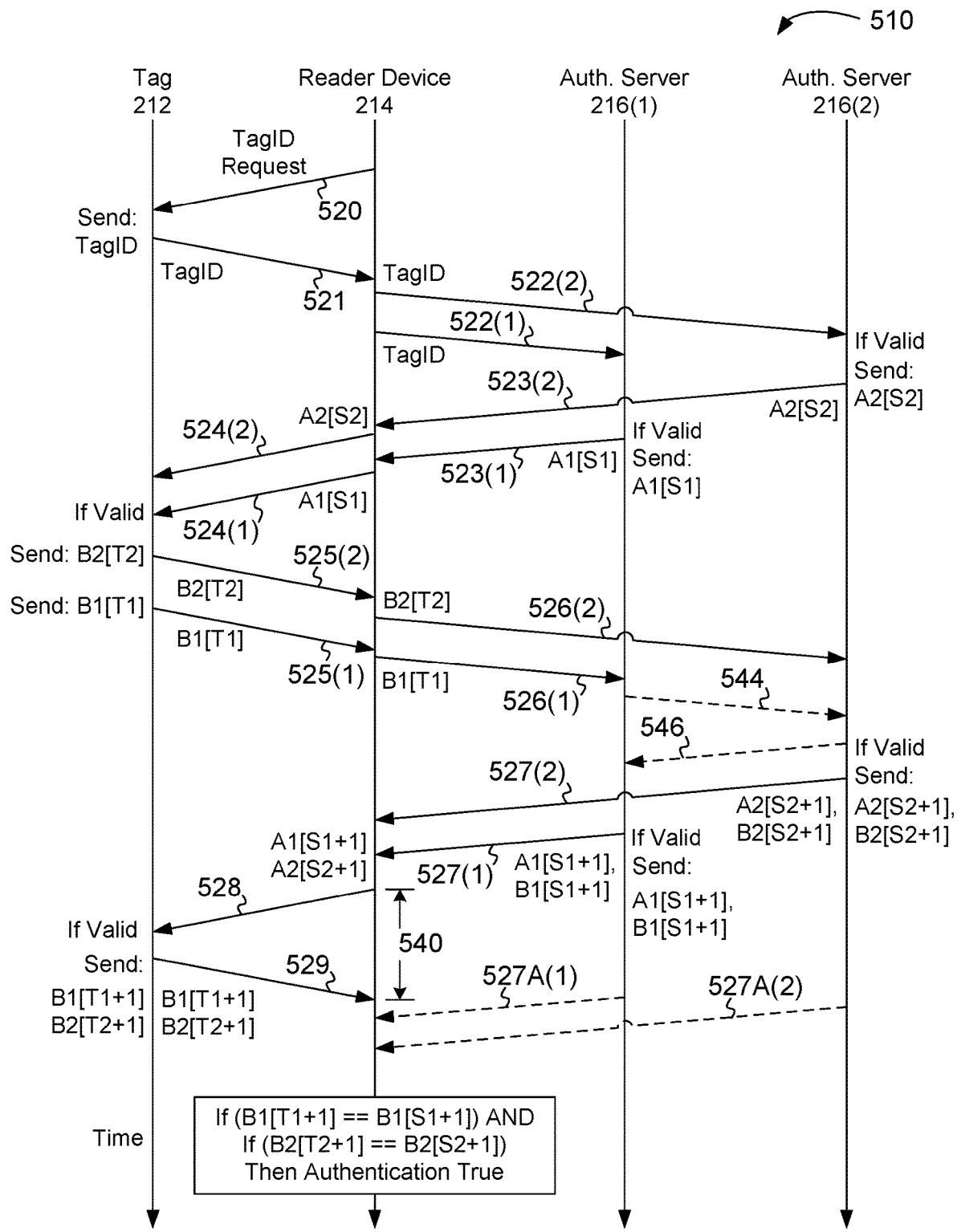
FIG. 5A illustrates an authentication protocol involving two different authentication servers, in accordance with an embodiment.

FIG. 5A illustrates an authentication protocol 510 involving two different authentication servers 216(1), 216(2), in accordance with an embodiment. As shown, a reader device 214 communicates with a tag 212 and with authentication servers 216(1), 216(2). Collectively, the reader device 214, the tag 212 and the authentication servers 216(1), 216(2) perform the authentication protocol 510. In light of the present disclosure, persons of ordinary skill in the art will understand that the authentication protocol 510 may be extended to include an arbitrary number of authentication servers 216.

Requiring a tag 212 to authenticate against two or more authentication servers 216 may allow different entities to control and monitor the same product tags. For example, an authentication service may operate authentication server 216(1), while a distinct product brand entity may operate authentication server 216(2). The authentication service may exercise monitoring and control over every valid tag, while the product brand may exercise monitoring and control over each product tag associated with their brand. Additionally, multiple independent product brands may operate different, independent instances of authentication server 216(2), each configured to authenticate tags for a specific product brand, while the authentication service may authenticate all licensed tags over multiple product brand licensees.

In an embodiment, the authentication protocol 510 is initiated when the reader device 214 transmits a TagID request 520 to the tag 212. The TagID request 520 may be transmitted and/or performed using any technically feasible technique, including transmitting an access request and/or a memory read request to the tag 212. In response to receiving the TagID request 520, the tag 212 transmits a TagID response 521, comprising a TagID for the tag 212. The reader device 214 receives the TagID response 521 from the tag 212 and then transmits the TagID (or a subfield thereof) as part of an authentication start request 522(1) to the authentication server 216(1) and another authentication start request 522(2) to the authentication server 216(2).

In an embodiment, the TagID may include two different subfields. A first subfield of the TagID is transmitted with authentication start request 522(1) and second subfield of the TagID is transmitted with authentication start request 522(2). Alternatively, the same TagID may be transmitted in both authentication start request 522(1) and authentication start request 522(2).

Furthermore, the tag 212 may include two different, independent sets of tag state data; one set of the tag state data is used by the tag 212 to generate a first set of authentication codes A1[T1], B1[T1], A1[T1+1], and B1[T1+1] for authentication with authentication server 216(1), and a second set of the tag state data is used by the tag 212 to generate a second set of authentication codes A2[T2], B2[T2], A2[T2+1], and B2[T2+1] for authentication with authentication server 216(2). In an embodiment, the first set of authentication codes and the second set of authentication codes define different, non-equivalent sequences of authentication codes (e.g., sequence A1[ ] not equal to sequence A2[ ], and sequence B1[ ] not equal to sequence B2[ ]). Furthermore, authentication server 216(1) is configured to only generate the first set of authentication codes (A1[S1], B1[S1], A1[S1+1], and B1[S1+1]) and the authentication server 216(2) configured to only generate the second set of authentication codes (A2[S2], B2[S2], A2[S2+1], and B2[S2+1]). Authentication codes A1[ ] and A2[ ] function analogously with respect to authentication codes A[ ] described herein, and authentication codes B1[ ] and B2[ ] function analogously with respect to authentication codes B[ ] described herein.

In an embodiment, the tag 212 generates the first set of authentication codes (A1[ ], B1[ ]) based on the first set of tag state data and an index T1 (functionally analogous to index T), which may be initially assigned to an index T01 (functionally analogous to index T0). The authentication server 216(1) generates a corresponding first set of authentication codes based on a local copy of the first set of tag state data and an index S1 (functionally analogous to index S), which may be initially assigned to an index S01 (functionally analogous to index S0). The tag 212 also generates the second set of authentication codes (A2[ ], B2[ ]) based on the second set of tag state data and an index T2 (functionally analogous to index T), which may be initially assigned to an index T02 (functionally analogous to index T0). The authentication server 216(2) generates a corresponding second set of authentication codes based on a local copy of the second set of tag state data and an index S2 (functionally analogous to index S), which may be initially assigned to an index S02 (functionally analogous to index S0).

Upon receiving the authentication start request 522(1), the authentication server 216(1) determines whether the TagID (or subfield thereof) is valid. If the TagID is valid, the authentication server 216(1) transmits an authentication code A1[S1] 523(1) to the reader device 214. The reader device 214 receives the authentication code A1[S1] 523(1) from the authentication server 216(1) and forwards A1[S1] to the tag 212 as authentication code A1[S1] 524(1). Similarly, upon receiving the authentication start request 522(2), the authentication server 216(2) determines whether the TagID (or subfield thereof) is valid. If the TagID is valid, the authentication server 216(2) transmits an authentication code A2[S2] 523(2) to the reader device 214. The reader device 214 receives the authentication code A2[S2] 523(2) from the authentication server 216(2) and forwards A2[S2] to the tag 212 as authentication code A2[S2] 524(2).

In response to receiving the authentication code A1[S1] 524(1), the tag 212 determines whether A1[S1] is valid. If A1[S1] is valid, then the tag 212 transmits an authentication code B1[T1] 525(1) to the reader device 214. In an embodiment, A1[S1] is valid if A1[S1] is equal to an authentication code A1[T1], which is calculated within the tag 212. Similarly, in response to receiving the authentication code A2[S2] 524(2), the tag 212 determines whether A2[S2] is valid. If A2[S2] is valid, then the tag 212 transmits an authentication code B2[T2] 525(2) to the reader device 214. In an embodiment, A2[S2] is valid if A2[S2] is equal to an authentication code A2[T2], which is calculated within the tag 212. In an embodiment, authentication codes A1[S1] and A2[S2] must both be determined to be valid by the tag 212 before the tag 212 transmits authentication codes B1[T1] 525(1) and B2[T2] 525(2) to the reader device 214. In an embodiment, the tag 212 may reply with an error code (e.g., a reserved code value, an error bit/flag being set, etc.) if the reader device 214 attempts to read a memory value for B1[T1] or B2[T2] prior to both A1[S1] and A2[S2] being received by the tag 212 and determined to be valid by the tag 212.

Upon retrieving the authentication code B1[T1] 525(1) from the tag 212, the reader device 214 forwards B1[T1] to the authentication server 216(1) as authentication code B1[T1] 526(1). Additionally, upon retrieving the authentication code B2[T2] 525(2) from the tag 212, the reader device 214 forwards B2[T2] to the authentication server 216(2) as authentication code B2[T2] 526(2).

Upon receiving the authentication code B1[T1] 526(1), the authentication server 216(1) determines whether B1[T1] is valid. If B1[T1] is valid, then the authentication server 216(1) transmits an authentication code package 527(1) to the reader device 214. In an embodiment, B1[T1] is valid if B1[T1] is equal to authentication code B1[S1], which is calculated within the authentication server 216(1). In an embodiment, the authentication server 216(1) transmits authentication codes A1[S1+1] and B1[S1+1] in the authentication code package 527(1). In another embodiment, the authentication server 216(1) transmits authentication codes A1[S1+1] and B1[S1+1] separately, with A1[S1+1] transmitted in authentication code package 527(1) and B1[S1+1] transmitted later in authentication code package 527A(1).

Similarly, upon receiving the authentication code B2[T2] 526(2), the authentication server 216(2) determines whether B2[T2] is valid. If B2[T2] is valid, then the authentication server 216(2) transmits an authentication code package 527(2) to the reader device 214. In an embodiment, B2[T2] is valid if B2[T2] is equal to authentication code B2[S2], which is calculated within the authentication server 216(2). In an embodiment, the authentication server 216(2) transmits authentication codes A2[S2+1] and B2[S2+1] in the authentication code package 527(2). In another embodiment, the authentication server 216(2) transmits authentication codes A2[S2+1] and B2[S2+1] separately, with A2[S2+1] transmitted in authentication code package 527(2) and B2[S2+1] transmitted later in authentication code package 527A(2).

Upon receiving A1[S1+1], the reader device 214 forwards A1[S1+1] to the tag 212 as authentication code A1[S1+1] as part of an authentication code package 528. Similarly, upon receiving A2[S2+1], the reader device 214 forwards A2[S2+1] to the tag 212 as part of the authentication code package 528. In an embodiment, the reader device 214 waits until receiving both A1[S1+1] and A2[S2+1] prior to sending authentication code package 528, which may include both A1[S1+1] and A2[S2+1].

In response to receiving the authentication code A1[S1+1] in authentication code package 528, the tag 212 determines whether A1[S1+1] is valid. In an embodiment, A1[S1+1] is valid if A1[S1+1] (calculated by the authentication server 216(1)) is equal to A1[T1+1] (calculated within the tag 212). Similarly, in response to receiving the authentication code A2[S2+1] in the authentication code package 528, the tag 212 determines whether A2[S2+1] is valid. In an embodiment, A2[S2+1] is valid if A2[S2+1] (calculated by the authentication server 216(2)) is equal to A2[T2+1] (calculated within the tag 212).

In an embodiment, if A1[S1+1] is valid and if A2[S2+1] is valid, then the tag 212 transmits an authentication code B1[T1+1] and an authentication code B2[T2+1] within the authentication code package 529 to the reader device 214.

In an alternative embodiment, if A1[S1+1] is valid, then the tag 212 transmits an authentication code B1[T1+1] within a first authentication code package 529 to the reader device 214; separately, if A2[S2+1] is valid, then the tag 212 transmits an authentication code B2[T2+1] within a second authentication code package 529 to the reader device 214.

In an embodiment, the reader device 214 measures a reply time 540, which characterizes the time taken by the tag 212 to respond to receiving authentication code package 528. The measurement of reply time 540 may start with the reader device 214 transmitting the authentication code package 528 and end with the reader device 214 receiving the authentication package 529. Measuring and using a reply time such as reply time 540 is described in greater detail in the discussion of FIG. 2E.

In an embodiment, A1[S1+1] and A2[S2+1] are transmitted together in one authentication code package 528, authentication code B1[T1+1] and B2[T2+1] are transmitted together within the authentication code package 529, and reply time 540 is measured according the discussion of FIG. 2E. In another embodiment authentication codes A1[S1+1] and A2[S2+1] are transmitted in separate authentication code packages 528, authentication code B1[T1+1] and B2[T2+1] are transmitted in separate authentication code packages 529, and reply time 540 is measured twice (once for A1[S1+1] to B1[T1+1], and once for A2[S2+1] to B2[T2+1]). In such an embodiment, both reply times 540 are required to be within respective predefined reply time thresholds for the tag 212 to be determined by the reader device 214 to be authentic.

In an embodiment, the authentication server 216(1) may transmit the authentication code package 527A(1) after a maximum threshold for the reply time 540 or upon receiving a separate request (not shown) from the reader device 214. Similarly, in an embodiment, the authentication server 216(2) may transmit authentication code package 527A(2) after the maximum threshold for the reply time 540 or upon receiving a separate request (not shown) from the reader device 214.

In an embodiment, authentication server 216(1) transmits a token 544 to authentication server 216(2) upon determining B1[T1] to be valid. The authentication server 216(2) may similarly transmit a token 546 to authentication server 216(1) upon determining B2[T2] is valid. In an embodiment, the TagID (or a portion thereof) for tag 212 is transmitted as part of token 544 and/or token 546. The tokens 544, 546 may facilitate mutual monitoring among authentication servers 216.

Upon receiving authentication codes B1[T1+1], B1[S1+1], B2[T2+1], and B2[S2+1], reader device 214 compares authentication code B1[T1+1], received from the tag 212, with authentication code B1[S1+1], received from the authentication server 216(1). The reader device 214 also compares authentication code B2[T2+1], received from the tag 212, with authentication code B2[S2+1], received from the authentication server 216(2). In an embodiment, if B1[T1+1] is equal to B1[S1+1] and B2[T2+1] is equal to B2[S2+1], then tag authentication is true; otherwise, authentication is false. In certain embodiments, the measured reply time 450 must be less than a predefined threshold for authentication to true. If the measured reply time 450 exceeds the predefined threshold then the authentication is deemed to be false (e.g., because a relay attack is detected).

One advantageous feature of the disclosed authentication protocol 510 is the reader device 214 does not need to store or otherwise contain any authentication codes or keys beyond temporary authentication codes A[ ] and B[ ], which represent nonces generated and only used for one authentication session. Instead, the reader device 214 needs only observe that the tag 212, which is programmed with secret tag state data, agrees with the authentication server 216, which also possesses the same secret tag state data for the tag 212. Such agreement can be determined by comparing authentication codes received from the tag 212 with authentication codes received from the authentication server 216. Furthermore, authentication protocol 510 provides for multiple different authentication servers 216, which may provide different entities control and monitoring of product tags.

Figure 5B:
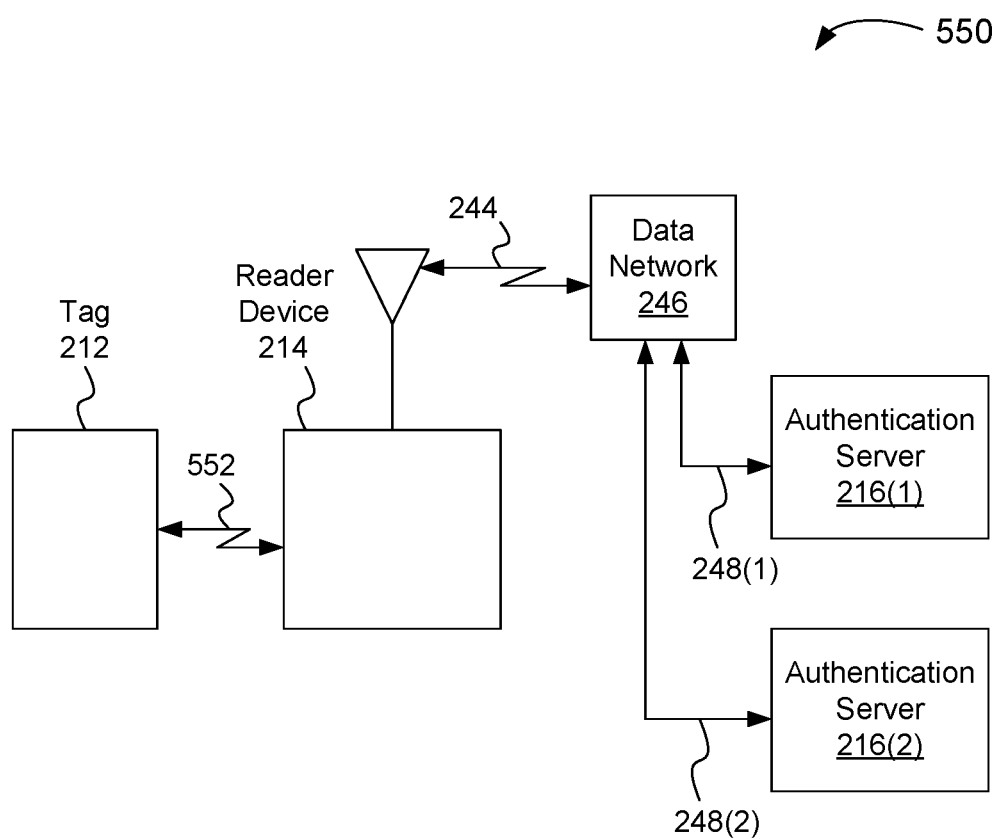
FIG. 5B illustrates an exemplary authentication system comprising two different authentication servers, in accordance with an embodiment.

FIG. 5B illustrates an exemplary authentication system 550 comprising two different authentication servers 216(1) and 216(2), in accordance with an embodiment. As shown, the reader device 214 is in communication with the tag 212 through a tag channel 552, and the reader device 214 is in communication with the authentication servers 216(1), 216(2) through wireless data connection 244 and data network 246. In an embodiment, the tag channel 552 comprises an NFC communications channel. In another embodiment, the tag channel 552 comprises an RFID communications channel. In an embodiment the authentication system 550 is configured to perform authentication protocol 510.

Figure 5C:
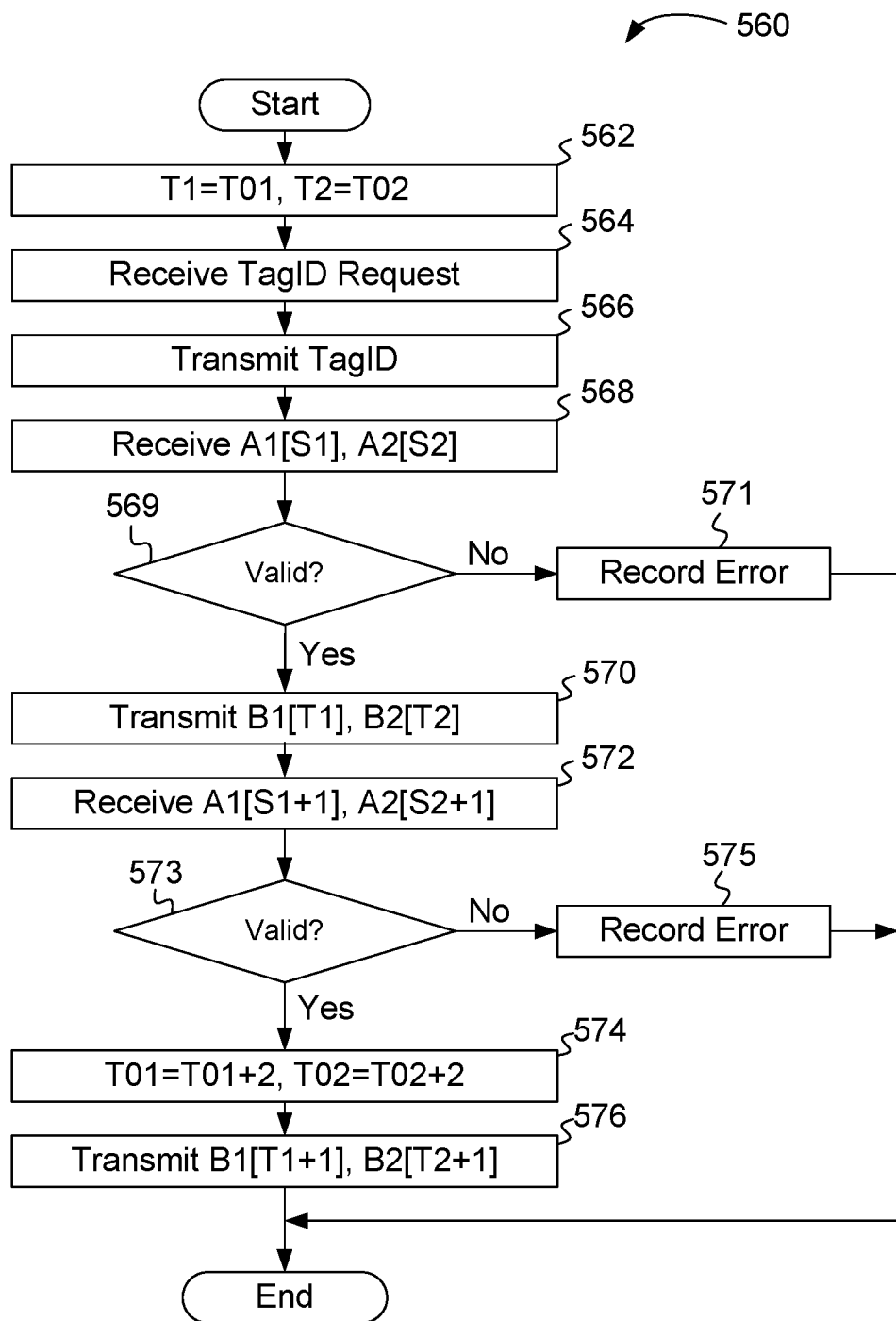
FIG. 5C illustrates a flowchart of a method for a tag to provide authentication codes involving two different authentication servers, in accordance with an embodiment.

FIG. 5C illustrates a flowchart of a method 560 for tag 212 to provide authentication codes involving two different authentication servers 216(1), 216(2), in accordance with an embodiment. Although method 560 is described with respect to tag 212 and the systems disclosed herein, persons of ordinary skill in the art will understand that any circuit or system that performs method 560 is within the scope and spirit of embodiments of the present disclosure. In an embodiment, the tag 212 is configured to implement the method 560. The tag 212 may be configured to implement industry standard NFC communication, RFID communication, any other technically feasible wireless or wired communication standard, or any combination thereof.

In an embodiment, the tag 212 enters a fully powered on and operational state prior to performing method 560. Furthermore, the tag 212 may perform channel training and communication initialization prior to performing method 560. In an embodiment, the tag is configured to receive data and transmit data according to standard communication techniques and protocols for NFC and/or RFD tag devices. Communication operations may include, without limitation, receiving and/or responding to requests such as read or write requests, receiving authentication codes, and transmitting authentication codes. The communication operations may be performed between the tag 212 and the reader device 214. More generally, any communication channel or combination of communication channels (wireless and/or wired) for transmitting and receiving data may be used in the context of method 560.

Method 560 begins at step 562, where the tag 212 initializes temporary code sequence index T1 to be equal to code sequence index T01, and temporary code sequence index T2 to be equal to code sequence index T02. In an embodiment, the tag 212 reads a value for T01 and a value for T02 from the nonvolatile memory 252.

At step 564, the tag 212 receives a tag identifier (TagID) request. In an embodiment, the TagID request comprises at least one read request, such as a memory read request to a memory space within the tag. In an embodiment, the TagID for a given tag is included in tag state data for the tag.

At step 566, the tag 212 transmits the TagID for the tag 212. The tag 212 may transmit the TagID using any technically feasible technique. For example, the tag may transmit the TagID as a reply to the least one read request, with the TagID comprising read data. In certain embodiments, two or more read requests may be performed to transmit a TagID comprising more bits than a single native read operation conveys.

At step 568, the tag receives authentication codes A1[S1] and A2[S2] from the reader device 214. In an embodiment, the authentication codes A1[S1] and A2[S2] are generated by authentication servers 216(1) and 216(2), respectively. In an embodiment, the authentication server 216(1) transmits A1[S1] to the reader device 214, and authentication server 216(2) transmits A2[S2] to the reader device 214. The reader device 214 then transmits A1[S1] and A2[S2] to the tag 212. The tag 212 may receive the authentication codes A1[S1] and A2[S2] using any technically feasible technique. For example, the tag 212 may receive A1[S1] and A2[S2] as write data comprising write operations to a specific, identified, or well-known address or addresses within the tag 212.

At step 569, if A1[S1] is determined to be equal to A1[T1] and A2[S2] is determined to be equal to A2[T2] then the authentication server codes are valid and the method 560 proceeds to step 570. Any technically feasible technique may be performed to determine whether A1[S1] is equal to A1[T1] and that A2[S2] is equal to A2[T2]. In embodiment, authentication codes A1[T1] and A2[T2] are generated on chip within the tag 212, based on the tag state data and the values of T1 and T2, respectively. At this point, T1=T01 and T2=T02 at the tag 212, S1=S01 at the authentication server 216(1), and S2=S02 at the authentication server 216(2). Authentication codes A1[ ], A2[ ] function to establish trust by the tag 212, for one authentication session, that the tag 212 is communicating with authentic authentication servers 216(1), 216(2). In this context, the tag 212 does not initially trust the reader device 214 or the authentication servers 216 prior to determining that the authentication server codes are valid. After determining that the authentication server codes are valid the tag 212 trusts the authentication servers 216(1), 216(2) for the purpose of advancing authentication, but authentication servers 216(1), 216(2) do not yet trust the tag 212 to be authentic.

In an embodiment, if A1[S1] is not equal to A1[T1], but A1[S1] is equal to A1[T1+2] then T1 is incremented by 2, T01 is incremented by 2, and authentication code A1[S1] is determined to be valid (as a consequence of resynchronization). Furthermore if A2[S2] is not equal to A2[T2], but A2[S2] is equal to A2[T2+2] then T2 is incremented by 2, T02 is incremented by 2, and authentication code A2[S2] is determined to be valid (as a consequence of resynchronization). If both A1[S1] and A2[S2] are determined to be valid then the method 560 proceeds to step 570. In general T1 may be a different value than T2 and the tag 212 may maintain independent synchronization with each authentication server 216(1), 216(2). However, the disclosed techniques will only permit a given authentication server 216 to advance by one authentication session beyond corresponding tag state data for the tag 212, thereby allowing the tag 212 to successfully perform a resynchronize operation with a respective authentication server 216.

At step 570, the tag 212 transmits authentication codes B1[T1] and B2[T2] to the reader device 214. The tag 212 may transmit the authentication codes B1[T1] and B2[T2] using any technically feasible technique. At step 572, the tag 212 receives authentication codes A1[S1+1] and A2[S2+1]. Any technically feasible technique may be used to receive the authentication codes A1[S1+1] and A2[S2+1].

At step 573, if A1[S1+1] is determined to be equal to A1[T1+1] and A2[S2+1] is determined to be equal to A2[T2+1] then the authentication codes A1[S1+1] and A2[S2+1] are valid and the method 560 proceeds to step 574. For the method 560 to reach this point, the tag 212 and the authentication servers 216(1), 216(2) must be in agreement and consequently may trust the other to be authentic in the context of one authentication session.

At step 574, the tag 212 increments index T01 and T02 in the nonvolatile memory 252. By waiting until after the tag 212 receives valid authentication codes A1[S1+1] and A2[S2+1] to increment index T01 and T02, the tag 212 cannot be attacked in a way that causes a loss of synchronization between the tag 212 and the authentication servers 216 by more than one authentication session (S01 can only exceed T01 by a value of 2, and S02 can only exceed T02 by a value of 2). Furthermore, the authentication server cannot be attacked in a way that causes loss of synchronization by more than one authentication session.

At step 576, the tag 212 transmits authentication codes B1[T1+1] and B2[T2+1]. Any technically feasible technique may be used to transmit the authentication codes. In an embodiment, the method 576 terminates after transmitting the authentication codes.

Returning to step 569, in an embodiment, if the authentication codes A1[S1] and A2[S2] are not valid then method 560 proceeds to step 571. At step 571, the tag may record that an error has occurred. For example, the tag may implement error counter(s) in nonvolatile memory 252 configured to increment at step 571. The error counter(s) may be read through a read request (e.g., by a reader device), or otherwise configured to indicate an error count. In an embodiment, the method 560 terminates after the error is recorded.

Returning to step 573, if A1[S1+1] is not valid or A2[S2+1] is not valid then method 560 proceeds to step 575. At step 575, the tag may record that an error has occurred. Recording the error may be conducted similarly to recording the error at step 571. In an embodiment, the method 560 terminates after the error is recorded.

While method 560 is described with respect to tag 212, the method 560 may also be performed by an authentication circuit (e.g., authentication circuit 610 of FIG. 6A) manufactured into any reader device 214 or any other system (e.g., a mobile device, a smart phone, a general computing platform, a server system, a remote sensor or control system, etc.) without departing the scope and spirit of various embodiments. In an embodiment, the authentication circuit performs method 560 to authenticate an authentication server 216 prior to the reader device 214 (or other system) using the authentication server 216 (e.g., to then separately authenticate tag 212).

Authentication protocol 510 and method 560 provide for execution of concurrent authentication sessions, which may reduce overall authentication time for a given number of different authentication sessions. In an alternative embodiment, the tag 212 may be configured to sequentially perform two (or more) different authentication sessions with the two (or more) different authentication servers 216(1) and 216(2). In each authentication session, an authentication protocol (e.g., authentication protocol 210, authentication protocol 410) is performed to authenticate the tag 212 using a corresponding authentication server 216. In such an alternative embodiment, the tag 212 may, for example, perform a modified version of method 110 where T is assigned to T01 for a first authentication session with the authentication server 216(1). Subsequently, T is assigned to T02 for a second authentication session with the authentication server 216(2). The reader device 214 may indicate to the tag 212 whether to use T01 and associated tag state data or T02 and associated tag state data. In an embodiment, the tag 212 is only considered to be authentic if each different authentication session determines that the tag 212 is authentic.

Figure 6A:
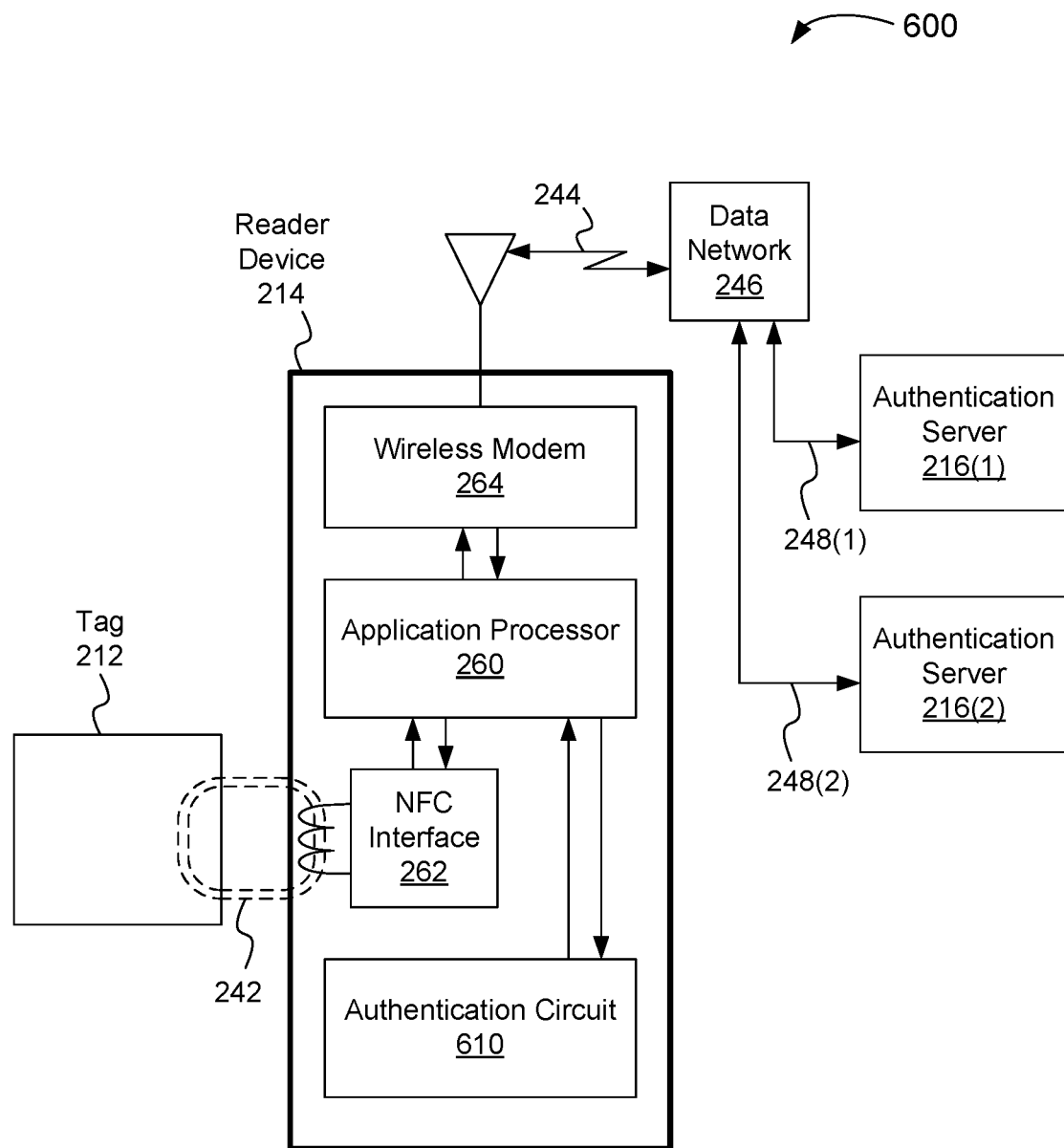
FIG. 6A illustrates an authentication system in which a first system is configured to mutually authenticate a second system, in accordance with an embodiment.

FIG. 6A illustrates an authentication system 600 in which a first system is configured to mutually authenticate a second system, in accordance with an embodiment. In an embodiment, the first system comprises the reader device 214 and the second system comprises the authentication server 216(1) and/or authentication server 216(2). As shown, the reader device 214 includes an authentication circuit 610, configured to perform at least one of method 110 of FIG. 1A, method 310 of FIG. 3A, or method 560 of FIG. 5C. In an embodiment, the authentication circuit 610 may be packaged as an independent integrated circuit device coupled to the application processor 260 within the reader device 214. In another embodiment, the authentication circuit 610 is fabricated as part of an integrated circuit device comprising the NFC interface 262 (or an RFID interface) within the reader device 214. In yet another embodiment, the authentication circuit 610 is fabricated as part of an integrated circuit device comprising the application processor 260 within the reader device 214. In still yet another embodiment one or more different system components of reader device 214 include an instance of the authentication circuit 610.

During an authentication session, the authentication circuit 610 (rather than the tag 212) provides tag authentication codes (e.g., A[T], B[T], etc., or A1[T1], B1[T1], A2[T2], B2[T2] etc.). In an embodiment, if the authentication session is successful (e.g., the first system and the second system determine that the other is authentic because appropriate authentication codes are equal) then the first system and the second system are mutually authenticated. For example, the result of a successful authentication session may result in the reader device 214 and the authentication servers 216 being mutually authenticated.

In an embodiment, the authentication circuit 610 provides one time/nonce encryption keys for data communication sessions between the first system and the second system. For example, the authentication circuit 610 may implement a modified version of method 110, with the authentication code sequences of FIG. 2F modified to include three index values per group 273 (instead of two). In such an embodiment, incrementing an index (T and/or T0) by one group 273 is modified to increment the index by a value of three (instead of two). For example, step 124 is modified to be T0=T0+3, and resynchronization operations are modified to increment index values by three (instead of two), so that step 119 is modified to test whether A[S] is equal to A[T+3] and if so, increment T=T+3 and T0=T0+3. In such an embodiment, the authentication circuit 610 still performs as a tag for the purpose of authentication protocol 210 (to authenticate the authentication server 216), however A[T+2] and B[T+2] are presented internally to the reader device 214 and used as encryption keys for communication with the authentication server 216, or any other server or web-based service, such as a transaction service, a product info server accessed after tag 212 authenticated, and the like. At the authentication server 216, method 150 of FIG. 1C would be similarly modified so that groups 273 include three index values and step 162 is modified to be S0=S0+3. In such an embodiment, at the authentication server 216, A[S+2] and B[S+2] are used as encryption keys for communication with the reader device 214.

The disclosed technique of performing authentication protocol 210 to mutually authenticate two systems may be generically applied to any two systems. Furthermore the disclosed technique of modifying methods 110 and 150 to generate authentication codes A[T+2], A[S+2], B[T+2], B[S+2] for use as encryption keys for communication between the two mutually authenticated systems may also be generally applied.

In an embodiment, the disclosed techniques may be performed to provide mutual authentication between a secure transaction server and a client device. In such an embodiment, the client device is paired with the secure transaction server through a common set of tag state data, and the client device and the transaction server authenticate each other prior to performing a transaction (e.g., financial transaction, email/data download or upload, and the like).

In another embodiment, the disclosed techniques may be performed to provide mutual authentication between a secure control system and control actuators (e.g., power system controls, HVAC controls, gas pipe valve controls, lighting controls, etc.). In such an embodiment, a control actuator is paired with the secure control system through a common set of tag state data, and the control actuator and the secure control system authenticate each other prior to communicating commands or performing an action.

Figure 6B:
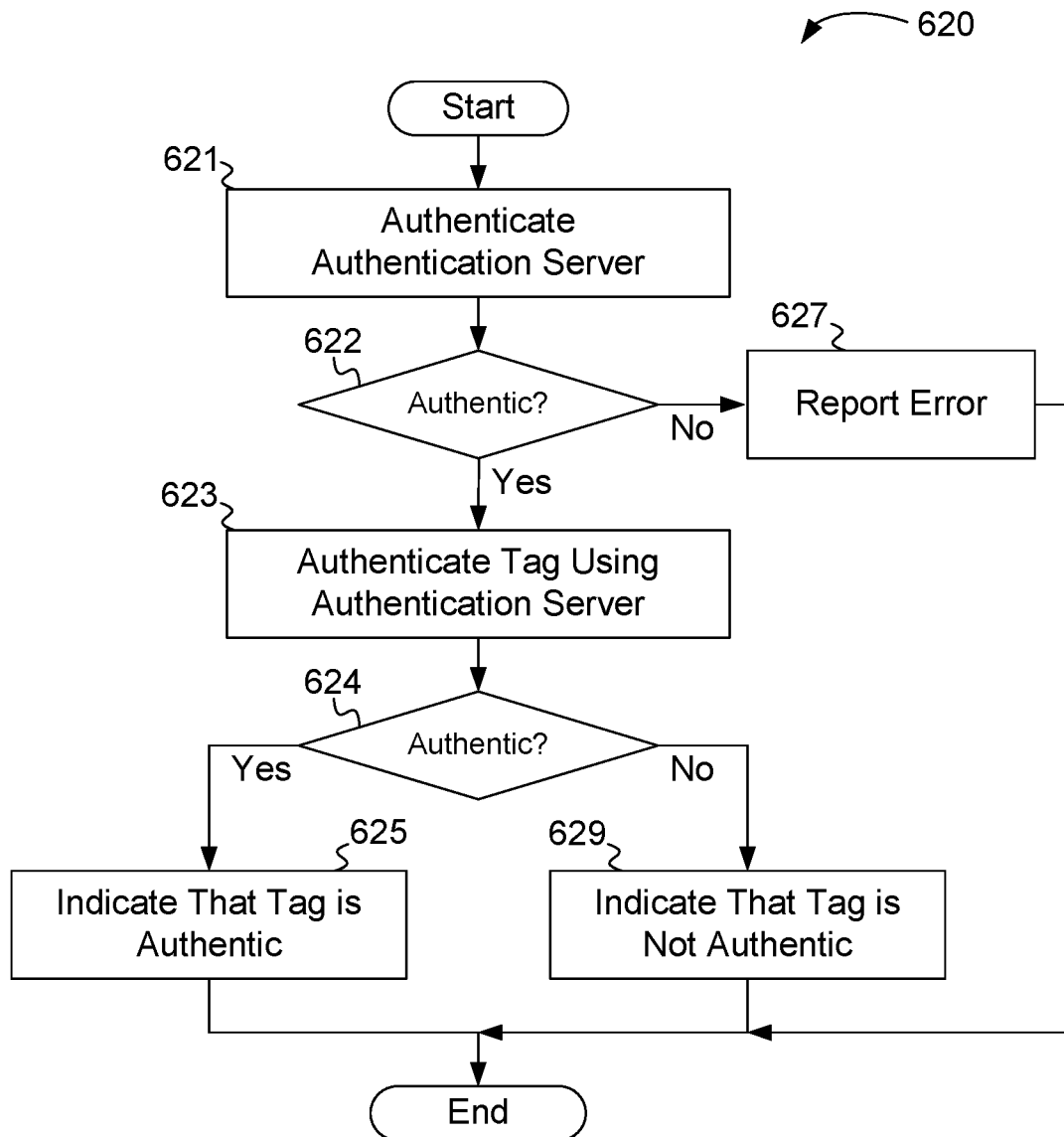
FIG. 6B illustrates a flowchart of a method for authenticating a system, in accordance with an embodiment.

FIG. 6B illustrates a flowchart of a method 620 for authenticating a system, in accordance with an embodiment. Although the method 620 is described with respect to the tag 212, the reader device 214, the authentication server 216, and other systems disclosed herein, persons of ordinary skill in the art will understand that any circuit or system that performs method 620 is within the scope and spirit of embodiments of the present disclosure. In an embodiment, the reader device 214 is configured to perform the method 620 to authenticate an authentication server 216 and subsequently authenticate a tag 212.

In an embodiment, the authentication circuit 610 behaves as a tag device and performs one of method 110 of FIG. 1A, method 310 of FIG. 3A, or method 560 of FIG. 5C. However, rather than communicating authentication protocol traffic through an NFC or RFID channel, the authentication circuit 610 may communicate through electrical signals to circuitry within the reader device 214.

The method 620 begins at step 621, where the reader device 214 authenticates the authentication server 216. In an embodiment, to authenticate the authentication server 216, the reader device 214 performs a first authentication protocol with the authentication circuit 610 acting as a known-authentic tag. The first authentication protocol may comprise authentication protocol 210, authentication protocol 410, authentication protocol 510, modified variations thereof, or a combination thereof. In other embodiments, any technically feasible technique in the art may be performed to authenticate the authentication server 216.

At step 622, if the first authentication protocol determines that the authentication server 216 is authentic then the method 620 proceeds to step 623. The authentication server 216 is determined to be authentic if the authentication protocol succeeds.

At step 623, the reader device 214 performs a second authentication protocol between the tag 212 and the authenticated authentication server 216. The second authentication protocol may comprise authentication protocol 210, authentication protocol 410, authentication protocol 510, modified variations thereof, or a combination thereof.

At step 624, if the second authentication protocol determines that the tag 212 is authentic then the method proceeds to step 625.

At step 625, the reader device 214 indicates that the tag 212 is authentic. Indicating that the tag 212 is authentic may include any technically feasible action or actions, such as displaying a message on the reader device 214, or generating an entry in a database that indicates the tag 212 was authenticated (without necessarily displaying a message). In an embodiment, the reader device 214 displays a message indicating the tag 212 is authentic and then displays product information (e.g., through a webpage). Furthermore, the product information may include, without limitation, hyperlinks to additional product information, company information, product review information, survey information, bonus/gift offering information, online ordering information of related products, other customer engagement offerings, and the like. In another embodiment, the reader device 214 adds or confirms the tag 212 to an inventory database, such as an inventory database of a warehouse or retail facility. The method 620 then terminates.

Returning to step 622, if the first authentication protocol determines that the authentication server 216 is not authentic then the method 620 proceeds to step 627 where the reader device 214 reports an error. Reporting an error may include displaying a message that the authentication server 216 is not available. Furthermore, reporting the error may include recording a set of data comprising network information related to communicating with the non-authenticated server, geo-location information of the reader device 214, user information, tag information and any information that may be captured near the time of determining that the authentication server 216 is not authentic. The reader device 214 may transmit the set of data once an authenticated server is available. The set of data may form a basis for a forensic investigation at a later time.

Returning to step 624, if the second authentication protocol determines that the tag 212 is not authentic then the method 620 proceeds to step 629.

At step 629, the reader device 214 indicates that the tag 212 is not authentic. Indicating that the tag 212 is not authentic may include any technically feasible action or actions, such as displaying a message on the reader device 214, or generating an entry in a database that indicates the tag 212 was not authenticated (without necessarily displaying a message). In an embodiment, the reader device 214 displays a message indicating the tag 212 is not authentic and then displays product information (e.g., through a webpage) for ordering an authentic product. In an embodiment, the reader device 214 reports a current geo-location and tag information (such as TagID) for the non-authentic tag to the authentication server 216 or to a reporting server system. The reader device 214 may authenticate the reporting server system prior to sending any information. In an embodiment, if the reader device 214 is unable to authenticate the authentication server 216, the reporting server system, or a tag 212, then the reader device 214 records a set of information, such as a recent geo-location, a TagID, and the like. The reader device 214 may then transmit the set of information upon later authenticating the authentication server 216 or the reporting server system. Such information may provide the basis for a subsequent forensic investigation.

Figure 7A:
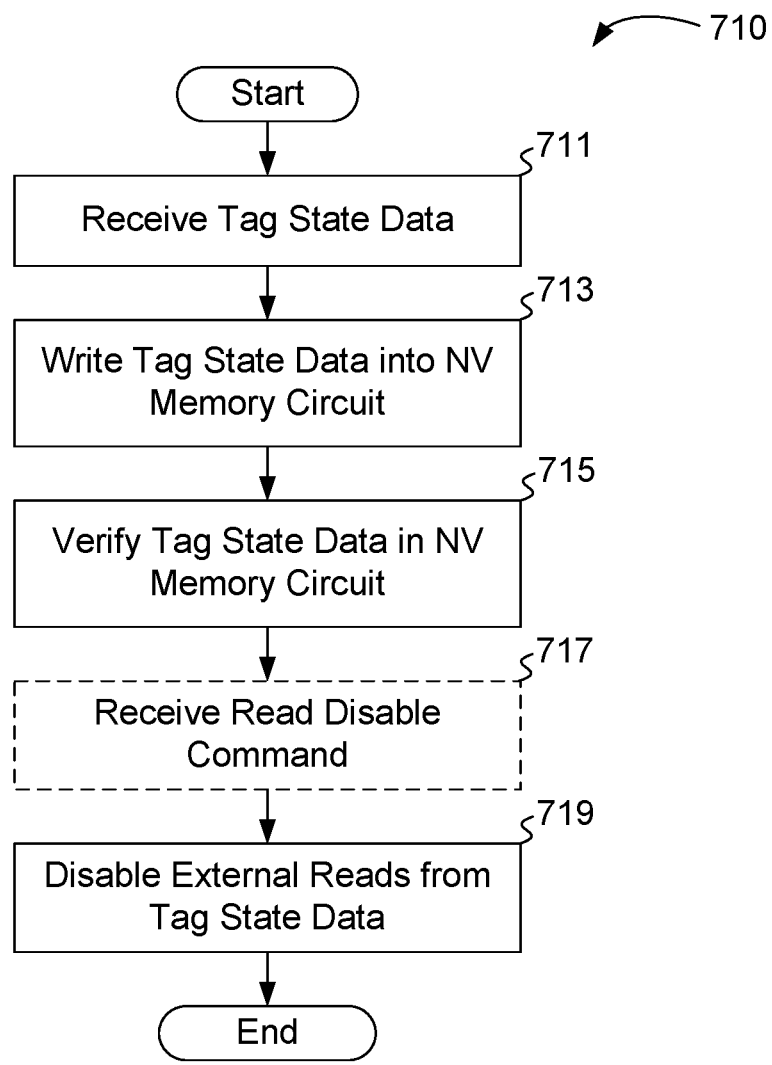
FIG. 7A illustrates a flowchart of a method for programming tag state data into a nonvolatile memory within a tag device, in accordance with an embodiment.

FIG. 7A illustrates a flowchart of a method 710 for programming tag state data into a nonvolatile memory 252 within tag 212, in accordance with an embodiment. The method 710 may be performed by the tag 212 (or authentication circuit 610) during a manufacturing, testing, or assembly process for the tag 212. The method 710 may be performed after initial or manufacturing fault testing of the tag 212. In an embodiment, the method 710 is performed with the tag 212 powered through a directly coupled electrical power source and, optionally, through an electrically coupled communications pin or pins on the tag 212. In an alternative embodiment, the method 710 is performed with the tag 212 powered by an NFC antenna and NFC interface.

The method 710 begins at step 711, where the tag 212 receives tag state data. The tag state data may include, without limitation, a TagID, an initial index value for T0 (or index values for T01 and T02, etc.), and at least one key or set of keys. In an embodiment, the tag 212 receives the tag state data from a programming device coupled (wirelessly or wired) to the tag 212. The tag state data includes at least one index (e.g., T0) and at least one key. At step 713, the tag 212 writes the tag state data into nonvolatile memory 252. In an embodiment, the tag 212 receives a first portion of the tag state data and writes the first portion; the tag 212 then receives a second portion of the tag state data and subsequently writes the second portion, and so forth. In this way, steps 711 and 713 may be repeated multiple times in sequence before the method 710 proceeds to step 715. At step 715 the tag 212 verifies the tag state data within the nonvolatile memory 252. In an embodiment, verifying the tag state data may be performed by allowing the programming device to read the tag state data (or a hash value generated from the tag state data). In another embodiment, verifying the tag state data may comprise comparing a hash value of the tag state data generated by the tag with a hash value provided by the programming device. If the values are equal then verification is successful. At step 717, the tag 212 receives a command to disable read operations directed to the tag state data. At step 719 the tag 212 disables external read operations directed to the tag state data. In an embodiment, the tag 212 may disable external reads directed to tag state data in response to receiving the command (step 717). Alternatively, the tag 212 disables external read operations directed to tag state data in response to verifying the tag state data (at step 715). The method 710 then terminates.

Figure 7B:
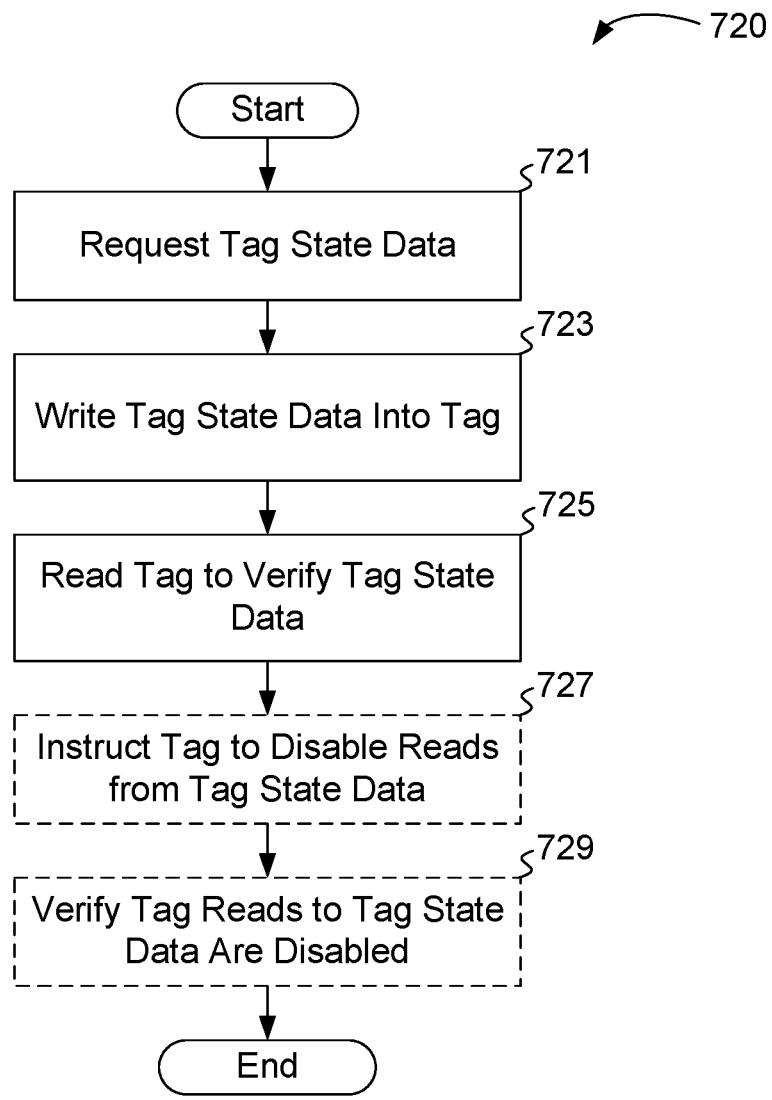
FIG. 7B illustrates a flowchart of a method for programming a tag device with tag state data, in accordance with an embodiment.

FIG. 7B illustrates a flowchart of a method 720 for programming tag 212 with tag state data, in accordance with an embodiment. The method 720 may be performed by a programming device coupled to the tag 212 (or authentication circuit 610) during a manufacturing, testing, or assembly process for the tag 212 or a device that includes the authentication circuit 610. The method 720 may be performed after initial or manufacturing fault testing of the tag 212. In an embodiment, the method 720 is performed with the tag 212 powered through a directly coupled electrical power source and, optionally, through an electrically coupled communications pin or pins on the tag 212. In an alternative embodiment, the method 720 is performed with the tag 212 powered by a wireless NFC antenna and NFC interface.

At step 721, the programming device requests tag state data to program into the tag 212. The tag state data may reside within a local database or a remote database. Furthermore, the tag state data may be generated as needed locally or remotely. Requesting the tag state data may include adding the tag state data for the tag 212 to a database of known tags or marking the tag state data within the database to indicate a tag 212 was programmed with the tag state data.

At step 723, the programming device writes the tag state data into the tag 212. At step 725, the programming device reads the tag 212 to verify the tag state data. In an embodiment, the programming device reads each element of tag state data to verify each element has been accurately written to the tag 212. In another embodiment, the programming device generates a hash value of the tag state data and reads a corresponding hash from the tag to verify the tag state data was accurately written to the tag 212. At step 727, the programming device instructs the tag 212 to disable read requests directed to the tag state data. Note that disabling read operations that are directed to the tag state data does not necessarily disable other read operations, such as read requests used for performing an authentication protocol. At step 729, the programming device verifies that read operations directed to the tag state data are disabled. The method 720 then terminates. In an embodiment, the tag 212 is authenticated using an authentication server 216 prior to shipping an associated product with the tag 212 to a distribution channel and/or end user.

The invention claimed is:

1. A method, comprising:
   retrieving, by a reader device, a tag identifier from a tag device;
   retrieving, by the reader device, a first server authentication code from an authentication server, using the tag identifier;
   retrieving, by the reader device, a first tag authentication code from the tag device, using the first server authentication code;
   retrieving, by the reader device, a second server authentication code and a third server authentication code from the authentication server, using the first tag authentication code;
   retrieving, by the reader device, a second tag authentication code from the tag device, using the third server authentication code;
   determining, by the reader device, that the tag device is authentic, based on the second tag authentication code and the second server authentication code; and
   in response to determining that the tag device is authentic:
      retrieving, by the reader device, product information associated with the tag device from the authentication server;
      displaying, by the reader device, the product information; and
      displaying, by the reader device, a message indicating the tag device has been authenticated,
      wherein the product information and the message are displayed on a display screen comprising the reader device.

2. The method of claim 1, wherein determining that the tag device is authentic comprises determining that the second tag authentication code is equal to the second server authentication code.

3. The method of claim 1, wherein determining that the tag device is authentic comprises determining that the second tag authentication code is equal to the second server authentication code, and determining that a reply time is below a first threshold.

4. The method of claim 3, wherein the reply time is measured as a time span between a transmission end of the third server authentication code from the reader device to the tag device and a transmission start of the second tag authentication code from the tag device to the reader device.

5. The method of claim 3, wherein the reply time is measured as a time span between a transmission start of the third server authentication code from the reader device to the tag device and a transmission end of the second tag authentication code from the tag device to the reader device.

6. The method of claim 3, wherein a counter circuit within the reader device measures the reply time by counting one of: a number of reference clock cycles, a number of carrier cycles, a number of fractional carrier cycles, a number of multiple carrier cycles, a number of subcarrier cycles, and a number of modulation symbols.

7. The method of claim 1, wherein retrieving the tag identifier comprises:
   transmitting, by the reader device, a tag identifier request to the tag device; and
   receiving, by the reader device, the tag identifier from the tag device.

8. The method of claim 1, wherein retrieving the first server authentication code comprises:
   transmitting, by the reader device, the tag identifier to the authentication server; and
   receiving, by the reader device, the first server authentication code from the authentication server.

9. The method of claim 1, wherein retrieving the first tag authentication code comprises:
   transmitting, by the reader device, the first server authentication code to the tag device; and
   receiving, by the reader device, the first tag authentication code from the tag device.

10. The method of claim 1, wherein retrieving the second server authentication code and the third server authentication code comprises:
    transmitting, by the reader device, the first tag authentication code to the authentication server;
    receiving, by the reader device, the third server authentication code from the authentication server; and
    receiving, by the reader device, the second server authentication code from the authentication server.

11. The method of claim 1, wherein retrieving the second tag authentication code comprises:
    transmitting, by the reader device, the third server authentication code to the tag device; and
    receiving, by the reader device, the second tag authentication code from the tag device.

12. The method of claim 1, further comprising authenticating, by the reader device, the authentication server prior to retrieving the first server authentication code from the authentication server.

13. The method of claim 12, wherein authenticating the authentication server comprises:
    performing an authentication protocol between the authentication server and an authentication circuit disposed within the reader device; and
    determining, by the reader device, that the authentication server and the authentication circuit successfully mutually authenticated.

14. The method of claim 1, wherein the product information comprises an image associated with the tag device and displaying the product information comprises displaying the image on the display screen, or the product information comprises a URL and displaying the product information comprises loading and displaying a webpage associated with the URL on the display screen.

15. The method of claim 1, further comprising performing anti-collision tag discovery and tag inventory operations prior to retrieving the first server authentication code from the authentication server.

16. A method, comprising:
    retrieving, by a reader device, a tag identifier from a tag device;
    retrieving, by the reader device, a first server authentication code from an authentication server, using the tag identifier;
    retrieving, by the reader device, a first tag authentication code from the tag device, using the first server authentication code;

retrieving, by the reader device, a second server authentication code and a third server authentication code from the authentication server, using the first tag authentication code;

retrieving, by the reader device, a second tag authentication code from the tag device, using the third server authentication code;

determining, by the reader device, that the tag device is not authentic, based on the second tag authentication code being not equal to the second server authentication code, or based on a reply time exceeding a first threshold; and in response to determining that the tag device is not authentic:
   displaying, by the reader device, a message indicating that tag authentication failed,
   wherein the message is displayed on a display screen comprising the reader device.

17. A reader device, comprising:
a near field communication (NFC) interface circuit;
a wireless modem circuit;
a display screen; and
an application processor circuit coupled to the NFC interface circuit, the wireless modem circuit, and the display screen,
wherein the reader device is configured to:
   retrieve, through the NFC interface circuit, a tag identifier from a tag device;
   retrieve, through the wireless modem circuit, a first server authentication code from an authentication server, using the tag identifier;
   retrieve, through the NFC interface circuit, a first tag authentication code from the tag device, using the first server authentication code;
   retrieve, through the wireless modem circuit, a second server authentication code and a third server authentication code from the authentication server, using the first tag authentication code;
   retrieve, through the wireless modem circuit, a second tag authentication code from the tag device, using the third server authentication code;
   determine that the tag device is authentic, based on the second tag authentication code and the second server authentication code; and
   in response to determining that the tag device is authentic:
      retrieve, through the wireless modem circuit, product information associated with the tag device from the authentication server;
      display, on the display screen, the product information; and
      display, on the display screen, a message indicating the tag device has been authenticated.

18. The reader device of claim 17, wherein determining that the tag device is authentic comprises determining that the second tag authentication code is equal to the second server authentication code.

19. The reader device of claim 17, wherein determining that the tag device is authentic comprises determining that the second tag authentication code is equal to the second server authentication code, and that a reply time is below a first threshold, wherein a counter circuit within the reader device measures the reply time by counting one of: a number of reference clock cycles, a number of carrier cycles, a number of fractional carrier cycles, a number of multiple carrier cycles, a number of subcarrier cycles, and a number of modulation symbols.

20. The reader device of claim 17, further configured to authenticate the authentication server prior to retrieving the first server authentication code from the authentication server.

* * * * *